United States Patent [19]
Ohyama

[11] Patent Number: 5,883,697
[45] Date of Patent: Mar. 16, 1999

[54] IMAGE SENSING APPARATUS AND METHOD

[75] Inventor: Atsushi Ohyama, Yokohama, Japan

[73] Assignee: Canon Kabushiki Kaisha, Tokyo, Japan

[21] Appl. No.: 429,489

[22] Filed: Apr. 25, 1995

[30] Foreign Application Priority Data

| Apr. 28, 1994 | [JP] | Japan | 6-114152 |
| Oct. 17, 1994 | [JP] | Japan | 6-250644 |
| Oct. 17, 1994 | [JP] | Japan | 6-250645 |
| Oct. 17, 1994 | [JP] | Japan | 6-250646 |

[51] Int. Cl.$^6$ ............................. G03B 27/52; G03B 27/54
[52] U.S. Cl. ................................. 355/18; 355/21; 355/61; 355/67
[58] Field of Search .............................. 355/18, 59, 61, 355/62, 63, 67, 69, 70, 21

[56] References Cited

U.S. PATENT DOCUMENTS

| 3,649,120 | 3/1972 | Pfeifer et al. | 355/68 |
| 4,093,379 | 6/1978 | Weiner | 355/63 X |
| 4,111,548 | 9/1978 | Pechev et al. | 355/70 X |
| 4,244,649 | 1/1981 | Rees et al. | 355/61 |
| 4,492,454 | 1/1985 | Moser | 355/61 X |
| 5,247,330 | 9/1993 | Ohyama et al. | 355/21 X |

*Primary Examiner*—Fred L. Braun
*Attorney, Agent, or Firm*—Morgan & Finnegan, L.L.P.

[57] ABSTRACT

An image sensing apparatus reliably indicates an image sensing area regardless of the size of an object. In the apparatus, illumination units 14 irradiate spot lights 36 on a base 7 to indicate an image sensing area 37 for sensing an original 6 by a camera head 9. The image sensing area indicated by the spot lights 36, irradiated from laser devices 33 of the illumination units 14, attached to the camera head 9, is corresponding to the length/width ratio of the image screen of a monitor 3. A luminance signal level, stored in a memory of a system controller 15, on image sensing the base, is compared with the level of a luminance signal from an image sensing device 25, and when the signal levels do not coincide, it is determined that an original exists on the base. Further, the system controller 15 independently changes first to fourth spot lights 110 to 113 irradiated from the first to fourth illumination units.

70 Claims, 44 Drawing Sheets

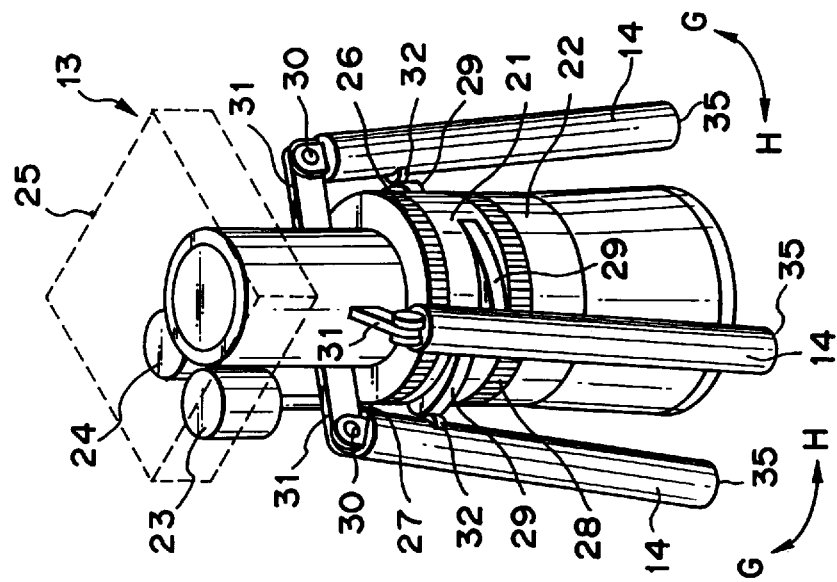
FIG. 2A  FIG. 2B  FIG. 2C
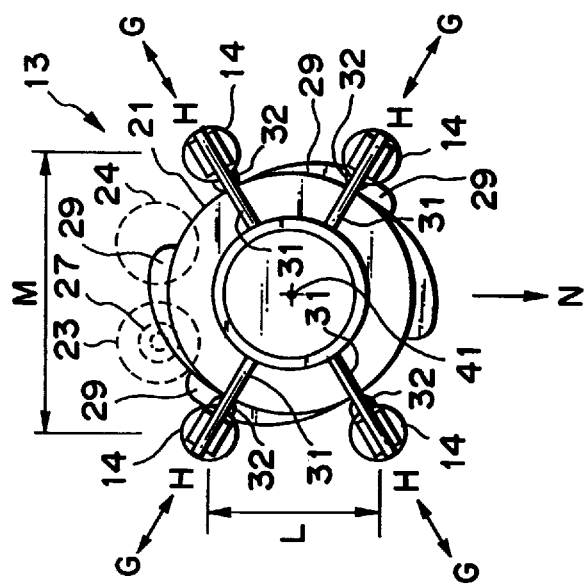
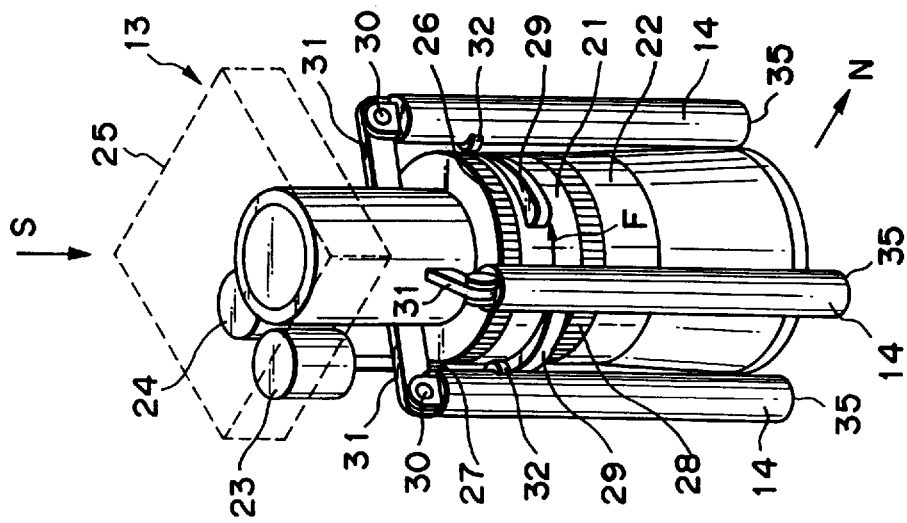

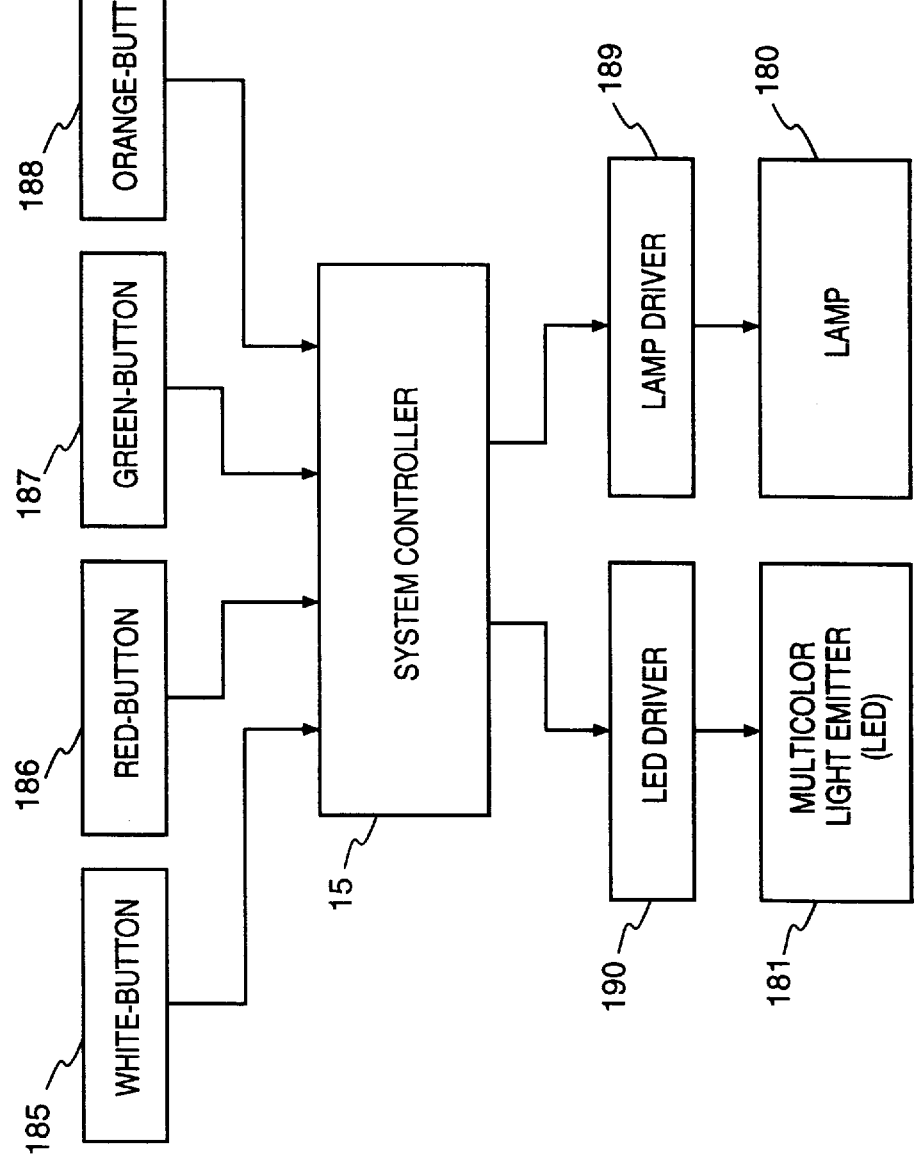

IMAGE SENSING APPARATUS AND METHOD

BACKGROUND OF THE INVENTION

Present invention relates to an image sensing apparatus and method for image-sensing an object such as original document.

FIG. 40 is a perspective view showing the configuration of an image sensing system using a conventional image sensing apparatus. In FIG. 40, reference numeral 100 denotes an image sensing system comprising an image input unit 101 and a video monitor 102 connected to the image input unit 101. The image input unit 101 has a camera lens 103, a frame 104 supporting the camera lens 103 and a base 106 on which an original 105 as an object is placed. Further, the image input unit 101 has an operation panel 107 at the front portion. The operation panel 107 has a power switch for the image input unit, a zoom button for adjustment of field of view, a focus button for auto/manual focusing (all not shown) and so on. The base 106 has marks 108 at the four corners indicating an image sensing area of the camera lens 103. The image sensing area is set to be somewhat larger than the wide-end (position of a zoom ring when the focal distance of a zoom lens is the longest) image sensing area. The video monitor 102 displays an image of an object such as the original 105 placed on the base 106 on an image screen 109.

Next, the operation procedure for the image sensing system 100 in FIG. 40 will be described. When the system is used, the power switch is turned on (ON) to make the system active. At this time, white balance is automatically adjusted, autofocusing of the camera lens 103 is made, and the field of view is adjusted for wide-end (position of zoom ring when the focal length of zoom lens is the shortest) image sensing. Then, a user sets the original as the object for image sensing on about the center of the base 106. At this time, the user determines the position on the base 106 where the original 105 is placed, from the marks 108 printed on the base 106. If necessary, the user manipulates the zoom button to change the size (field of view) of the original 105 displayed on the image screen 109 of the video monitor 102. Also, if necessary, the user manipulates the focus button to adjust focusing.

As described above, in the conventional system, the image sensing area for image-sensing the original 105 by the camera lens 103 is indicated by the marks 108 printed on the four corners of the base 106. However, such image sensing area indicating means has the following problems:

(1) If the size of the original 105 is larger than the image sensing area indicated by the marks 108, the marks 108 are hidden by the original 105, whereby it is difficult to determine the portion of the original to be sensed.

(2) If the size of the original 105 is smaller than the image sensing area indicated by the marks 108, a correct image sensing area is not easily determined.

(3) If the zooming function of the camera lens 103 is operated to change the size of the original 105 displayed on the image screen 109 of the video monitor 102, the image sensing area indicated by the marks 108 becomes improper for the image sensing, which disturbs correct determination of image sensing position.

SUMMARY OF THE INVENTION

The present invention has been made in consideration of the above situation, and has as its first object to provide an image sensing apparatus which correctly indicates the image sensing area regardless of the size of an object.

It is another object of the present invention to provide an image sensing apparatus which clearly indicates the image sensing area regardless of the color of an object or the brightness around the apparatus as well as the size of the object.

It is another object of the present invention to provide an image sensing apparatus which correctly indicates the image sensing area regardless of the size of an object, and which prevents fatigue of a user's eyes due to light indicating the image sensing area.

It is another object of the present invention to provide an image sensing apparatus which correctly indicates the image sensing area regardless of the size of an object, and which reduces electric consumption of irradiation means for indicating the image sensing area.

It is another object of the present invention to provide an image sensing apparatus which correctly indicates the image sensing area regardless of the size of an object, and which correctly detects the image sensing area regardless of zooming by input means.

It is another object of the present invention to provide an image sensing apparatus which clearly indicates the image sensing area regardless of the brightness around the apparatus as well as the size of an object.

It is another object of the present invention to provide an image sensing apparatus which correctly indicates the image sensing area regardless of the size of an object, and which prevents the glare caused by irradiation means for indicating the image sensing area.

As described above, the above object is attained by providing an image sensing apparatus in which light from illumination means indicates the image sensing area of input means, thus the image sensing area can be correctly indicated regardless of the size of the object.

The above object is attained by providing an image sensing apparatus in which light from illumination means indicates the image sensing area of input means, and the illumination means can change the color of the light so that the light is not affected by the color of the object or the brightness around the apparatus. Thus, the apparatus can correctly indicate the image sensing area regardless of the color of the object or the brightness around the apparatus as well as the size of an object.

The above object is attained by providing an image sensing apparatus in which light from illumination means indicates the image sensing area of input means, and emission timing control means controls emission timing of the illumination means. Thus, the apparatus can reliably indicate the image sensing area, and further prevent the fatigue of a user's eyes.

The above object is attained by an image sensing apparatus in which light from illumination means indicates the image sensing area of input means, and light-out control means automatically turns out the light when a predetermined period has elapsed since the illumination means emitted the light. Thus, the apparatus can correctly indicate the image sensing area regardless of the size of the object, and further, reduce the electrical consumption of the illumination means.

The above object is attained by providing an image sensing apparatus in which the light from illumination means indicates the image sensing area of input means, and image sensing area changing means changes the image sensing area indicated by the light from illumination means, interlocking with the operation of zooming function of the input means. Thus, the apparatus can correctly indicate the image sensing area regardless of the size of the object, and further, correctly detect the image sensing area regardless of zooming by input means.

The above object is attained by providing an image sensing apparatus in which the light from illumination means indicates the image sensing area of input means, and light amount changing means changes the amount of the light from the illumination means. Thus, the apparatus can clearly indicate the image sensing area regardless of the brightness around the apparatus as well as the size of the object.

The above object is attained by providing an image sensing apparatus in which the light from illumination means indicates the image sensing area of input means, and when the input means is out of the image sensing position, inhibition means inhibits light emission by the illumination means. Thus, the apparatus can correctly indicate the image sensing area regardless of the size of the object, and further, prevent the glare caused by illumination means upon image-sensing a person as the object of image sensing.

According to the present invention, the image sensing apparatus comprises a base on which original document is placed, image sensing means for image-sensing the original, original detection means for detecting the existence/absence of the original on the base and indication means for indicating the image sensing area of the image sensing means on the base, in accordance with the output from the original detection means. This construction enables correct indication of image sensing area for placing the original on the base, thus allows a user quick confirmation of the image sensing area. Further, the apparatus indicates the image sensing area for only a necessary period, thus saving electrical consumption. That is, the apparatus allows a user to confirm an image sensing area quickly when needed.

Further, according to the present invention, the image sensing apparatus comprises a base on which an original is placed, image sensing means for image-sensing the original, indication means for indicating the image sensing area of the image sensing means on the base with a plurality of indication marks and setting means for independently setting the color of indication for the plurality of indication marks. Thus, if the color or brightness of the original changes depending upon the position on the base, a color of the marks most appropriate to the position can be set, and a user can quickly confirm the clearly indicated image sensing area.

According to the present invention, the image sensing apparatus comprises a base on which an original is placed, image sensing means for image-sensing the original, indication means for indicating the image sensing area of the image sensing means on the base and area changing means for changing the length/width ratio of the image sensing area. The indication means changes indication status in accordance with the change of the image sensing area. Thus, the apparatus can correctly indicate the image sensing area regardless of the size of the original. Further, as the indication means changes the indication status in correspondence with the length/width ratio of the image sensing area, the apparatus can correctly indicate the image sensing area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 comprised of FIGS. 2A–2C illustrates a camera head of the image sensing apparatus of the first embodiment;

FIG. 21 is a block diagram showing the construction of a control system of light color change device of the image sensing apparatus of the third embodiment of the present invention;

DETAILED DESCRIPTION OF THE PREFERRED EMBODIMENT(S)

Preferred embodiments of the present invention will be described in detail in accordance with the accompanying drawings.

[First Embodiment]

A first embodiment of the present invention will be described with reference to FIGS. 1 to 16.

Figure 1:
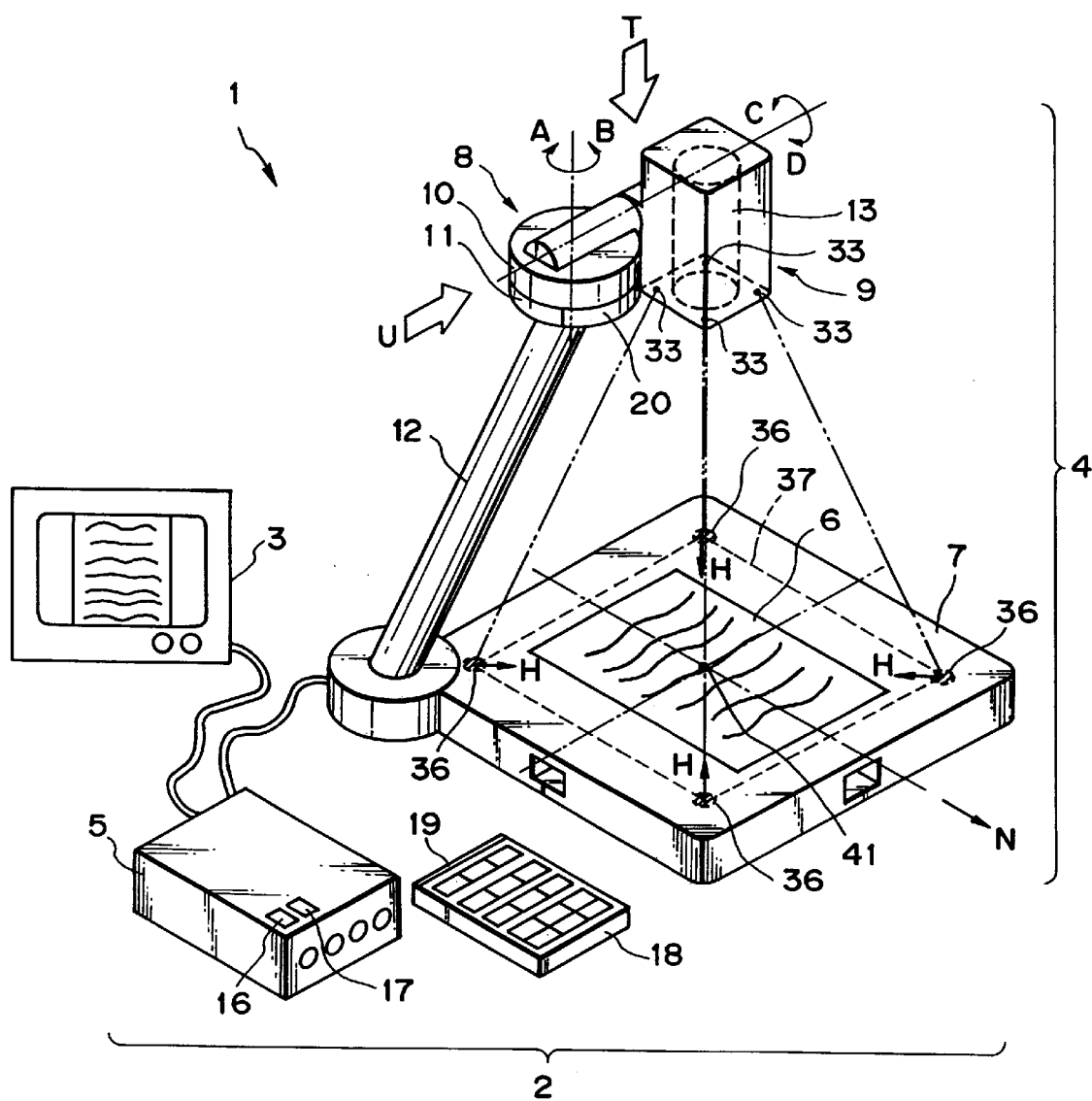
FIG. 1 is a perspective view showing the construction of an image sensing system having an image sensing apparatus according to a first embodiment of the present invention.

FIG. 1 shows the construction of an image sensing system using an image sensing apparatus according to the first embodiment of the present invention. In FIG. 1, numeral 1 denotes the image sensing system comprising the image sensing apparatus 2 and a video monitor 3 connected to the image sensing apparatus 2.

The image sensing apparatus 2 comprises an apparatus main body 4 and a controller 5 connected to the apparatus main body 4. The apparatus main body 4 has a base 7 on which an original 6 as an object is placed and a camera head (input means) 9 supported via a support member 8. The support member 8 comprises a pan base 10 which supports the camera head 9, a support base 11 which rotatably supports the pan base 10, and a support 12 which integrally supports the support base 11. The pan base 10 is supported at its axis rotatably in arrow A and B directions within a predetermined range with respect to the support base 11. The pan base 10 has a free stop mechanism so that it can stop at an arbitrary angular position.

The camera head 9, having a camera lens 13, is supported at its axis rotatably in arrow C and D directions within a predetermined range with respect to the pan base 10. The camera head 9 has a free stop mechanism so that it can stop at an arbitrary angular position (not shown). The position of the camera head 9 and that of the pan base 10 as shown in FIG. 1 are called original sensing positions, and the camera head 9 and the pan base 10 at these positions are lightly locked by biasing force of an engaging pin to be described later.

The support 12 is fixed at a corner of the base 7 with an predetermined angle so that the light axis of the camera lens 13 at the original sensing position comes to about the center of the base 7. The camera lens 13 has four illumination units 14 (see FIG. 2) to be described later.

The controller 5 has a system controller 15 for respectively controlling, driving circuits, a video processor, a video memory, a power source of the apparatus main body 4 etc. in the system. Further, the controller 5 has a main power switch 16 and a main illumination switch 17.

The image sensing apparatus 2 can be operated from a remote position within a predetermined range with a wireless remote controller 18 which has operation system of the apparatus main body 4. The wireless remote controller 18 has a sub-power switch 38 (see FIG. 11A) for the apparatus main body 4, control buttons for the camera lens 13 for zooming, focusing, iris adjustment etc. When the operation buttons of the wireless remote controller 18 are manipulated, the operation signals are transmitted from a transmitter 19 of the wireless remote controller 18 to a receiver 20 of the support base 11 of the apparatus main body 4. As a result, the system controller 15 controls respective driving circuits and processors, and controls driving systems of the image sensing apparatus 2.

It should be noted that the respective portions of the image sensing apparatus 2 are operated with the wireless remote controller 18, however, this does not pose any limitation upon the present invention. For example, an operation unit may be provided at the front portion of the base 7 of the apparatus main body 4.

Next, the construction of the camera lens 13 will be described with reference to FIG. 2.

FIG. 2A is a perspective view schematically showing the construction of the camera lens 13, in which an arrow N represents a front direction. FIG. 2B is a top plan view of FIG. 2A, and FIG. 2C, a perspective view schematically showing the construction of the camera lens 13 when the zoom ring 21 is at a wide-end position.

In FIG. 2, numeral 21 denotes a zoom ring; 22, a focus ring; 23, a zoom motor; 24, a focus motor; 14, four illumination units provided around the lens barrel of the camera lens 13; and 25, image sensing device. The zoom motor 23 and the focus motor 24 respectively comprise a pulse motor. The zoom ring 21 has a toothed portion, engaged with a gear 27 attached to the rotating axis of the zoom motor 23, on its circumferential surface. Similarly, the focus ring 22 has a toothed portion, engaged with a gear (not shown) attached to the rotating axis of the focus motor 24, on its circumferential surface.

The camera lens 13 changes the size of an image (field of view) displayed on the image screen of the video monitor 3, by the rotation of the zoom ring 21, and rotates the focus ring 22 by an appropriate amount, based on video information from the image sensing device 25, to focus on the image. Since these techniques are well known, the detailed explanations will be omitted. Note that the zoom ring 21 of the camera lens 13 in FIGS. 2A and 2B is a tele-end position, and the field of view is corresponding to the tele-end image sensing.

The zoom ring 21 has four cams 29 for changing angles at which the illumination units 14 are attached, in correspondence with the positions of the illumination units 14, on its circumferential surface. The cams 29 respectively have a slope having an angle increasing from the circumference of the zoom ring 21 so as to change the inclination of the illumination units 14 in accordance with the rotation angle of the zoom ring 21 and the zooming ratio (size) of the image to be sensed. Adjacent two cams 29 are provided at positions shifted from each other since they cannot be attached at the same height due to the positional relation between adjacent two illumination units 14.

The illumination units 14 respectively have a cylindrical shape and rotatably supported at their axes by an arm 31 formed around the lens barrel of the camera lens 13. The illumination units 14 respectively have a contact piece 32 having a projection portion projecting toward the center of the camera lens 13. The projection portion of the contact piece 32 has semicircular upper and lower surfaces. The contact pieces 32 are attached to the illumination units 14 in accordance with the positions of the cams 29. The illumination units 14 are biased in an arrow H direction with support axes 30 as the centers, and the contact pieces 32 are in contact with the cams 29. When the zoom ring 21 is rotated, the contact pieces 32 smoothly slide on the surface of the cams 29.

As shown in FIG. 2B, the illumination units 14 are provided around the lens barrel of the camera lens 13, at heights shifted by a predetermined amount, and the axes of the cylindrical illumination units 14 are positioned on the same circle around the lens barrel with a predetermined distance. The ratio of the positions of the illumination units 14 to the camera lens 13 is set to be 3:4 (length:width), i.e., the length/width ratio of a typical image screen.

Next, the construction of the illumination units 14 will be described with reference to FIG. 3.

Figure 3:
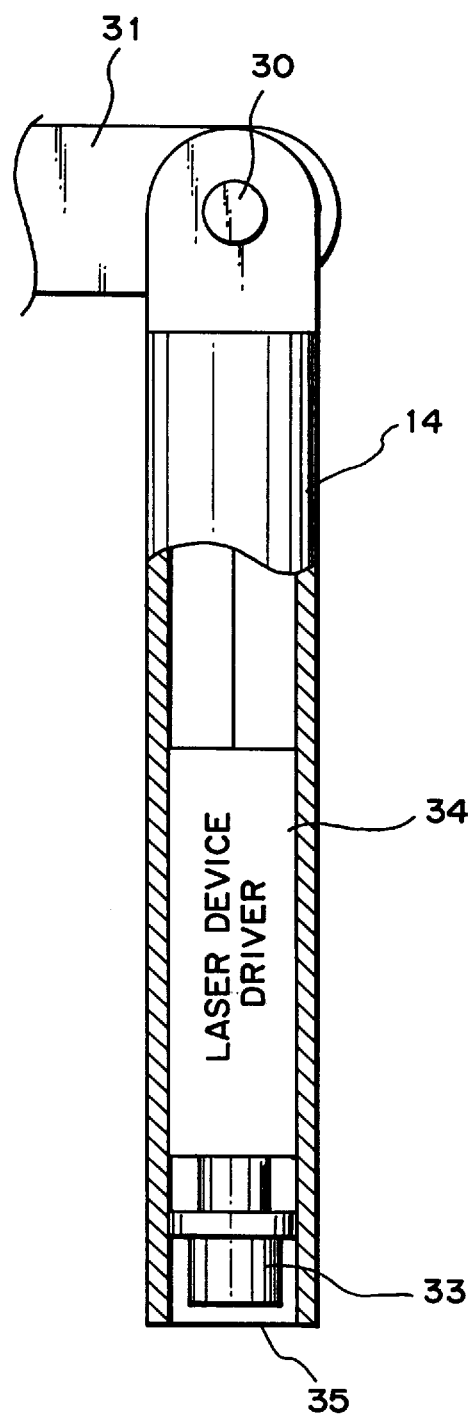
FIG. 3 is a cross-sectional view showing an illumination unit of the image sensing apparatus of the first embodiment.

FIG. 3 schematically shows the construction of the irradiation unit 14. In FIG. 3, numeral 33 denotes a laser device; and 34, a laser device driver for driving the laser device 33. The laser device 33, which is a general laser diode that emits visible light, is provided at the end portion 35 side in the irradiation unit 14. When the system controller 15 controls the laser device driver 34 in accordance with necessity, so that the laser device 33 emits light.

Note that the number of the laser device drivers 34 does not necessarily correspond to the number of the laser devices 33. For example, only one laser device driving circuit 34 may be provided for the four laser devices 33.

The amount of light (optical output) from the laser device 33 is variable, and is controlled by changing a current value for driving the laser devices 33. The current value when the apparatus main body is turned on (active) is called a first current value; the current value when a lighting device is turned on, a second current value. These values are stored in a memory (laser-device driving current value storage 153b in FIG. 11B) of the system controller 15.

The laser devices 33 emit light in correspondence with necessity, i.e., when the (main/sub) power source of the apparatus main body to be described later is turned on; when the zoom button is operated while the apparatus is at the original sensing position; when a zoom selection button is operated; when the camera head 9 and the pan base 10 are returned to the original sensing position; when a forced irradiation button is operated; and when a light amount adjustment button is operated.

Figure 4:
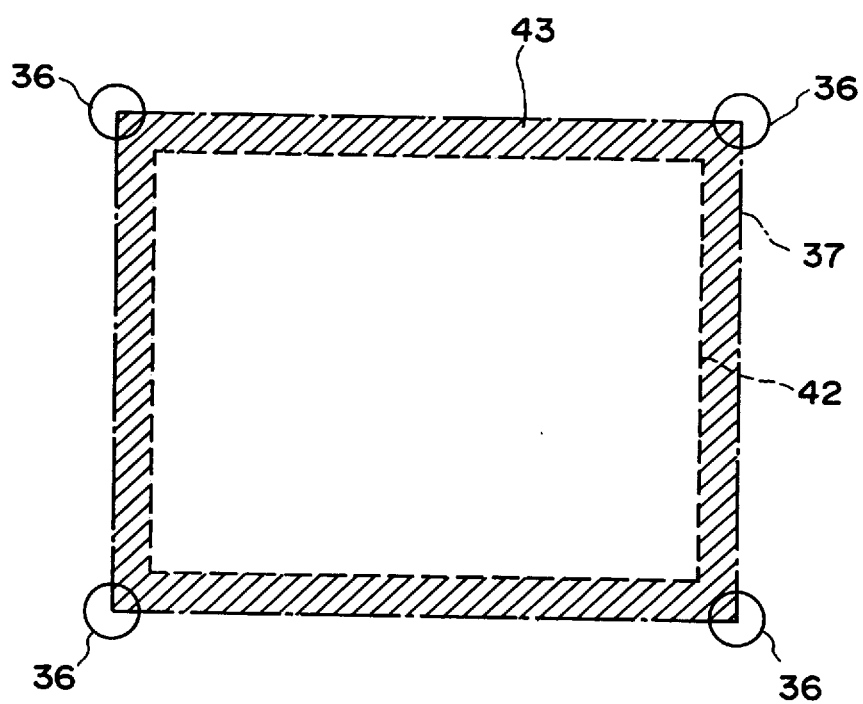
FIG. 4 is an explanatory view showing an image sensing area of the image sensing apparatus of the first embodiment.
Figure 5:
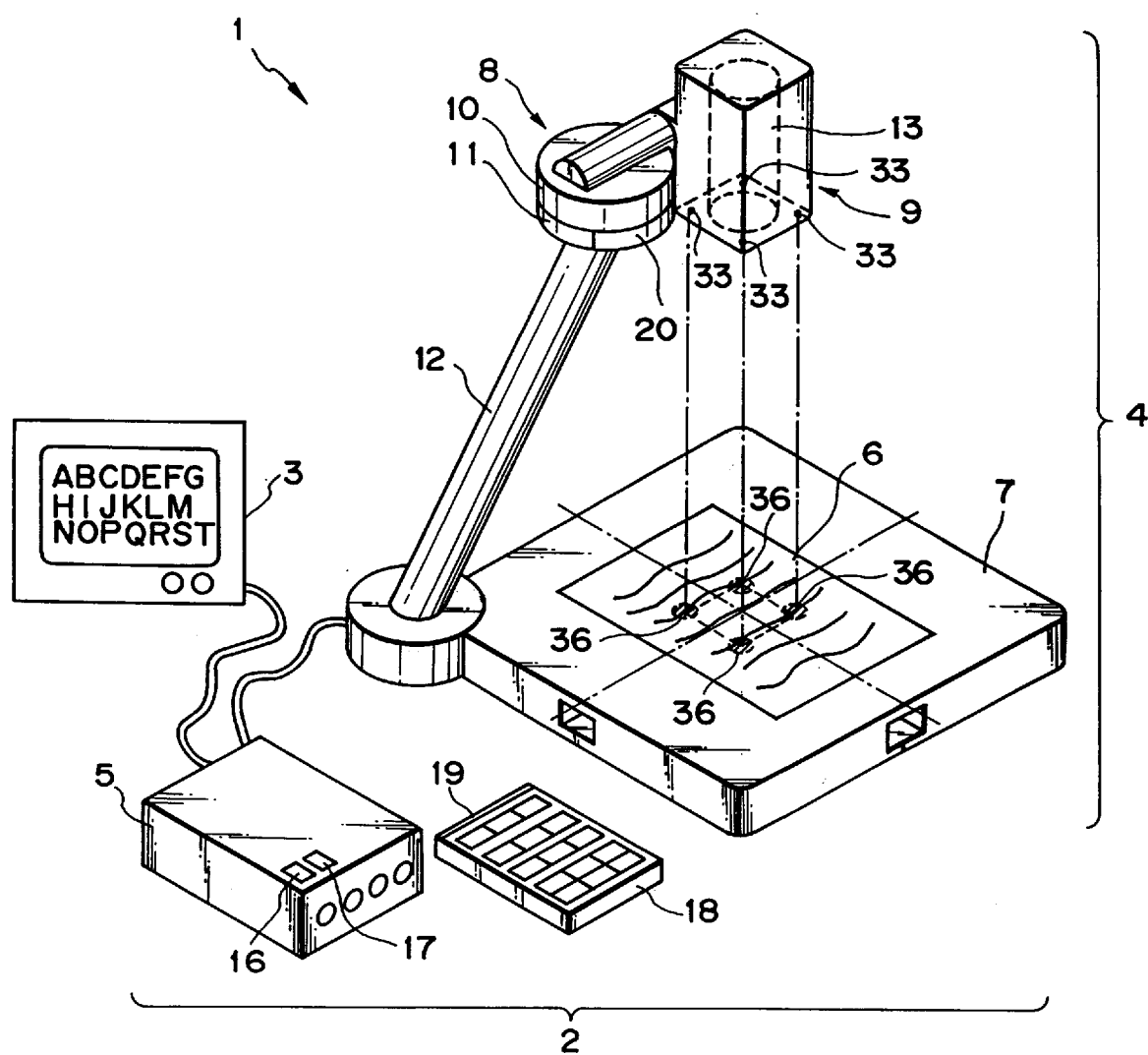
FIG. 5 is a perspective view showing the construction of the image sensing system of the first embodiment in a case where the image sensing apparatus is in a tele-end (position of a zoom ring when the focal distance of a zoom lens is the shorter) image sensing mode.
Figure 6A:
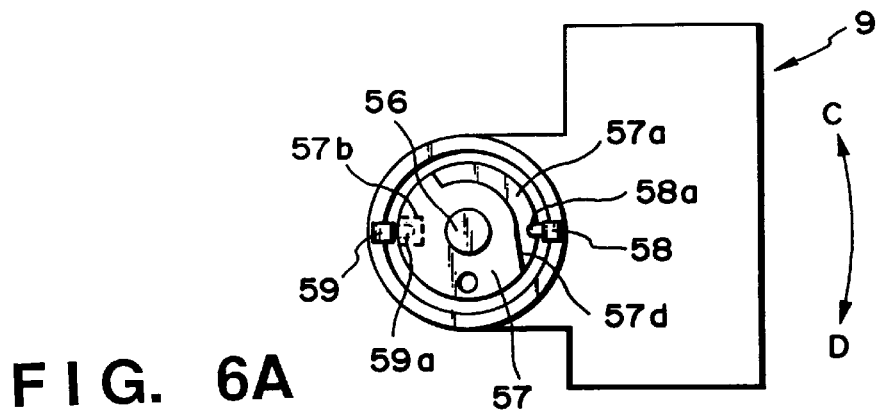
FIG. 6 comprised of FIGS. 6A–6C illustrates the construction and operation of the camera head of the image sensing apparatus of the first embodiment.
Figure 9:
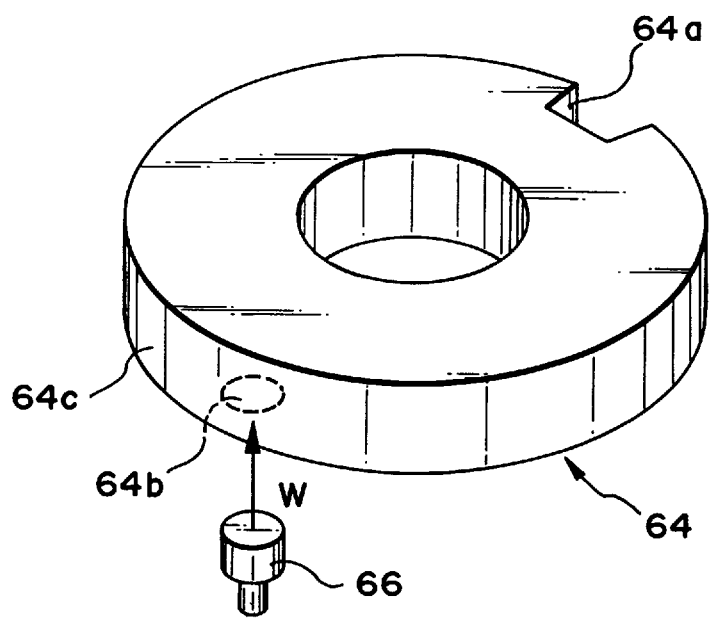
FIG. 9 is a perspective view showing a pan angle detecting cam of the camera head.
Figure 10:
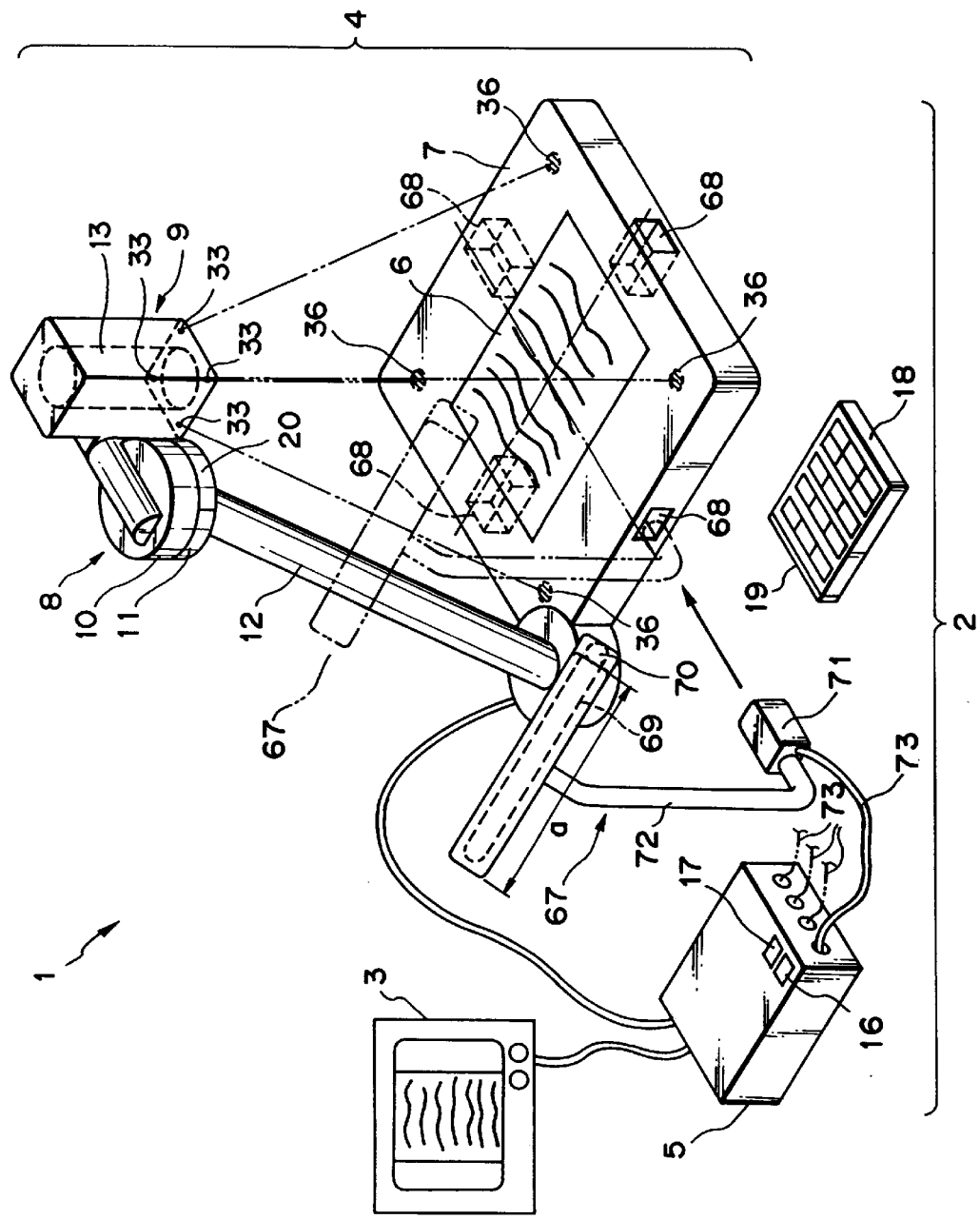
FIG. 10 is a perspective view showing a state where a lighting device is connected to the image sensing apparatus of the first embodiment.
Figure 11A:
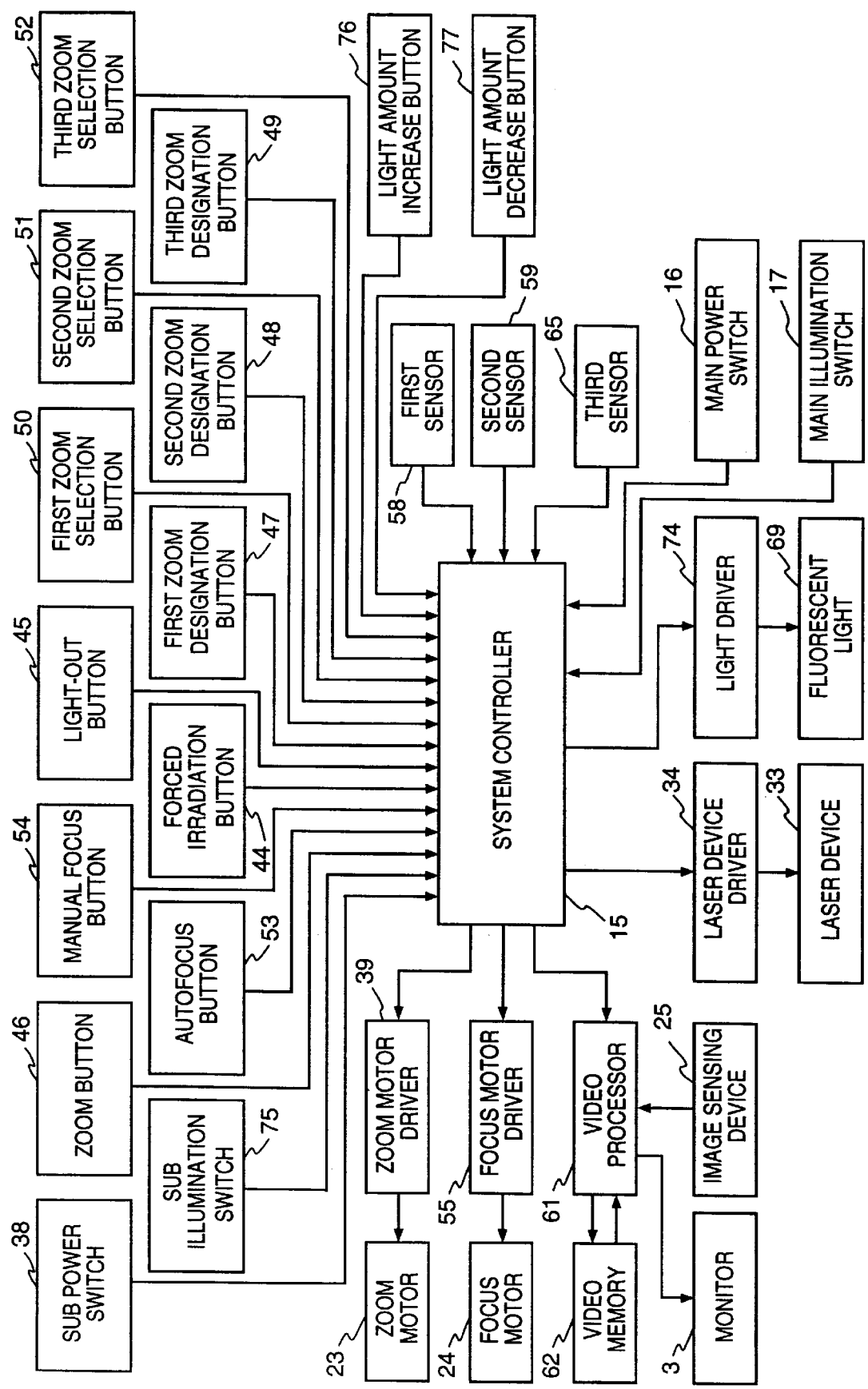
FIGS. 11A and 11B are block diagrams showing the construction of a control system in the image sensing apparatus.
Figure 11B:
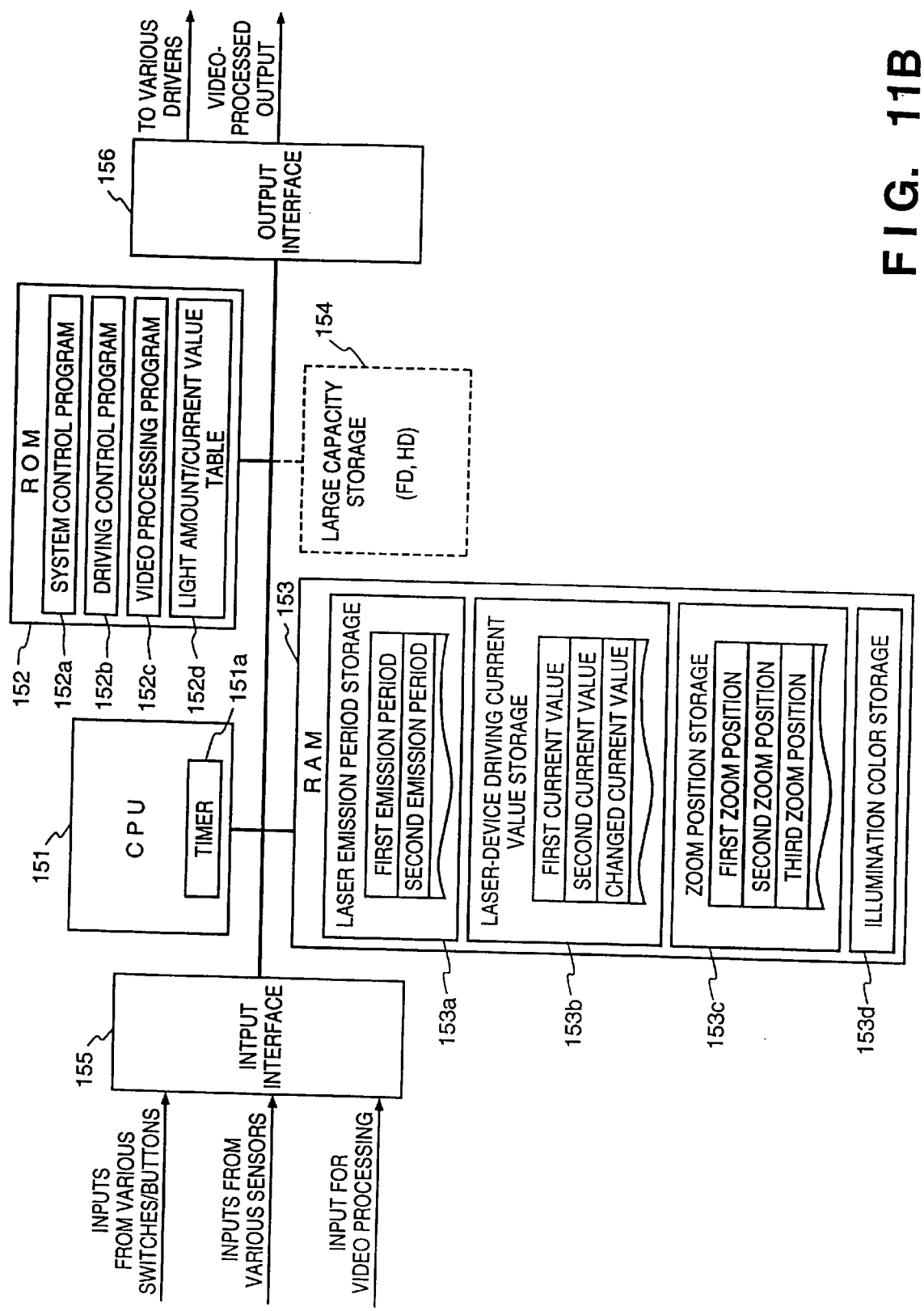
Figure 12:
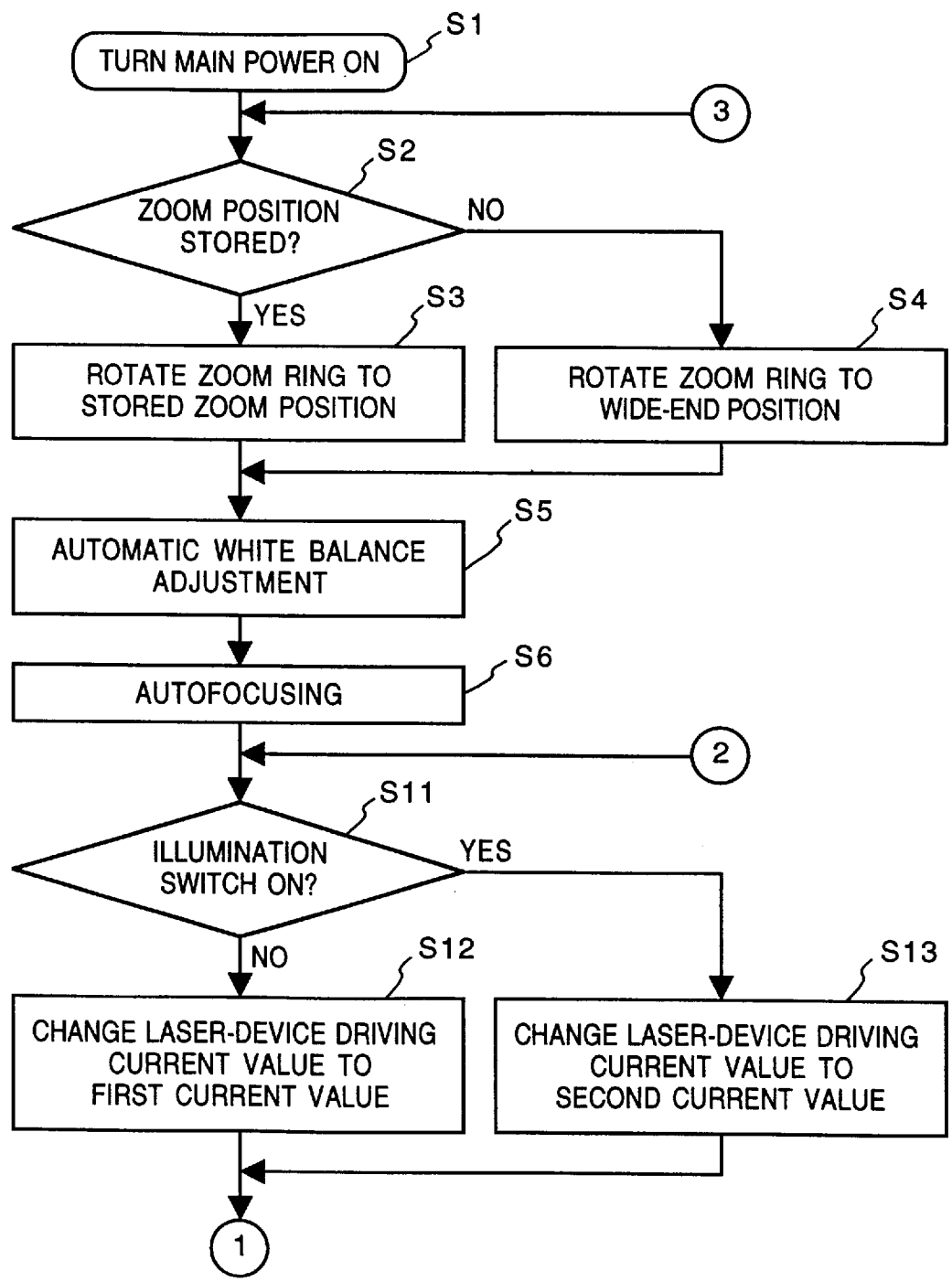
FIGS. 12 to 16 are flowcharts showing the operation procedure of the first embodiment.
Figure 13:
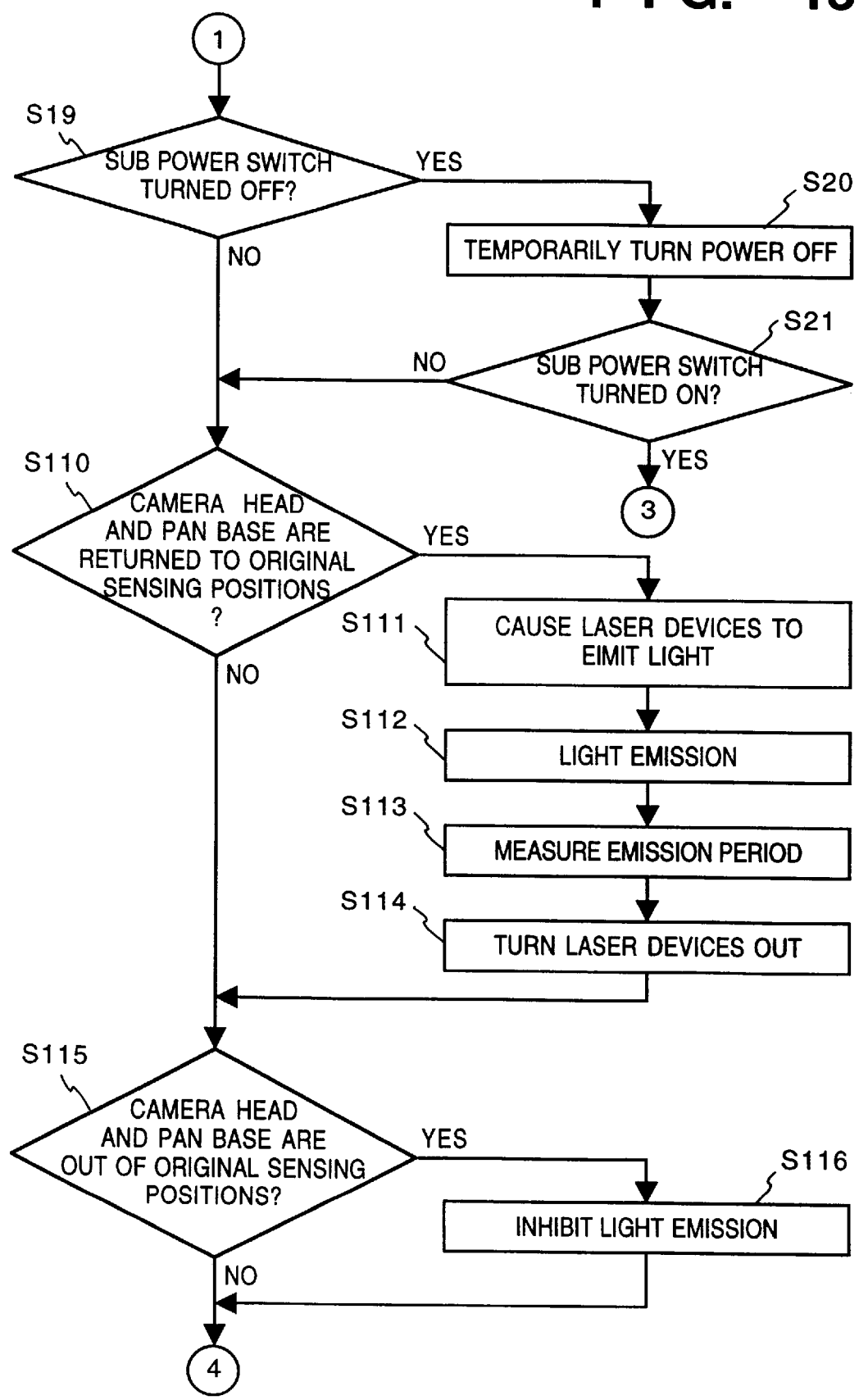
Figure 14:
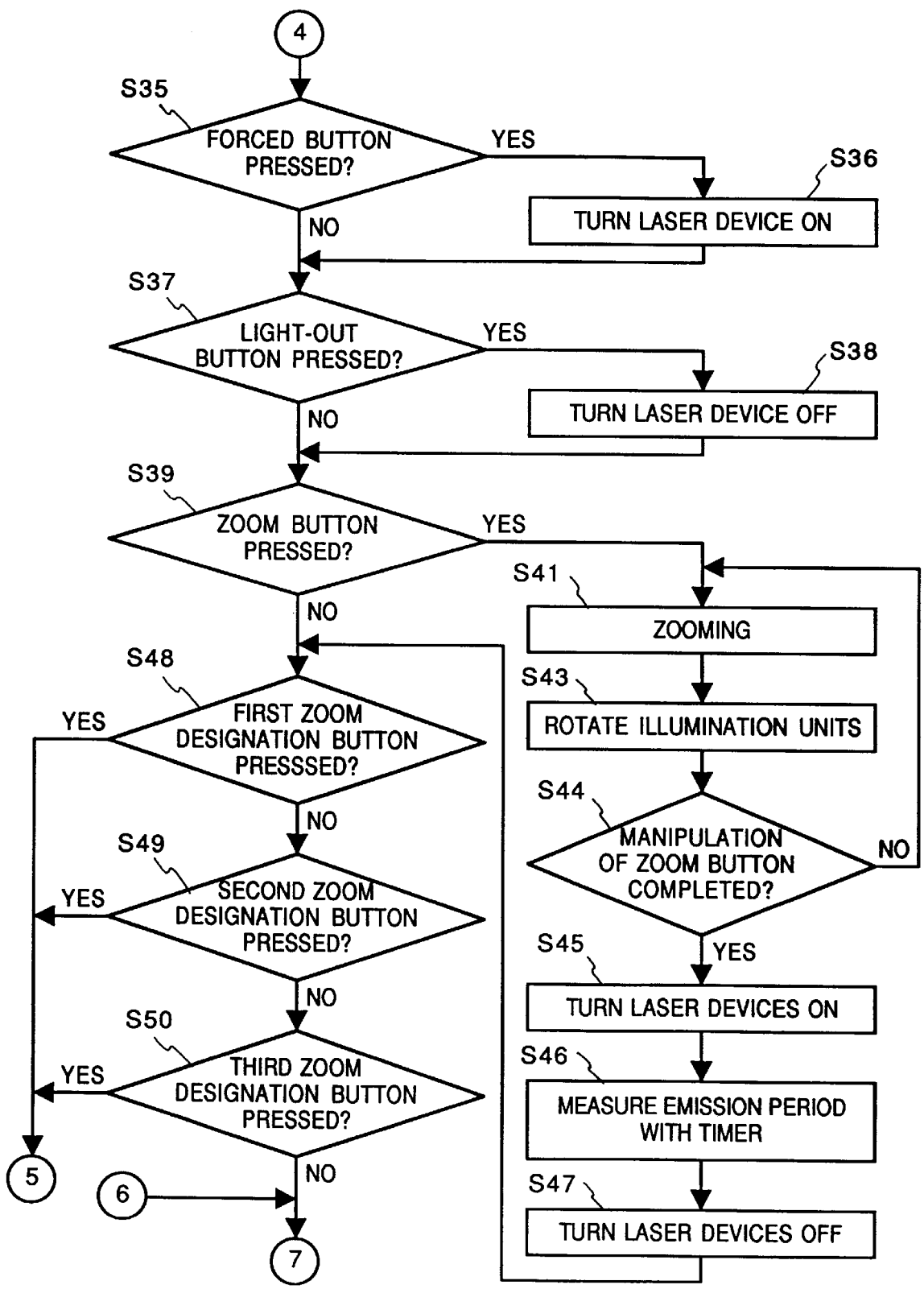
Figure 15:
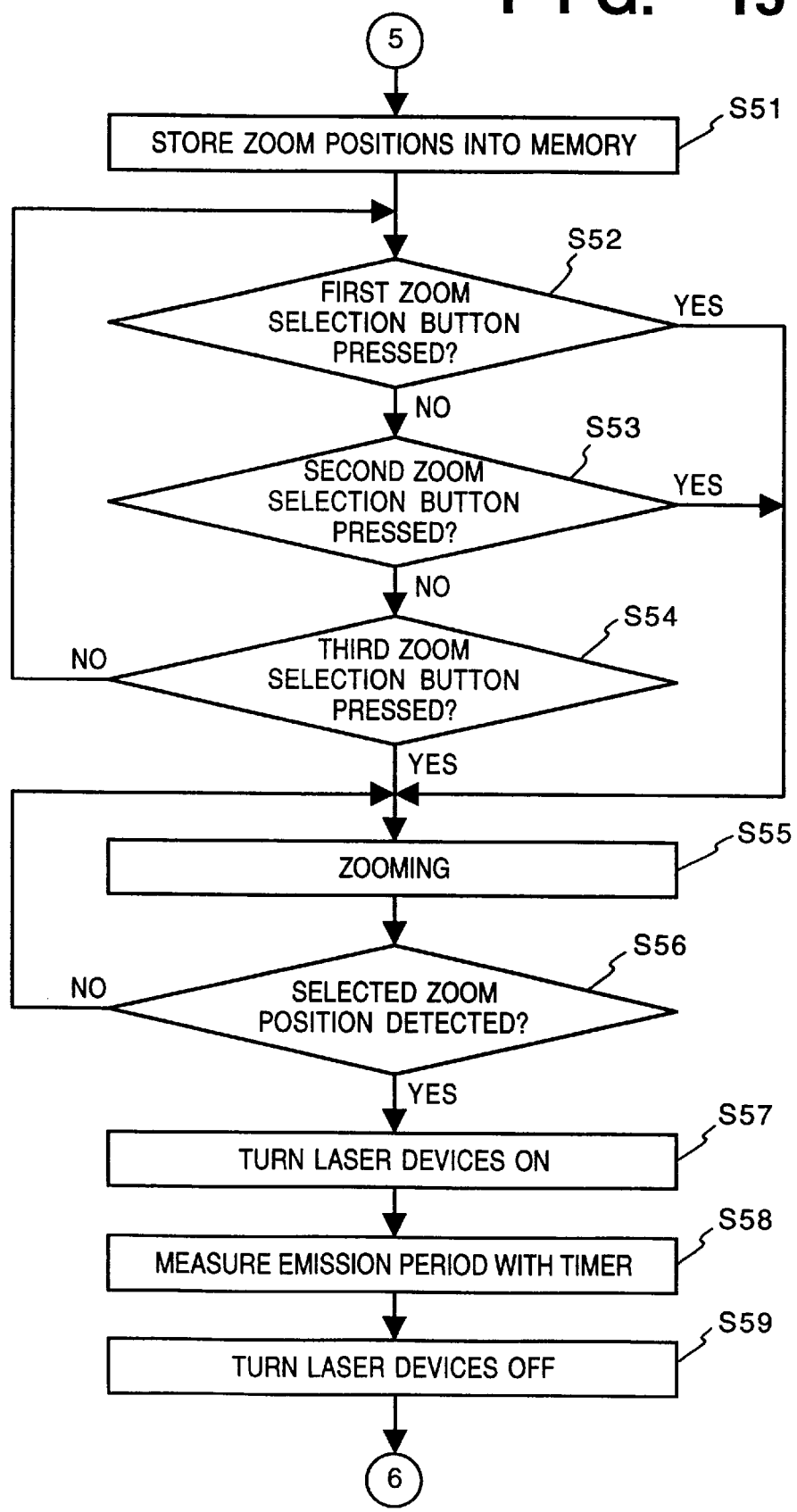

Next, the operation procedure when the image sensing apparatus 2 is at the original sensing position will be described with reference to FIGS. 1, 2, 4, 5 and 11 to 16. FIG. 4 shows an image sensing area; FIG. 5, the construction of the image sensing system 1 when the zoom ring 21 is at the tele-end position; FIG. 6, the construction and operation of the camera head 9; FIG. 7, the construction of an angle detection cam; FIG. 8, the construction and operation of the pan base 10; FIG. 9, the construction of a pan angle detection cam; FIG. 10, the construction of the image sensing system 1 with a lighting device; FIGS. 11A and 11B, the construction of the control system including the system controller 15; and FIGS. 12 to 16, the operation procedure of the present embodiment.

First, when the main power switch 16 at the controller 5 is turned on as shown in FIG. 1 (step S1), the system becomes capable of image-sensing, and the signal indicative of this status is transferred to the system controller 15. The system controller 15 controls the laser device drivers 34 so that the laser devices 33 emit light. The lights from the laser devices 33 are irradiated as four spot lights 36 on the base 7 (steps S110 to S114). When the power is on, it is considered that the image sensing apparatus 2 is returned to the original sensing position, and the light emission period by the laser devices 33 at this time is long. The laser devices 33 emit light with the first current value stored in the memory of the system controller 15. Note that the brightness on the base 7 is taken into consideration later. This allows a user to quickly confirm the image sensing area from a rectangular area 37 (alternate long and two short dashed line in FIG. 1) formed with the four spot lights 36.

The image sensing apparatus 2 has the sub power switch 38 at the wireless remote controller 18 (see FIG. 11A). The power of the image sensing apparatus 2 may be temporarily shut down by manipulating the sub power switch 38 when the main power switch 16 is on. The image-sensing status of the image sensing apparatus 2 can be restored by manipulating the sub power switch 38, and at this time, the laser devices 33 emit light (steps S19 to S21).

As shown in FIG. 11, the system controller 15 drives the zoom motor 23 by controlling a zoom motor driver 39 so as to set a field of view to a designated field of view with a zoom designation device to be described later (steps S2 to S4). Assuming that the zoom motor 23 rotates interlocking with the rotation of the zoom motor 23, i.e., the zoom ring 21 rotates in an arrow F direction in FIG. 2A, then, the contact pieces 32 of the illumination units 14 slide along the cam surfaces of the cams 29 of the zoom ring 21, and as shown in FIG. 2C, the end portions 35 of the illumination units 14 pivot in arrow G directions with the support axes 30 as the pivotal centers. Specifically, the end portions 35 respectively move on a line connecting the optical axis 41 of the camera lens 13 and the axis of the cylindrical irradiation unit 14. At this time, the end portions 35 of the illumination units 14 move with keeping the position corresponding to the width/length ratio of the image screen, 3:4.

Note that the illumination units 14 move in reversed directions when the zoom ring 21 rotates in a direction reversed from the arrow F direction in FIG. 2A.

The amount of rotation amount of the zoom ring 21 when it is at the tele-end position and the wide-end position is detected by a detection device (not shown), and a detection signal is transferred to the system controller 15, which then stops the rotation of the motor 23. As shown in FIG. 2C, when the zoom ring 21 is set to the wide-end position, the inclination of the illumination units 14 is the maximum. The emission by the laser devices 33 is turned off when a predetermined period has elapsed since the main power switch 16 or the sub power switch 38 of the apparatus main body 4 was turned on. The period of emission is set to be longer than at least the period (first emission period at a laser emission period storage 153a in FIG. 11B) where the zoom ring 21 rotates from the tele-end position to the wide-end position. This emission period is measured by a timer (151a in FIG. 11B) included in the system controller 15 (step S113). When the main power switch 16 and the sub power switch 38 of the apparatus main body 4 are turned on, white balance is automatically adjusted (step S5), and the base 7 or the original 6 on the base 7 is automatically brought into focus (step S6).

Next, the relation between the image sensing area indicated by the laser devices 33 and the image sensing area actually displayed on the image screen of the video monitor 3 will be described with reference to FIG. 4. In FIG. 4, numeral 37 denotes a rectangular image sensing area (alternate long and two short dashed line) formed with the four spot lights 36; and 42, an image sensing area (broken line) actually displayed on the image screen of the video monitor 3. Both areas have a 3:4 width/length ratio. The image sensing area 37 indicated by the spot lights 36 is larger than the actual image sensing area 42 so that the spot lights 36 are included in the image on the image screen of the video monitor 3 on image-sensing an object. Note that the relation between the image sensing areas 36 and 37 is maintained at any zoom position. This relation produces a non-displayed portion 43 (hatched portion) which is not displayed on the image screen of the video monitor 3 at four sides of the image sensing area 37 indicated by the four spot lights 36. The size of the non-displayed portion 43 may change depending on the type of the video monitor 3.

It is desirable that the image sensing area 37 indicated by the spot lights 36 is larger than the image sensing area 42 so that the spot lights 36 are not included in the image on the image screen of the video monitor 3, as shown in FIG. 4, however, if there is no problem in displaying the spot lights 36, the size of the image sensing area 37 may be the same or somewhat smaller than that of the image sensing area 42.

Returning to FIG. 1, the user places the original 6 on the base 7. The user places the original 6 onto an appropriate position, guessed from the four spot lights 36. Thus, an image of the original 6 is displayed on the image screen of the video monitor 3. If the spot lights 36 have disappeared before the original 6 is placed on the base 7, the user may press a forced irradiation button 44 (FIG. 11A) of the wireless remote controller 18. Then, the instruction signal is transmitted to the system controller 15, and the system controller 15 controls the laser device drivers 34 to cause the laser devices 33 to emit light.

The wireless remote controller 18 has a light-out button 45 (FIG. 11A) for forcibly turning off the laser devices 33. The laser devices 33, which have started light emission by the pressing of the forced irradiation button 44, continue to emit light until the light-out button 45 is pressed (steps S35 and S36). As shown in FIG. 11B, when the user presses the light-out button 45, the signal instructing forced light-out is transmitted to the system controller 15, and the system controller 15 controls the laser device drivers 34 to stop the laser devices 33 (steps S37 and S38). The light-out button 45 is used for turning off the laser devices 33 which emit light in other cases than in the above case where they emit light by the pressing of the forced irradiation button 44.

If necessary, the user may change the size (field of view) of the image of the original 6 displayed on the image screen of the video monitor 3 by manipulating a zoom button 46 (FIG. 11A) of the wireless remote controller 18. When the zoom button 46 is manipulated, the signal indicating the operation is transmitted to the system controller 15, and the system controller 15 controls the laser device drivers 34 to cause the laser devices 33 to emit light (step S39 to S47).

For example, when the zoom ring 21 is rotated from the wide-end position as shown in FIG. 1 to the tele-end position, the four spot lights 36 irradiated on the base 7 move in arrow H directions toward the optical axis 41, by the construction of the camera lens 13 as described above. Thus, an image sensing area can be confirmed at any zoom position. Further, when the zoom ring 21 is rotated from the tele-end position to the wide-end position, the spot lights 36 move in reversed directions away from the optical axis 41.

In FIG. 5 where the zoom ring 21 is at the tele-end position, the image sensing area is indicated by the four spot lights 36, and the area is enlarged and displayed on the image screen of the video monitor 3. As the enlarged portion of the original 6 is clearly indicated by the spot lights 36, the user can move the original 6 so that the desired portion to be enlarged is included within the image sensing area. Further, as the spot lights 36 irradiated from the camera head above the base 7 are not hidden with the original 6, the image sensing area can be indicated regardless of the size of the original 6.

The user may only see the apparatus main body 4 to know the image-sensed portion of the base 7 without seeing the image screen of the video monitor 3, by virtue of the indication of the image sensing area with the spot lights 36. The laser devices 33 are automatically turned off after a predetermined period (steps S45 to S47). The period of light emission (second emission period at the laser emission period storage 153a in FIG. 11B) in a case where the zoom button 46 is manipulated is shorter than the period when the power of the apparatus main body is turned on. This emission period is measured by the timer included in the system controller 15, similar to the case where the power of the apparatus main body is turned on. Note that the second emission period may be set to be the same as the first emission period.

The image sensing apparatus 2 has a zoom position designation device for selecting the most appropriate zoom position quickly. The wireless remote controller 18 has three designation buttons for designating a zoom position and three selection buttons for selecting one of the designated zoom positions. The three zoom positions are stored in the memory (zoom position storage 153c in FIG. 11B) of the system controller 15 (step S48 to S51).

For example, let the zoom position as shown in FIG. 1 to be a first zoom position, the zoom position as shown in FIG. 5 to be a second zoom position, and the zoom position intermediate between the first and second zoom positions to be a third zoom position. First, the zoom button 46 is manipulated to move the zoom position to the wide-end position. In this state, if a first zoom designation button 47 (FIG. 11A) of the wireless remote controller 18 is pressed, the signal designating the first zoom position is transmitted to the system controller 15, and the position of the zoom motor 23 is stored in the memory of the system controller 15. Similarly, if a second zoom designation button 48 and a third zoom designation button 49 (both in FIG. 11A) are pressed, the respective zoom positions are stored in the memory of the system controller 15.

After the respective zoom positions are designated, when a first zoom selection button 50 (FIG. 11A) is pressed (step S52), the signal indicative of the selection is transmitted to the system controller 15, and the system controller 15 controls the zoom motor driver 39 to drive the zoom motor 23 to rotate the zoom ring 21 so that the zoom ring 21 moves to the first zoom position designated using the first zoom designation button 47 (steps S55 and S56). Note that mechanical, optical and electrical techniques for detecting a zoom position are known. For example, a zoom position may be detected with a variable resistance to be described later.

A second zoom selection button 51 (FIG. 11A) is used in correspondence with the zoom position designated with the second zoom designation button 48 (step S53), and a third zoom selection button 52 (FIG. 11A) is used in correspondence with the zoom position designated with the third zoom designation button 49 (step S54). After the first to third zoom selection buttons 50 to 52 are operated, the selection signals are transmitted to the system controller 15, and the system controller 15 controls the laser device drivers 34 to cause the laser devices 33 to emit light (steps S57 to S59). Similar to the case where the zoom button 46 is manipulated, the light emission by the laser devices 33 is automatically turned out after a predetermined period. The light emission period at this time is the same as the second emission period, and the emission period is also measured by the timer included in the system controller 15.

Note that the zoom positions designated with the first to third zoom designation buttons 47 to 49 are not changed or deleted unless zoom designation operation is made again. When the main power switch 16 and the sub power switch 38 of the apparatus main body 4 are turned on, the zoom position of the camera lens 13 is automatically set to the position designated with the first zoom designation button (step S3).

It should be noted that the number of the zoom positions is not limited to three.

As shown in FIG. 11A, the wireless remote controller 18 further has an autofocus button 53 and a manual focus button 54, for autofocusing or manual focusing if necessary (steps S60 to S63). When the autofocus button 53 or the manual focus button 54 is pressed, an operation signal is transmitted to the system controller 15, and the system controller 15 controls the focus motor driver 55 to drive the focus motor 24, which rotates the focus ring 22 by an appropriate amount. If the autofocus button 53 is pressed, focusing is automatically made, while if the manual focus button 54 is pressed, an appropriate focusing can be obtained by manual operation.

The image sensing apparatus 2 can be used as a camera for image-sensing, e.g., a large panel on a wall for image-sensing attendants in a simple teleconference, as well as image-sensing the document 6 on the base 7, by rotating the camera head 9 and the pan base 10 by predetermined amounts, as described above. Further, in this embodiment, the camera head 9 and the pan base 10 are manually rotated, however, a driving device may be added for automatic rotation.

Next, the rotation of the camera head 9 will be described with reference FIGS. 6, 7 and 11. FIGS. 6A to 6C show the rotational mechanism of the camera head 9 viewed from an arrow U direction in FIG. 1. In FIG. 6A, the position of the camera head 9 is the original sensing position. FIG. 7 shows the construction of an angle detection cam.

The camera head 9 is attached to a fixed shaft 56 rotatably within a predetermined range in arrow C and D directions. Numeral 57 denotes the angle detection cam, fixed to the camera head 9 and rotates with the camera head 9 around the shaft 56, for detecting a rotation angle of the camera head 9. As shown in FIG. 7, the angle detection cam 57 has a two-part structure. That is, the angle detection portion 57 comprises two cylindrical cams of different shapes, 57a for image rotation to be described later and 57b for detecting the original sensing position of the camera head 9. Further, an engaging hole 57c, having a predetermined diameter and a predetermined depth, is provided on a side surface of the angle detection cam 57 on the pan base 10 side.

Numeral 58 denotes a first sensor for detecting an image rotation position; and 59, a second sensor for detecting a rotation position of the camera head 9. The first sensor 58 is located at a position corresponding to the image rotation portion 57a, and the second sensor 59 is located at a position corresponding to the original-sensing-position detection portion 57b, on the adjacent radius around the shaft 56. The first and second sensors 58 and 59 respectively have switches 58a and 59a which expand and contract, and these sensors make on/off detection from the positions of the expansion and contraction switches 58a and 59a. Further, the first and second sensors 58 and 59 are fixed on the shaft 56, and on/off switching is possible by the rotation of the angle detection cam 57.

When the camera head 9 is located at the original sensing position as shown in FIG. 6A, the switch 59a of the second sensor 59 is at the original-sensing-position detection portion 57b, and a detection signal indicative of off-status of the switch is transmitted to the system controller 15. The switch 58a of the first sensor 58 is at the image rotation portion 57a, and a detection signal also indicative of off-status is transmitted to the system controller 15.

As shown in FIG. 7, in this state, an engaging pin 60 biased by a spring (not shown) in an arrow V direction to the angle detection cam 57 is inserted into the engaging hole 57c of the angle detection cam 57, thus locks the camera head 9 at this position with a predetermined force. When the camera head 9 in this state is rotated in the arrow C or D direction, the engaging pin 60 is moved against the biasing force of the spring, in a direction opposite to the arrow V direction, out of the engaging hole 57c. Note that this rotation can be easily made by manual operation.

When the camera head 9 is rotated in the arrow C direction, the angle detection cam 57 rotates with the camera head 9 in the same direction. Then the switch 59a of the second sensor 59 is positioned from the original-sensing-position detection portion 57b onto the peripheral surface of the angle detection cam 57, thus pushed by the peripheral surface of the cam 57 and turned on. The status of the detection signal of the second sensor 59 becomes on. The detection signal is transferred to the system controller 15 as shown in FIG. 11A, and the system controller 15 issues an inhibition instruction to stop signal transfer to the laser device driver 34. That is, when the position of the camera head 9 is not in the original sensing position, the laser devices 33 do not emit light (steps S115 and S116).

Next, the switch 58a of the first sensor 58 is moved from the image rotation portion 57a, gradually onto the peripheral surface of a slope 57d of the angle detection cam 57, and turned on. As shown in FIG. 11A, the signal indicative of on-status of the switch is transferred via the system controller 15 to a video processor 61 which receives a video signal from the image sensing device 25. The video processor 61 transfers the video signal to a video memory 62 (FIG. 11A) to rotate an image represented by the video signal upside down and outputs the signal to the video monitor 3. When the camera head 9 is at the original sensing position, the switch 59a of the second sensor 59 is at the original-sensing-position detection portion 57b, and the detection signal indicative of the off-status of the switch is transferred to the system controller 15.

When the switch 58a of the first sensor 58 is at the image rotation portion 57a, the detection signal indicative of the off-status of the switch is transferred to the system controller 15. In this state, as shown in FIG. 7, the engaging pin 60 is inserted in the engaging hole 57c of the angle detection cam 57, thus locks the camera head 9 at this position with a predetermined force. When the camera head 9 in this state is rotated in the arrow C or arrow D direction, the engaging pin 60 is moved against the biasing force of the spring, in the direction opposite to the arrow V, out of the engaging hole 57c. This rotation can be easily made by manual operation.

When the camera head 9 is rotated in the arrow C direction, the angle detection cam 57 rotates with the camera head 9 in the same direction. Then the switch 59a of the second sensor 59 is positioned from the original-sensing-position detection portion 57b onto the peripheral surface of the angle detection cam 57, thus pushed by the peripheral surface of the cam 57 and turned on. The status of the detection signal of the second sensor 59 becomes on. The detection signal is transferred to the system controller 15 as shown in FIG. 11A, and the system controller 15 issues an inhibition instruction to stop signal transfer to the laser device driver 34. That is, when the position of the camera head 9 is without the original sensing position, the laser devices 33 do not emit light (steps S115 and S116).

Next, the switch 58a of the first sensor 58 is moved from the image rotation portion 57a, gradually onto the peripheral surface of a slope 57d of the angle detection cam 57, and turned on. As shown in FIG. 11A, the signal indicative of on-status of the switch is transferred via the system controller 15 to a video processor 61 which receives a video signal from the image sensing device 25. The video processor 61 transfers the video signal to a video memory 62 (FIG. 11A) to rotate an image represented by the video signal upside down and outputs the signal to the video monitor 3. This image rotation is made because when the camera head 9 is rotated to the front side of the apparatus main body 4, an image displayed on the image screen of the video monitor is upside down.

Figure 6B:
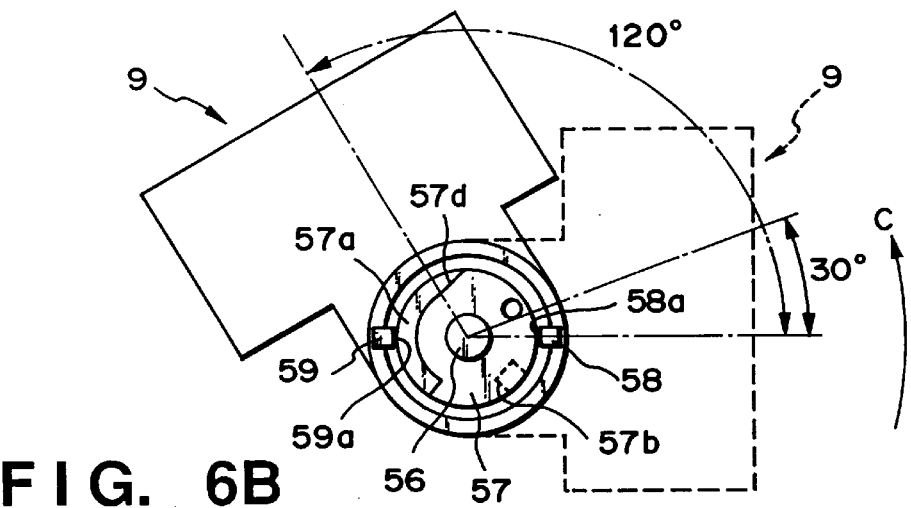
Figure 7:
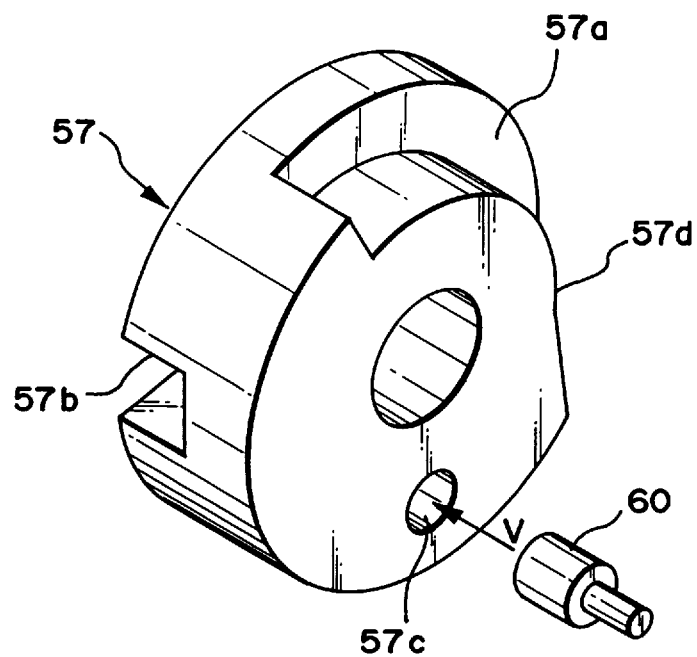
FIG. 7 is a perspective view showing an angle detecting cam of the camera head.

As shown in FIG. 6B, the camera head 9 can be rotated in the arrow C direction up to about the maximum 120°, and the rotation angle is regulated by a stopper (not shown).

A 180° rotation of an image to be outputted to the video monitor 3 is made when the camera head 9 is rotated by about 30° in the arrow C direction from the position shown in FIG. 6A.

Next, the operation upon rotation of the camera head 9 in the arrow D direction in FIG. 6A will be described.

First, the switch 59a of the second sensor 59 is moved from the original-sensing-position detection portion 57b and pushed to be turned on, the detection signal goes on. As shown in FIG. 11A, the signal is transferred to the system controller 15, and the system controller 15 controls the laser device drivers 34 to inhibit light emission by the laser devices 33 (steps S115 and S116). This inhibition is made in a similar manner to the case where the camera head 9 is rotated in the arrow C direction.

Figure 6C:
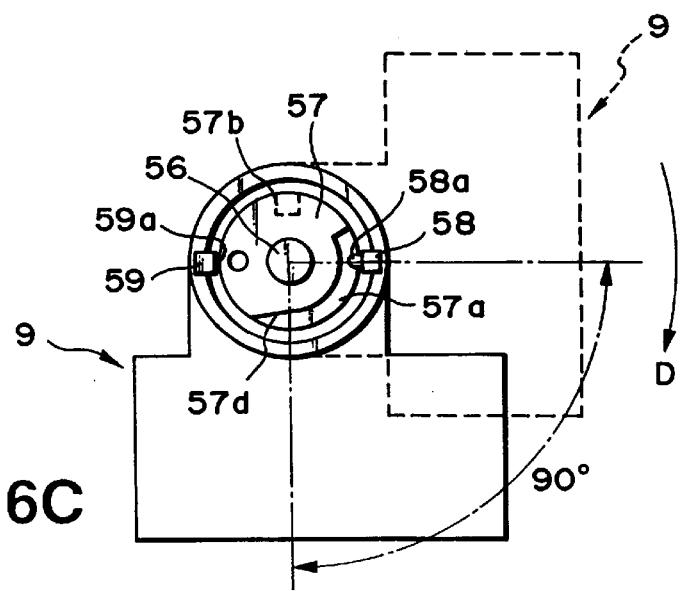

As shown in FIG. 6C, the camera head 9 can be rotated up to about the maximum 90°, and the rotation is regulated by a stopper (not shown).

Within a range (about 90°) from the position of the camera head 9 as shown in FIG. 6A (original sensing position) to the position as shown in FIG. 6C where the camera head 9 has been rotated in the arrow D direction from the former position, the switch 58a of the first sensor 58 is at the image rotation portion 57a, and a video signal from the image sensing device 25 is outputted to the video monitor 3 through the video processor 61, i.e., the video monitor 3 displays an image based on image data inputted by the image sensing device 25 without processing.

Next, the rotation of the pan base 10 will be described with reference to FIGS. 8, 9 and 11.

Figure 8A:
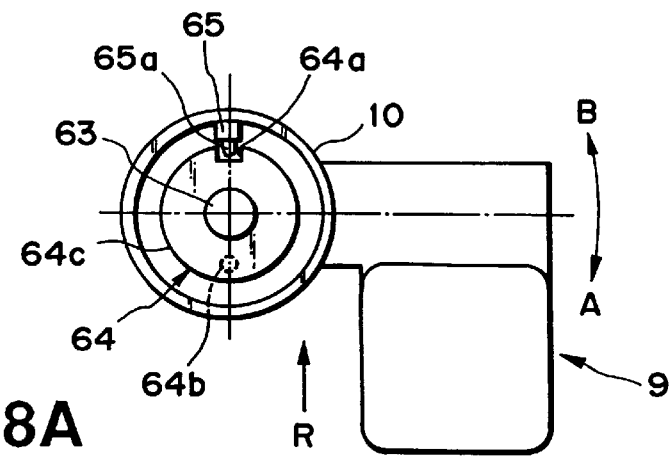
FIG. 8 comprised of FIGS. 8A–8C illustrates the construction and operation of a pan base of the image sensing apparatus of the first embodiment.
Figure 8B:
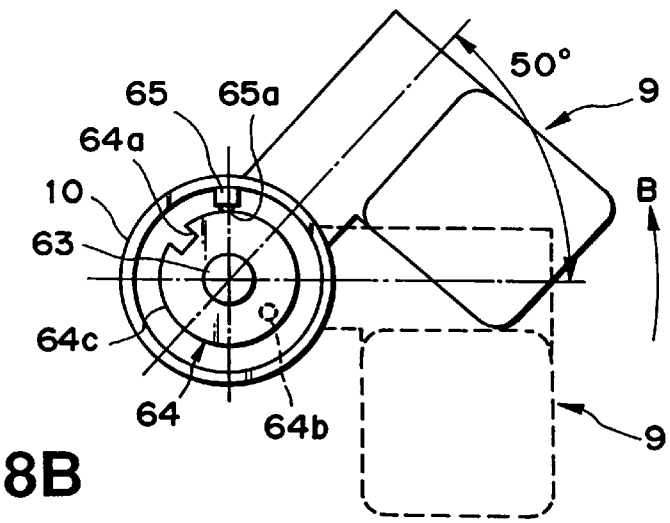
Figure 8C:
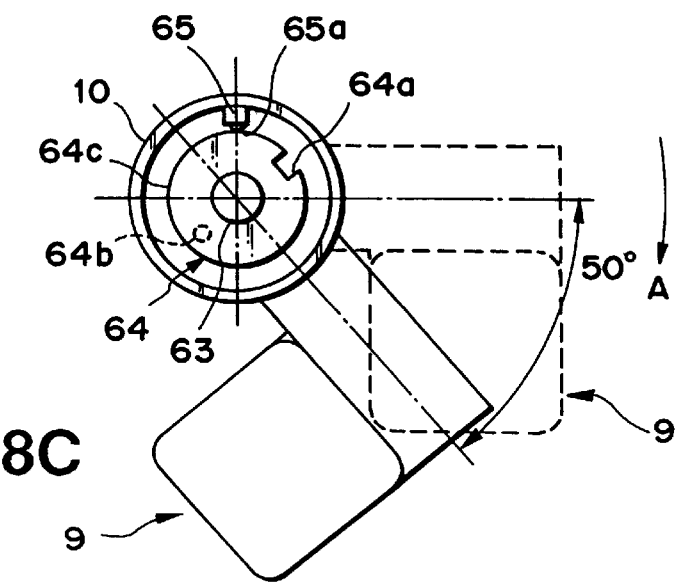

FIGS. 8A to 8C show the camera head 9 and the pan base 10 viewed from an arrow T direction in FIG. 1. FIG. 9 shows the construction of a pan angle detection cam. FIG. 8A is a schematic plan view showing the camera head 9 and the pan base 10 at the original sensing positions. In FIG. 8A, an arrow R indicates a direction viewing the apparatus from the front direction of the apparatus main body 4.

The pan base 10 is supported at its axis rotatably within a predetermined range in arrow A and B directions with respect to a pan shaft 63 provided on the support base 11 integrally with the pan base 10. Numeral 64 denotes the pan angle detection cam for detecting the original sensing position of the pan base 10; and 65, a third sensor.

As shown in FIG. 9, the cylindrical pan angle detection cam 64 has a detection portion 64a on a part of the peripheral surface of the pan angle detection cam, and an engaging hole 64b having a predetermined diameter and a hole depth on a side surface of the cam on the support base 11 side. The third sensor 65 has an expansion and contraction switch 65a for on/off detection. The third sensor 65 is fixed with the support base 11, and makes on/off detection using the shape of the pan angle detection cam 64.

When the pan base 10 is located at the original sensing position as shown in FIG. 8A, the switch 65a of the third sensor 65 is at the detection portion 64a of the pan angle detection cam 64, and a detection signal indicative of off-status of the switch is transferred to the system controller 15. As shown in FIG. 9, in this state, an engaging pin 66 biased in an arrow W direction (direction toward pan angle detection cam 64) by a spring (not shown) is inserted in the engaging hole 64b of the pan angle detection cam 64, thus locks the pan base 10 at this position with a predetermined force. When the pan base 10 in this state is rotated in the arrow A or arrow B direction, the engaging pin 66 is moved against the biasing force in a direction opposite to the arrow W direction, out of the engaging hole 64b. This rotation can be easily made by manual operation.

When the pan base 10 is rotated in the arrow B direction, the pan angle detection cam 64 rotates with the pan base 10 in the same direction. Then, the switch 65a of the third sensor 65 is moved from the detection portion 64a, gradually onto the peripheral surface of the pan angle detection cam 64, and the status of the detection signal goes on. As shown in FIG. 11A, the signal is transferred to the system controller 15, and the system controller 15 controls the laser device drivers 34 to inhibit light emission by the laser devices 33 (steps S115 and S116). Note that the inhibition is also made when the pan base 10 is rotated in the arrow A direction.

As shown in FIG. 8B, the pan base 10 can be rotated from the original sensing position as shown in FIG. 8A in the arrow B direction up to about 50°, and the rotation is regulated by a stopper (not shown). Similarly, the pan base 10 can be rotated from the original sensing position in the arrow A direction up to about 50°, and the rotation is regulated by a stopper (not shown).

As described above, the original sensing position of the camera head 9 and that of the pan base 10 are respectively detected by the second sensor 59 and the third sensor 65. When the camera head 9 and the pan base 10 are at the original sensing positions, the system controller 15 inhibits light emission by the laser devices 33.

When the camera head 9 and the pan base 10 are returned to the original sensing positions from other positions, i.e., the statuses of detection signals of the second sensor 59 and the third sensor 65 go on, as shown in FIG. 11A, the signals are transferred to the system controller 15, and the system controller 15 controls the laser device drivers 34 to cause the laser devices 33 to emit light (steps S110 to S114).

At this time, the light emission by the laser devices 33 is automatically stopped when a predetermined period has elapsed since the statuses of the detection signals from the second sensor 59 and the third sensor 65 went off. The emission period is set to be the same as the emission period in the case where the zoom button 46 is operated. Further, the emission period is measured by the timer of the system controller 15 similar to the case of the operating the zoom button 46.

Note that the on/off control of the second sensor 59 and the third sensor 65 is not limited to the above control. In addition, the second and third sensors 59 and 65 may be replaced with optical devices to attain similar detection.

Note that a lighting device can be attached to the image sensing apparatus 2 in a case where the brightness around the apparatus main body 4 is low and it is difficult to see an object such as the original 6 displayed on the image screen of the video monitor 3.

FIG. 10 shows the state where the lighting device is attached to the image sensing apparatus 2. In FIG. 10, numeral 67 denotes a lighting device; and 68, fixing holes respectively provided on the four side surfaces of the base 7. The lighting device 67 comprises a reflection shade 70 having a fluorescent light 69 and an arm 72, fixed on the base member 71, supporting the reflection shade 70. The reflection shade 70 has a length α somewhat shorter than that of one side of the base 7. The arm 72 supports the central portion of the reflection shade 70. A signal cable 73, for drive control, from the base member 71 is connected to the controller 5 of the image sensing apparatus 2. The lighting device 67 is attached to the image sensing apparatus 2 by inserting the base member 71 into one of the engaging holes 68.

The user can change the position of the lighting device 67 or the number of the illumination devices in accordance with the light amount or unevenness in illumination on the original 6 as the object. In this construction, the maximum number of the illumination devices is four, and the controller 5 is connectable with four signal cables 73.

The lighting device 67 is switched on/off by manipulating a main illumination switch 17 provided on the controller 5. When the main illumination switch 17 is manipulated, as shown in FIG. 11, the operation signal is transferred to the system controller 15, which controls a illumination driver 74 to turn the fluorescent light 69 of the lighting device 67 on. At the same time, the system controller 15 changes a first current value for driving the laser devices 33 to the second current value, higher than the first current value by a predetermined value, stored in the memory (steps S11 to S13).

As described above, the system controller 15 changes the current values for driving the laser devices 33 in accordance with on/off status of the fluorescent light 69. The current value when the fluorescent light 69 is turned on is larger than the current value when the fluorescent light 69 is turned off.

The image sensing apparatus 2 also has a sub illumination switch 75 on the wireless remote controller 18 (FIG. 11A). When the main illumination switch 17 is turned on, the user can turn on/off the fluorescent light 69 by manipulating the sub illumination switch 75 at the wireless remote controller 18. When the fluorescent light 69 is turned on by the manipulation of the sub illumination switch 75, the system controller 15 also changes the first laser-device driving current value to the second current value higher than the first current value by a predetermined value.

Note that the lighting device 67 is supplied with power from the power source of the apparatus main body 4, therefore, the lighting device 67 is activated only when the power of the apparatus main body 4 is turned on.

In a case where the fluorescent light 69 of the lighting device 67 is turned on, and the camera head 9 and the pan base 10 are at the original sensing positions, when the laser devices 33 are turned on, the amount of light of the spot lights irradiated on the base 7 is larger than that in a case where the fluorescent light 69 is turned off. This prevents the spot lights 36 from becoming inconspicuous due to the light from the fluorescent light 69.

Further, the image sensing apparatus 2 can adjust the amount of light of the laser devices 33 by manipulating a button provided on the wireless remote controller 18. That is, the wireless remote controller 18 has a light amount increase button 76 and a light amount decrease button 77 at adjacent positions. To increase the light amount of the spot lights 36 on the base 7, the user may manipulate the light amount increase button 76, while to decrease the light amount of the spot lights 36, the user may manipulate the light amount decrease button 77.

The light amount of the spot lights 36 is changed by changing the laser-device driving current value to a first or second current value in accordance with the on/off status of the lighting device 67. When the light amount increasing button 76 or the light amount decrease button 77 is manipulated, the laser-device driving current value is increased or decreased based with the first current value or the second current value as a reference value.

As shown in FIG. 11A, when the light amount increase button 76 or the light amount decrease button 77 is manipulated, the operation signal is transmitted to the system controller 15, and the system controller 15 controls the laser device drivers 34. Then, the laser devices 33 emit light so that the spot lights 36 are irradiated on the base 7. If the user continues to press the light amount increase button 76 or the light amount decrease button 77, the system controller 15 controls the laser device drivers 34 to change the laser-device driving current by an appropriate amount (steps S64 to S69, S70 to S75).

In this case, the laser-devices 33 are automatically turned off when a predetermined period has elapsed after the light amount increase/decrease operation. The light emission period is set in a similar manner to that in the case of manipulation of the zoom button 46. The emission period is also measured by the timer of the system controller 15. The laser-device driving current value when the light amount increase button 76 or the light amount decrease button 77 is stored in the memory of the system controller 15, and next time any operation is made to cause the laser devices 33 to emit light, the light emission by the laser devices 33 is made with the driving current value set by the manipulation of the light amount increase button 76 or the light amount decrease button 77. Note that this current value is reset when the lighting device 67 is turned on/off from the illumination switch 17 or 75 or when the power of the apparatus main body is turned off from the power switch 16 or 38. Accordingly, when the lighting device 67 is turned on, the laser-device driving current value is returned to the second current value, and when the power of the apparatus main body is turned on or the lighting device 67 is turned off, returned to the first current value.

Note that image-sensing area illumination device is not limited to the laser device 33, however, other illumination devices, e.g., a general lamp may be used.

Further, the indication of image sensing area is not limited to the four spot lights; e.g., the image sensing area may be framed up with light line(s).

[Second Embodiment]

Figure 18:
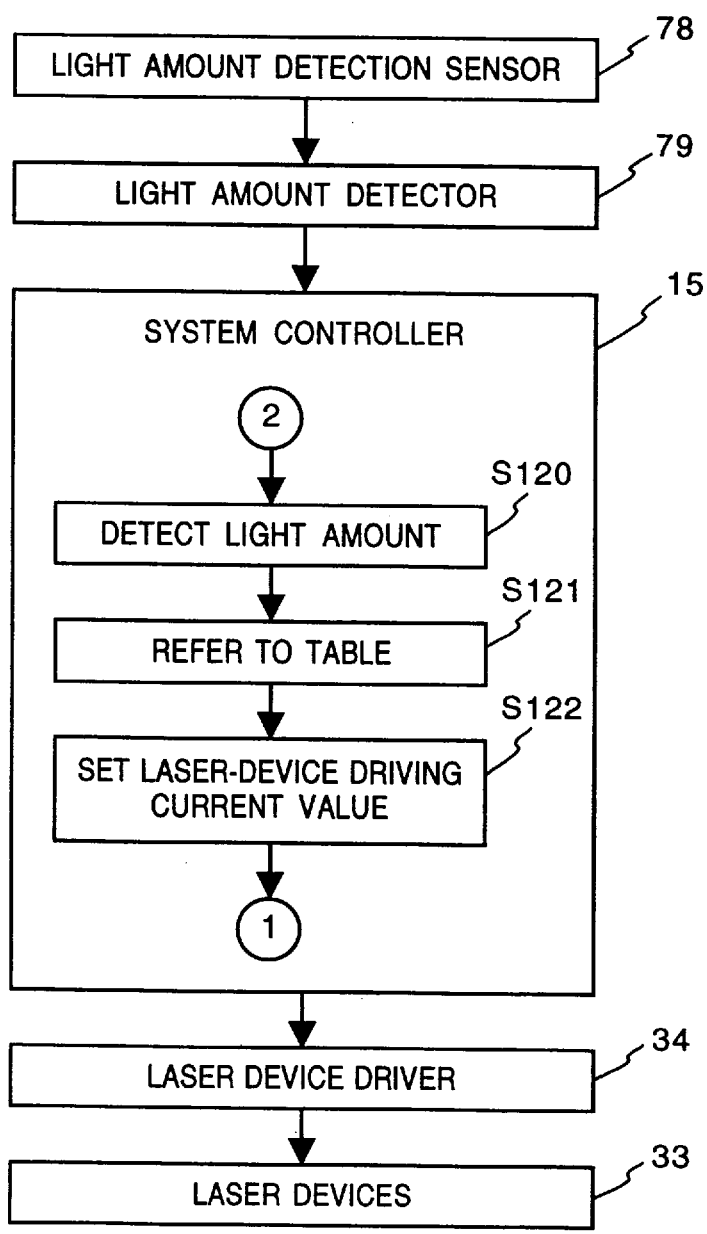
FIG. 18 is a block diagram showing the construction of a control system of light amount detection unit of the image sensing apparatus of the second embodiment.
Figure 19:
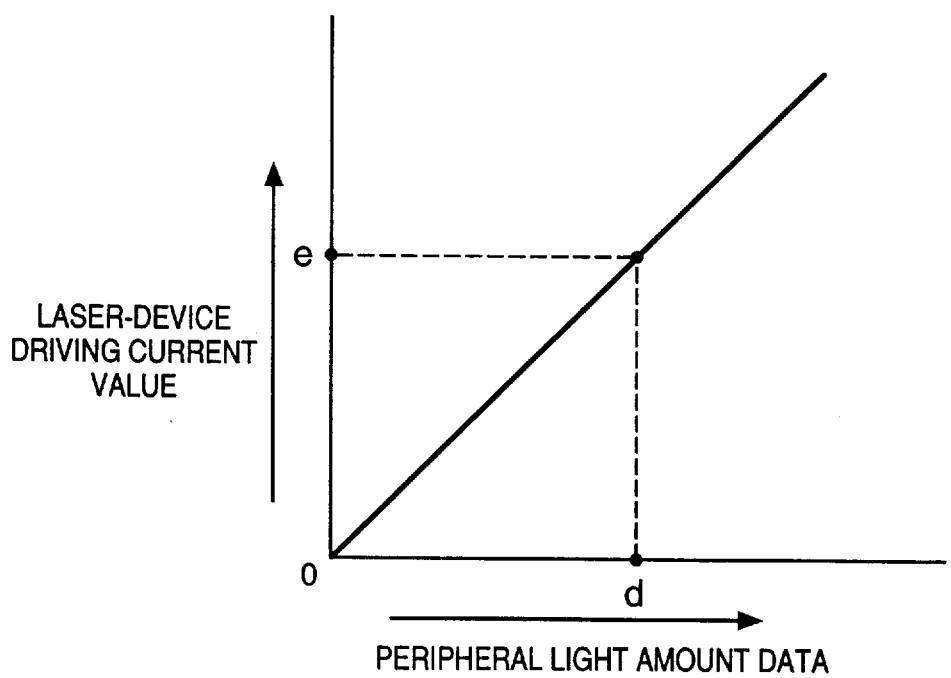
FIG. 19 is a line graph showing the relation between data on peripheral light amount around the apparatus and a laser-driver driving current value in the image sensing apparatus of the second embodiment.

Next, the second embodiment of the present invention will be described with reference to FIGS. 17 to 19. This embodiment employs a detection device for detecting peripheral light amount around the apparatus main body 4 so as to change the light output amount of the laser devices 33 in accordance with the detected light amount. This enables clear spot lights 36 on the base 7 even if the peripheral light amount around the apparatus main body 4 changes.

Figure 17:
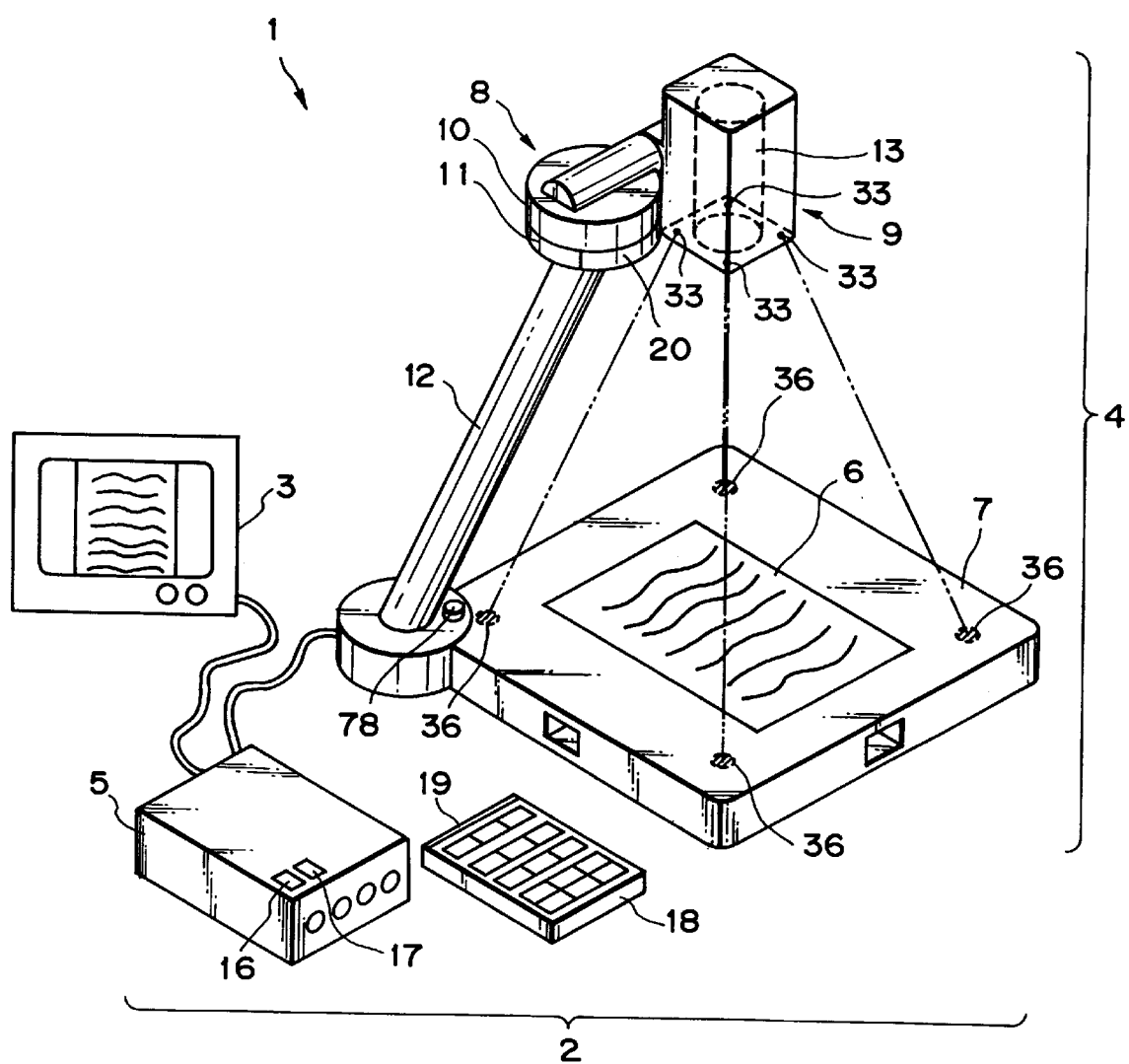
FIG. 17 is a perspective view showing the construction of an image sensing system having an image sensing apparatus according to a second embodiment of the present invention.

FIG. 17 shows the construction of the image sensing system 1 having the image sensing apparatus 2 according to the second embodiment of the present invention. FIG. 18 shows the light-output operation of the laser devices 33 of the image sensing apparatus 2. FIG. 19 shows data (light amount/current value table 152d in FIG. 11B) stored in the memory of the system controller 15. In FIG. 17, the elements corresponding to those in the first embodiment have the same reference numerals.

In FIG. 17, numeral 78 denotes a light amount detection sensor provided at a base member of the support 12. The light amount detection sensor 78 is a general photoreceptor device such as a photo-transistor and a photodiode. The light amount detection sensor 78 is provided around an object such as the original 6 at a position higher than the upper surface of the base 7 where the object is placed, by a predetermined amount, so that the light-receiving portion of the sensor 78 is not covered with the object.

Next, the light-output operation of the laser devices 33 will be described with reference to FIG. 18.

A data signal from the light amount detection sensor 78 is always transferred to the system controller 15 via a light amount detector 79 (step S120). As shown in FIG. 19, the data table showing the relation between the peripheral light amount data from the light amount detection sensor 78 and the laser-device driving current value for the laser devices 33 is stored in the memory of the system controller 15.

When the system controller 15 receives a signal instructing light emission by the laser devices 33, the system controller 15 calculates a laser-device driving current value based on the data signal from the light amount detection sensor 78 at this time (step S121). For example, as shown in FIG. 19, if the data signal from the light amount detection sensor 78 is d, the laser-device driving current value is e.

In a case where the camera head 9 and the pan base 10 are at the original sensing positions and the system controller 15 causes the laser devices 33 to emit light as described in the first embodiment, the system controller 15 issues a light emission instruction signal via the laser device drivers 34 to the laser devices 33, and the laser devices 33 emit light with the driving current value set corresponding to the data signal from the light amount detection sensor 78 (step S122).

This enables spot lights 36 always clear on the base 7 regardless of the peripheral light amount around the apparatus main body 4, and saves electrical consumption. Further, this extends the life of the laser devices 33, and improves the reliability of the apparatus main body 4.

Note that the other elements and operations of the second embodiment are the same as those in the first embodiment, therefore, the explanations of those elements and operations will be omitted.

[Third Embodiment]

Next, a third embodiment of the present invention will be described with reference to FIGS. 20 and 21. The third embodiment employs an illumination color change device (illumination color storage 153d in FIG. 11B) for changing the color of illumination light of the illumination device so as to emit light appropriate to the color of an object, to more clearly indicate an image sensing area. Note that the basic construction of an image sensing apparatus in this embodiment is the same as that of the first embodiment, therefore, the same figures are used for explanation of this embodiment.

Figure 20:
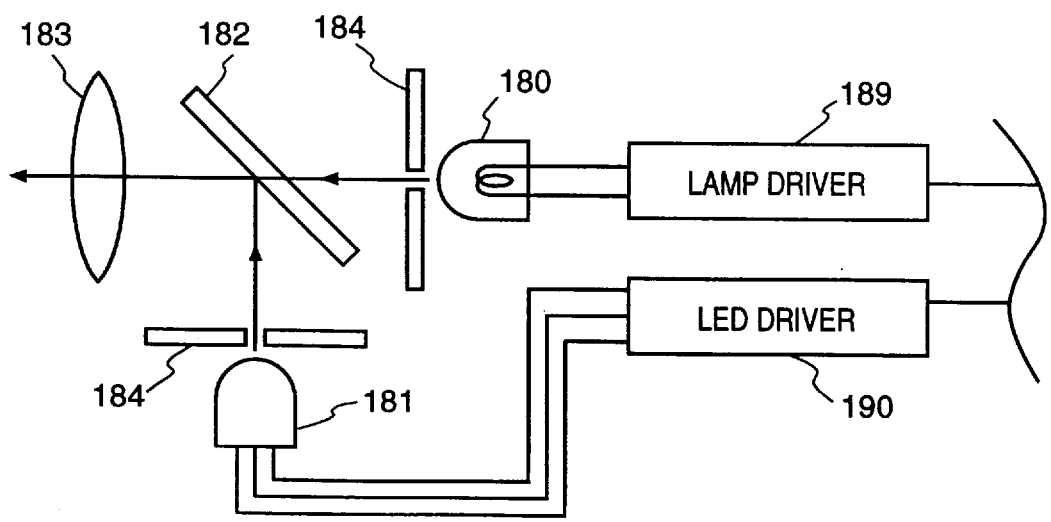
FIG. 20 is a block diagram showing the construction of an irradiation unit of the image sensing apparatus according to a third embodiment of the present invention.

FIG. 20 schematically shows the construction of an illumination unit of the image sensing apparatus according to the third embodiment of the present invention. FIG. 21 shows the construction of the illumination color change device of the image sensing apparatus. In both figures, the elements corresponding to those in the first embodiment have the same reference numerals.

In FIGS. 20 and 21, numeral 180 denotes a lamp which emits white light; 181, a multicolor light emitter (LED) which emits lights in a plural colors; 182, a half mirror; and 183, a lens as an optical system. The lamp 180, the multicolor light emitter 181 and the half mirror 182 are included in each of the illumination units 14, and the lens 183 is attached to each end portion 35 of the illumination units 14. The lamp 180 is provided facing the lens 183, and the multicolor light emitter 181 is provided at a position 90° rotated from the optical axis of the lamp 180. A mask 184 is provided on each optical axes of the lamp 180 and the multicolor light emitter 181, and the half mirror 182 is provided between the lamp 180 and the lens 183, 45° inclined from the optical axis of the lamp 180.

The light emitted from the lamp 180 passes through the mask 184, where unnecessary light is cut off, and arrives at the half mirror 182. The light from the lamp 180 passes through the half mirror 182 in the optical axis and goes ahead through the lens 183, where the light is converged, thus, a light spot 36 having a predetermined spot size is irradiated on the base 7.

The light emitted from the multicolor light emitter 181 passes through the mask 184 where unnecessary light is cut off, arrives at the half mirror 182. The light from the multicolor light emitter 181 is 90° bent by the reflection surface of the half mirror. Then, the light passes through the lens 183, where the light is converged, thus a light spot 36 having a predetermined spot size is irradiated on the base 7.

In the above construction, the optical axes of the lamp 180 and the multicolor light emitter 181 are combined by the half mirror 182. That is, in light emission by any of the lamp 180 and the multicolor light emitter 181, the position of the light spot 36 on the base 7 is the same.

Preferably, the respective optical axes coincide to clearly indicate an image sensing area, however, the axes may be shifted within an allowable range for visual measurement.

This embodiment employs a half mirror 82 for obtaining the same position of the light spot 36 in light emission from any of the lamp 180 and a multicolor light emitter 181, however, this optical-axis combining device is not limited to a half mirror; for example, the half mirror 82 may be replaced with a prism.

Figure 16:
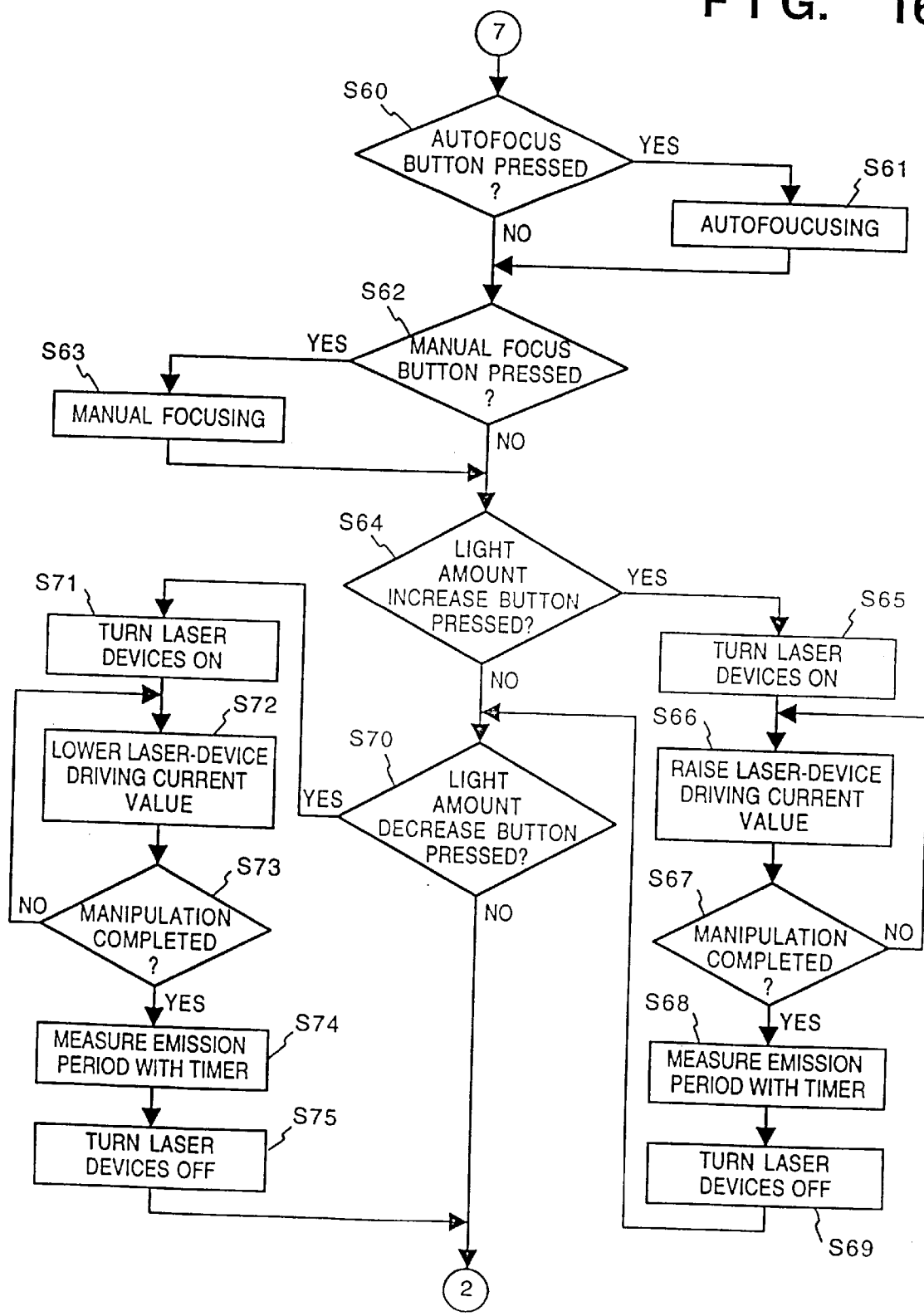

The multicolor light emitter 181 can emit lights in red, green and orange colors. A user can select one color from four colors including the white light of the lamp 180 as the color of the spot lights 36. In FIG. 16, numerals 185 to 188 denote a white-button, a red-button, a green-button and an orange-button, provided on the wireless remote controller 18, for light color selection.

When the spot light is not emitted, if the white-button 185 is pressed, the color selection signal is transmitted to the system controller 15 having a light color changing function, and the system controller 15 controls lamp drivers 189 to cause the lamps 180 to emit light. Then, white spot lights 36 are irradiated on the base 7.

If the red-button 186 is pressed, the color selection signal is transmitted to the system controller 15, and the system controller controls LED drivers 190 to cause red-light emitting devices of the multicolor light emitters 181 to emit light. Then, red spot lights 36 are irradiated on the base 7.

If the green-button 187 is pressed, the color selection signal is transmitted to the system controller 15, and the system controller 15 controls the LED drivers 190 to cause green-light emitting devices of the multicolor light emitters 181 to emit light. Then, green spot lights 36 are irradiated on the base 7.

If the orange-button 188 is pressed, the color selection signal is transmitted to the system controller 15, and the system controller 15 controls the LED drivers 190 to cause the red-light emitting devices and the green-light emitting devices of the multicolor light emitters 181 to emit light. Then, orange spot lights 36 are irradiated on the base 7.

Note that the construction of the multicolor light emitter 181 and that of the light color switching device are well known, therefore, the detailed explanation of these devices will be omitted.

When the spot lights 36 are irradiated, if one of the buttons 185 to 188 is pressed, the color selection signal is transmitted to the system controller 15, and the system controller 15 changes the driving circuits so as to emit light in the selected color.

This enables the spot lights in a color appropriate to the color of an object such as the original 6 and the peripheral light amount around the image sensing apparatus 2, thus indicates an image sensing area more clearly.

It should be noted that the number of the spot light colors in the image sensing apparatus 2 of this embodiment is four, however, the number is not limited to four so far as the number of colors is at least two. Further, the construction and operation of the other elements in this embodiment are the same as those in the first embodiment, therefore, the explanations of those elements will be omitted.

[Fourth Embodiment]

Next, a fourth embodiment of the present invention will be described with reference to FIGS. 22 to 35. The image sensing apparatus of this embodiment can change the image sensing area in accordance with a length/width ratio of the image screen of the monitor (aspect ratio). Especially, the apparatus changes the image sensing area in accordance with the aspect ratio of a general monitor, 3:4 (normal size) and the aspect ratio of a high vision monitor, 9:16 (HD size).

Figure 22A:
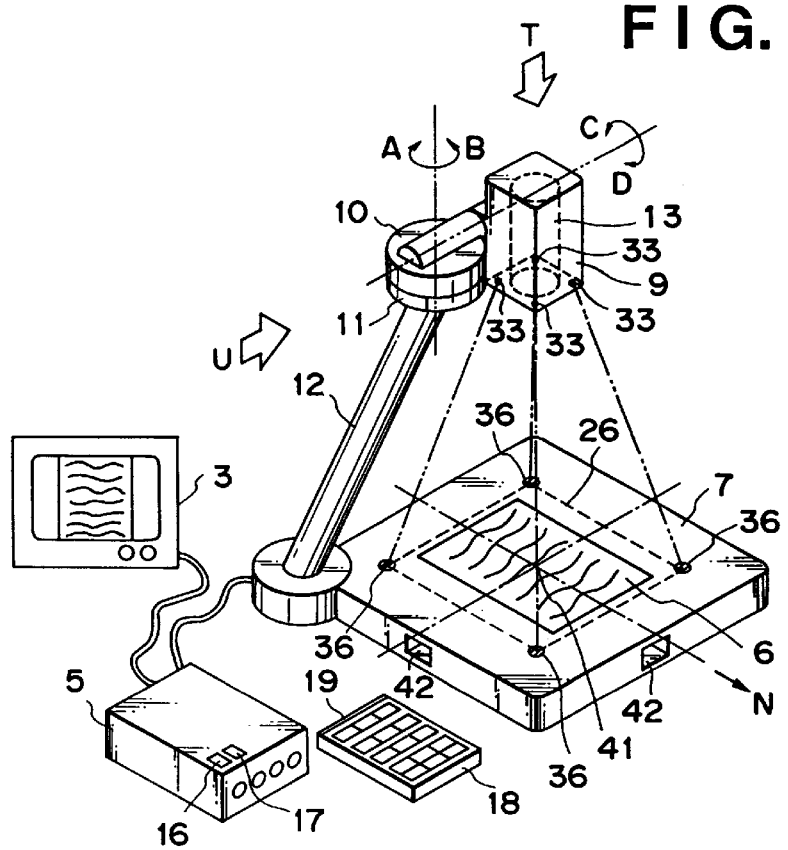
FIGS. 22A and 22B are perspective views showing construction of an image sensing system having an image sensing apparatus according to a fourth embodiment of the present invention.
Figure 22B:
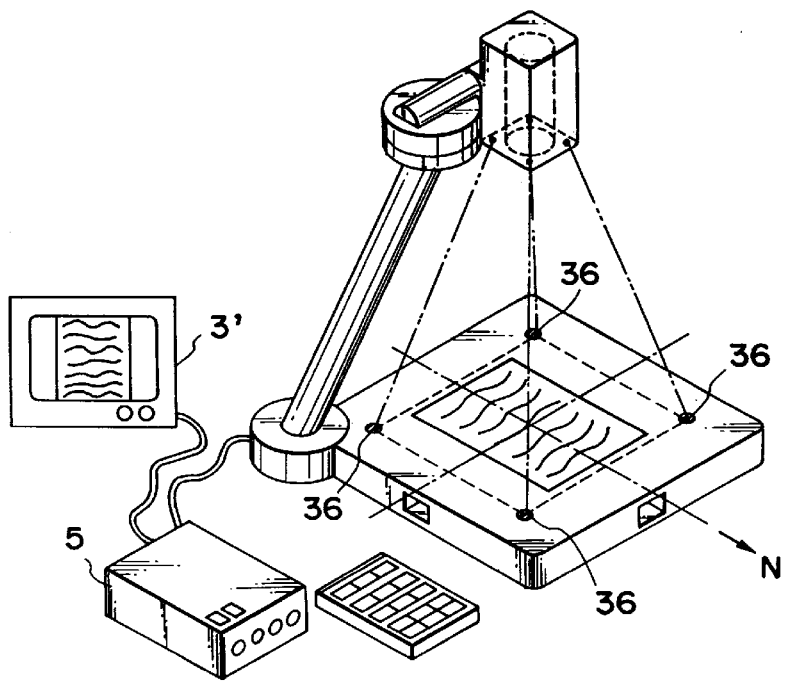

Next, the construction of the apparatus main body will be described with reference to FIG. 22. Note that the arrow N indicates a direction viewing the apparatus from the front direction of the apparatus. FIG. 22A shows the apparatus in a normal-size mode; FIG. 22B, the apparatus in an HD size mode. The monitor 3 and the size of an image within an image sensing area displayed by a display device in FIG. 22B are different from those in FIG. 22A. In FIG. 22A, numeral 9 denotes a camera head having a camera lens 13; 10, a pan base which supports the camera head 9; 11, a support base which rotatably supports the pan base 10 at the axis of the pan base 10; 12, a support which integrally supports the support base 11; 7, a base; 6, an original as an object; 18, a wireless remote controller for operating the apparatus; 5, a controller connected to the apparatus; and 3, a normal-sized monitor connected to the controller 5.

The camera head 9 is supported at its axis rotatably within a predetermined range in arrow C and D directions with respect to the pan base 10. The camera head 9 has a free stop mechanism for stopping at any angular position within the rotational range. The pan base 10 is supported at its axis rotatably within a predetermined range in arrow A and B directions with respect to the support base 11. Also, the pan base 10 has a free stop mechanism for stopping at any angular position within the rotational range. In FIGS. 22A and 22B, the positions of the camera head 9 and the pan base 10 are original sensing positions. The camera head 9 and the pan base 10 in this state are lightly locked by an engaging pin to be described later with a biasing force.

The support 12 is fixed at one corner of the base 7 with a predetermined angle so that the light axis of the camera lens 13 at the original sensing position comes to about the center of the base 7. The camera lens 13 has four illumination units 14 (see FIG. 23). The controller 5 has a system controller 15 for controlling the respective devices of the apparatus, driving circuits, a video processor, a video memory, a power source of an apparatus main body etc. Further, the controller 5 has a main power switch 16 for the apparatus main body and a main illumination switch 17 on its side surface.

The image sensing apparatus has a control system or the apparatus main body in the wireless remote controller 18 so that a user can operate the apparatus from a place a predetermined distance away from the apparatus. The wireless remote controller 18 has a sub power switch for the apparatus main body, control buttons for operations such as zooming, focusing and iris adjustment, illumination button for the illumination units 14. When the buttons on the wireless remote controller 18 are manipulated, the operation signals are transmitted by a transmitter 19 of the wireless remote controller 18 and received by a receiver 20 provided at the support base 11. Then, the signals are transferred to the system controller 5 connected to the apparatus main body. As a result, the system controller 5 controls corresponding driving circuits and processors, and controls the respective driving systems.

Note that the respective devices in the image sensing apparatus of this embodiment can be operated from the wireless remote controller 18, however, this does not pose any limitation on the present invention. For example, an operation panel can be provided on the front surface of the base 7. In FIG. 22B, numeral 31 denotes an HD-sized monitor connected to the controller 5. Note that the explanations of the elements corresponding to those in FIG. 22A will be omitted. In this embodiment, one of the normal-sized monitor 3 and the HD-sized monitor 3' is selected in accordance with necessity. The controller 5 has a connecting portion for the monitor 3 and a connecting portion for the monitor 3' respectively, however, this does not pose any limitation on the present invention.

Figure 23B:
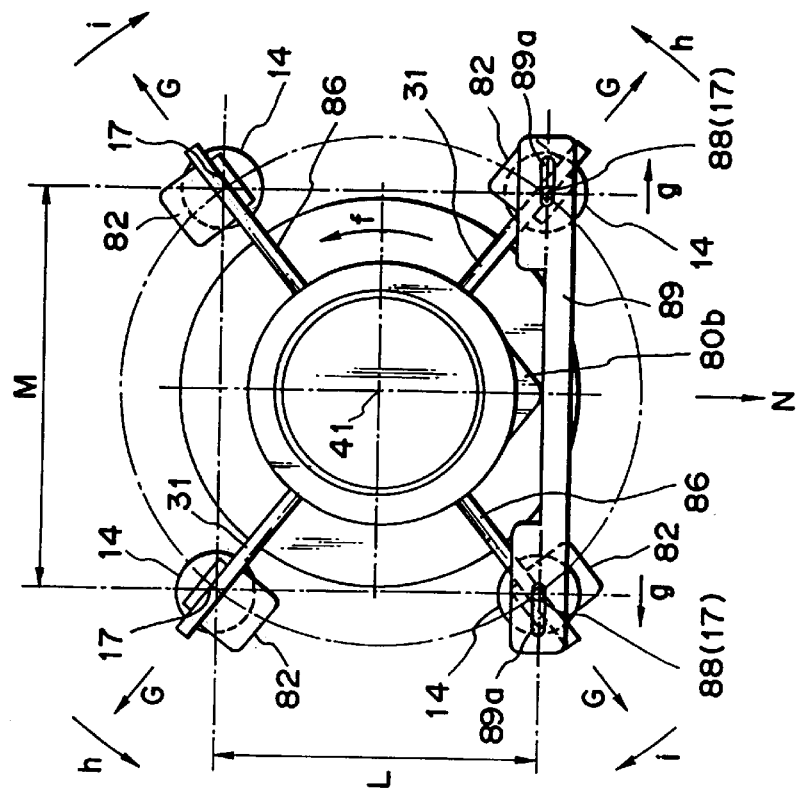
FIG. 23 comprised of FIGS. 23A and 23B illustrates the construction of a lens of the image sensing apparatus of the fourth embodiment in a case where the apparatus is in wide-end normal mode.
Figure 23A:
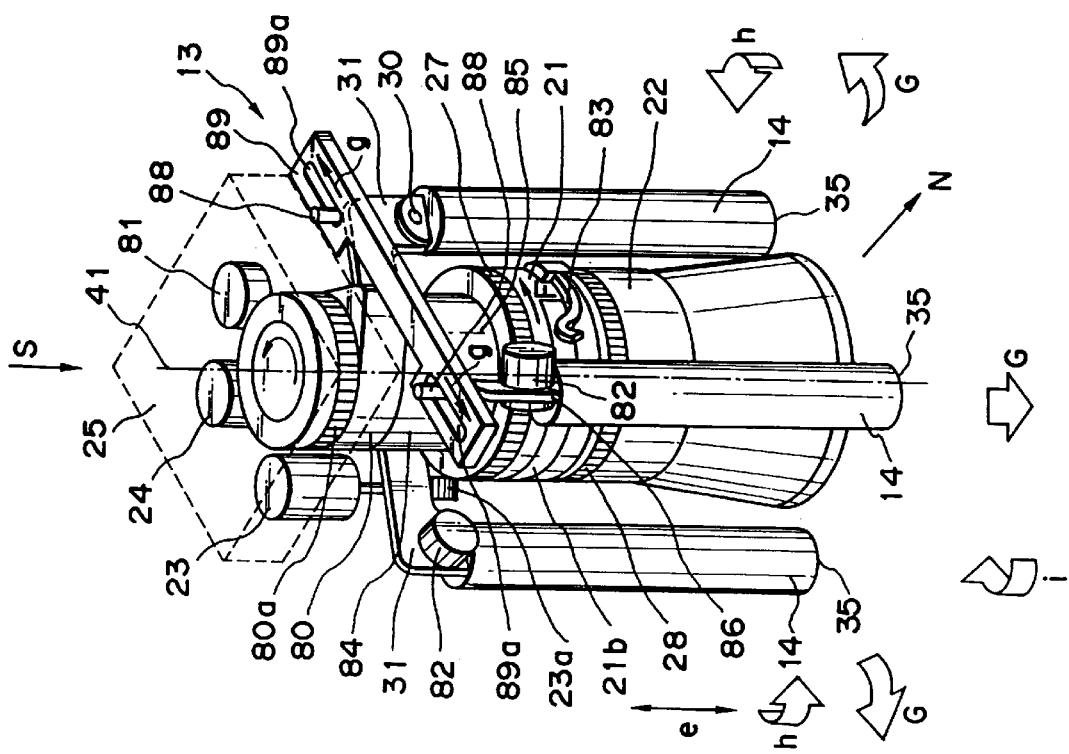

Next, the construction of the camera lens 13 as the image sensing device will be described with reference to FIG. 23. FIG. 23A is a perspective view schematically showing the construction of the camera lens 13. FIG. 23B is a top plan view showing the camera lens 13 from an arrow S direction in FIG. 23A. In FIG. 23B, an arrow N direction presents a front direction of the apparatus. Numeral 21 denotes a zoom ring; 22, a focus ring; 23, a zoom motor; 24, a focus motor; 80, a cam ring; 81, a cam ring motor; 14, four illumination units provided around the peripheral surface of the lens barrel of the camera lens 13; 82, four rotation motors for rotating the illumination units 14; 25, an image sensing device; 84, a first rotation ring; and 85, a second rotation ring. The zoom motor 23, the focus motor 24, the cam ring motor 81 and the rotation motors 82 respectively comprise a pulse motor. The zoom ring 21 has a toothed portion 27 on its circumferential surface, engaged with a gear 23a attached to the rotation axis of the zoom motor 23.

Similarly, the focus ring 22 has a toothed portion 28 on its circumferential surface, engaged with a gear (not shown) attached to the rotation axis of the focus motor 24. The camera lens 13 of the apparatus of this embodiment changes the size (field of view) of an image to be image-sensed with rotation of the zoom ring 21 as an image sensing area change device. Further, the camera lens 13 rotates the focus ring 22 based on video information from the image sensing device 25 for focusing on the image. Note that in FIGS. 23A and 23B, the zoom ring 21 is at a tele-end position.

The zoom ring 21 has a variable resistor 21b on its circumferential surface, in contact with a slide piece 83 fixed on the circumferential surface of the zoom ring 21. When the zoom ring 21 rotates, the slide piece 83 slides on the variable resistor 21b. The rotational position of the zoom ring 21, the rotational amount of the rotation motor 82 and the rotational direction at this time are controlled using the resistance value of the variable resistor 21b.

The aspect ratio of an image sensing area of the image sensing device 25 is 9:16 corresponding to the HD mode and it can be changed corresponding to the normal mode in accordance with necessity. When a current mode is changed from the HD mode to the normal mode, only the both end portions of an image is uniformly omitted without changing the vertical length. The first rotation ring 84 is rotatable around the optical axis 41 of the camera lens 13, and has a pair of first arms 31 symmetrically aligned in a straight line passing through the optical axis 41, on its peripheral surface. Also, the second rotation ring 85 is rotatable around the optical axis 41 of the camera lens 13, and has a pair of second arms 86 symmetrically aligned in a straight line passing through the optical axis 41, on its circumferential surface.

The rotation motors 82 for rotating the illumination units 14 are fixed to the respective end portions of the first arms 31 and the second arms 86. Rotation axes 87 of the rotation motors 82 are fixed to one end of the illumination units 14 so that the illumination units 14 pivot with the rotation motors 87. Each of the illumination units 14 has a free stop mechanism (not shown) at its pivotal portion to maintain a position of the illumination unit 14 even when the rotation motor 82 does not rotate.

In FIG. 23A, the four illumination units 14 at positions corresponding to the tele-end position of the zoom ring in the normal mode. These positions of the illumination units 14 are detected by sensors (not shown) as initialize positions so that the amount of rotation of the motors 82 can be controlled using the initialize positions as reference positions. The rotation motors 82 are driven in accordance with a value of the variable resistor 21b provided on the zoom ring 21, to move the illumination units 14 by an appropriate amount.

As shown in FIG. 23A, the L-shaped first arms 31, extending downward, have a predetermined length to hold the rotation axes 87 of the four rotation motors 82 at the same height in an arrow e direction. As shown in FIG. 23B, central portions 17 of the four illumination units 14 are on the same circle around the lens barrel (partially overlapped with a position of a slide pin 88 to be described later).

The pair of first arms 31 and the pair of second arms 86 respectively have a slide pin 88 having a predetermined length and extending upward, at the end of one arm. Numeral 89 denotes a link lever for changing the positions of the illumination units 14 with respect to the lens 13, having elliptic holes 89a, in which the slide pins 88 are engaged, at both ends. The link lever 89 is movable in an arrow N direction or an opposite direction to the arrow N direction, and the movement of the link lever 89 is limited to the above directions by a guide member (not shown). The link lever 89 is biased by a biasing member (not shown) in the direction opposite to the arrow N direction, and the end surface of the link lever 89 abut against the circumferential surface of the cam ring 80.

The cam ring 80, provided above the first rotation ring 84, has a toothed portion 80a engaged with a gear (not shown) attached to the rotation axis of the cam ring motor 81, on its circumferential surface. The rest of the circumferential surface of cam ring 80 has a cam shape for moving the link lever 89 in the arrow N and opposite directions by a member to be described later. The above construction changes the positions of the illumination units 14 with respect to the camera lens 13 in accordance with the normal/HD mode, changed by an image sensing area change device.

Figure 24B:
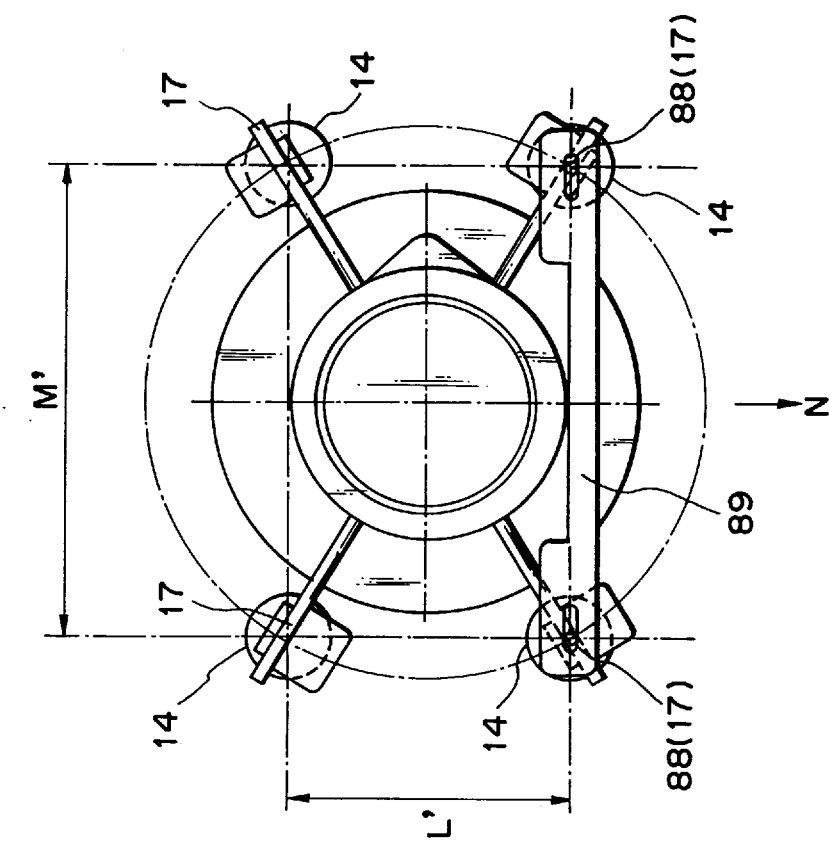
FIG. 24 comprised of FIGS. 24A and 24B illustrates the construction of the lens of the image sensing apparatus of the fourth embodiment in a case where the apparatus is in wide-end HD mode.
Figure 24A:
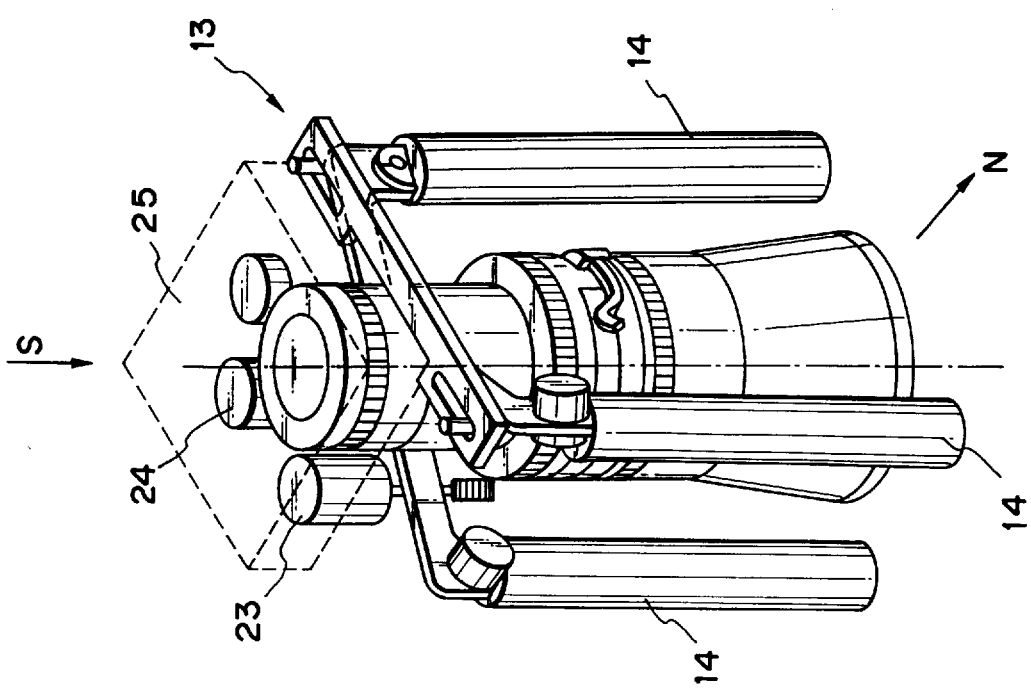
Figure 25:
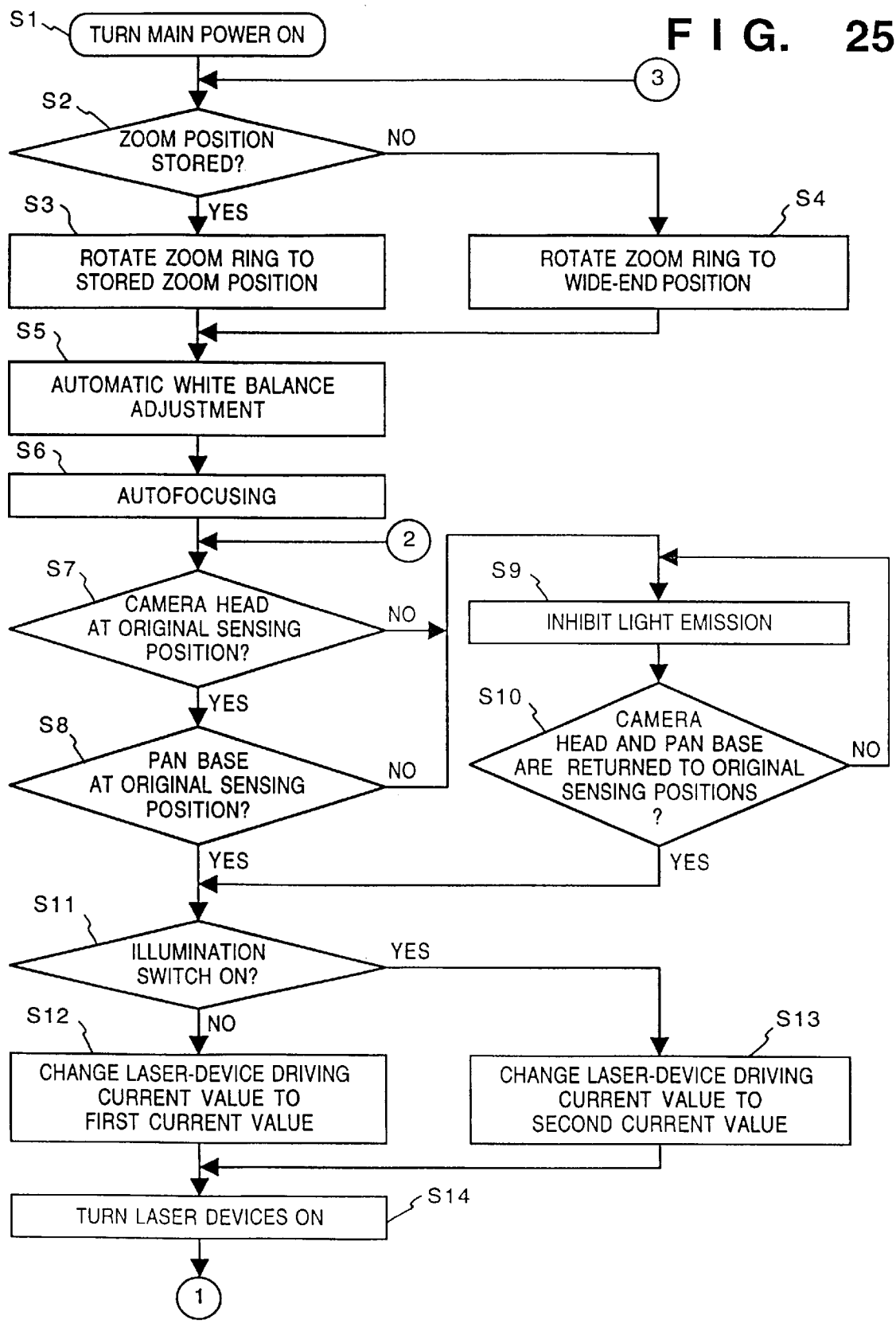
FIGS. 25 to 29 are flowcharts showing the operation procedure of the fourth embodiment.

Next, the operation of the image sensing area change device will be described with reference to FIGS. 23 and 24. In FIGS. 23A and 23B, the illumination units 14 are at positions for image sensing using the normal mode monitor 3 (FIG. 22A). The ratio of length (L) to width (M) of an area formed by connecting the four central portions 17 of the illumination units 14 is 3:4. In FIGS. 24A and 24B, the illumination units 14 are at positions for image sensing using the HD mode monitor 31 (FIG. 22B). At this time, the length (L') to width (M') ratio of an area formed with the central portions 17 of the illumination units 14 is 9:16.

In FIGS. 23A and 23B, a portion of the side surface of the link lever 89 is biased to abut against a convex portion 80b of the cam ring 80, and the slide pins 88 of one of the first arms 31 and one of the second arms 86 are engaged in the elliptic holes 89a, thus the first arms 31 and the second arms 86 are stopped at these positions. In this state, if the cam ring motor 81 is driven, the driving force is transmitted to the cam ring 80 via a gear 81a, to rotate the cam ring 80 in an arrow f direction.

Then, the position of the convex portion 80b of the cam ring 80 is shifted, and the link level 89 moves in the opposite direction to the arrow N direction. This moves the slide pins 88 of the first arms 31 and the second arms 86, engaged with the elliptic holes 89a of the link lever 89, in an arrow g direction. By this movement, the first arms 31 and the second arms 86 holding the illumination units 14 respectively rotate in arrow h and i directions with the optical axis 41 of the camera lens 13 as the rotational axis, to the positions corresponding to the HD mode as shown in FIGS. 24A and 24B. At the same time, the four rotation motors 82 rotate the illumination units 14 in arrow G directions as shown in FIG. 23B by a predetermined amount. Note that this rotational amount will be described later. When the positions for the HD mode are changed to the positions for the normal mode, the reversed operations are made. As the illumination units 14 move in accordance with the change of image sensing area, the image sensing area can be reliably indicated.

The illumination units 14 as the illumination devices respectively have the same construction as that of the first embodiment.

Next, the operation procedure of the image sensing apparatus at the original sensing positions will be described with reference to the flowcharts in FIGS. 25 to 29. Note that in FIGS. 25 to 29, the same operations as those in the first embodiment have the same reference numerals. When the main power switch 16 at the controller 5 is turned on (step S1), the apparatus is activated and becomes ready for image sensing, and as shown in FIG. 34, a signal indicative of the status is transferred to the system controller 15. Note that the image sensing area upon turning on the power of the apparatus is set to the normal mode as shown in FIG. 22A, and the length to width ratio of the image sensing area and that indicated by the illumination units 14 are 3:4. At this time, a data table of the variable resistor value, the rotational amount and the rotational direction of the rotation motors 82 to be described later is set corresponding to the normal mode.

When the main power switch 16 is turned on (step S1), zooming is automatically performed. First, a user presses a first zoom button to be described later to confirm whether the zoom position is stored in the memory of the system controller 15 or not (step S2). If YES, the system controller 15 controls the zoom motor driver 39 to drive the zoom motor 23, so as to set the field of view to a field of view designated from a zoom position designation device to be described later. (step S3).

If the zoom position is not stored in the memory of the system controller 15 (NO in step S3), the image sensing area (field of view) is changed by rotating the zoom ring 21 to the wide-end position (step S4). For example, if the zoom motor rotates the zoom ring 21 in an arrow F direction in FIG. 23A, the image sensing area is widened corresponding to the rotation of the zoom ring 21 toward the wide-end position, and the slide piece 83 fixed to the camera lens 13 slides on the surface of the variable resistor 21b on the zoom ring 21. As the slide piece 83 slides on the surface of the variable resistor 21b, the resistor value is transferred to the system controller 15, and the system controller 15 controls a rotation motor driver 130 in accordance with the received value. Thus, the rotation motors 82 are driven to rotate the illumination units 14.

Figure 30A:
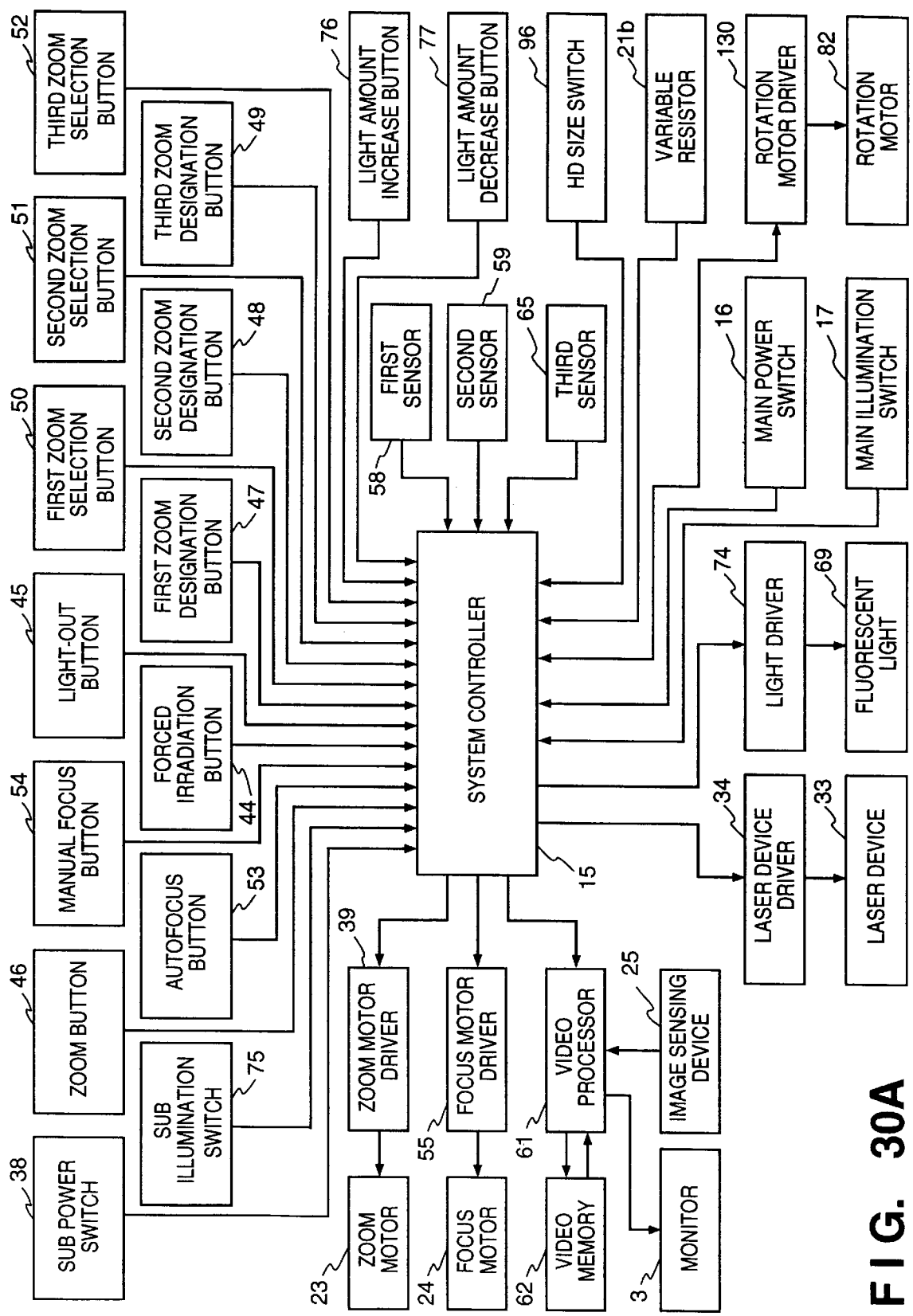
FIGS. 30A and 30B are block diagrams showing the construction of a control system of the fourth embodiment.
Figure 30B:
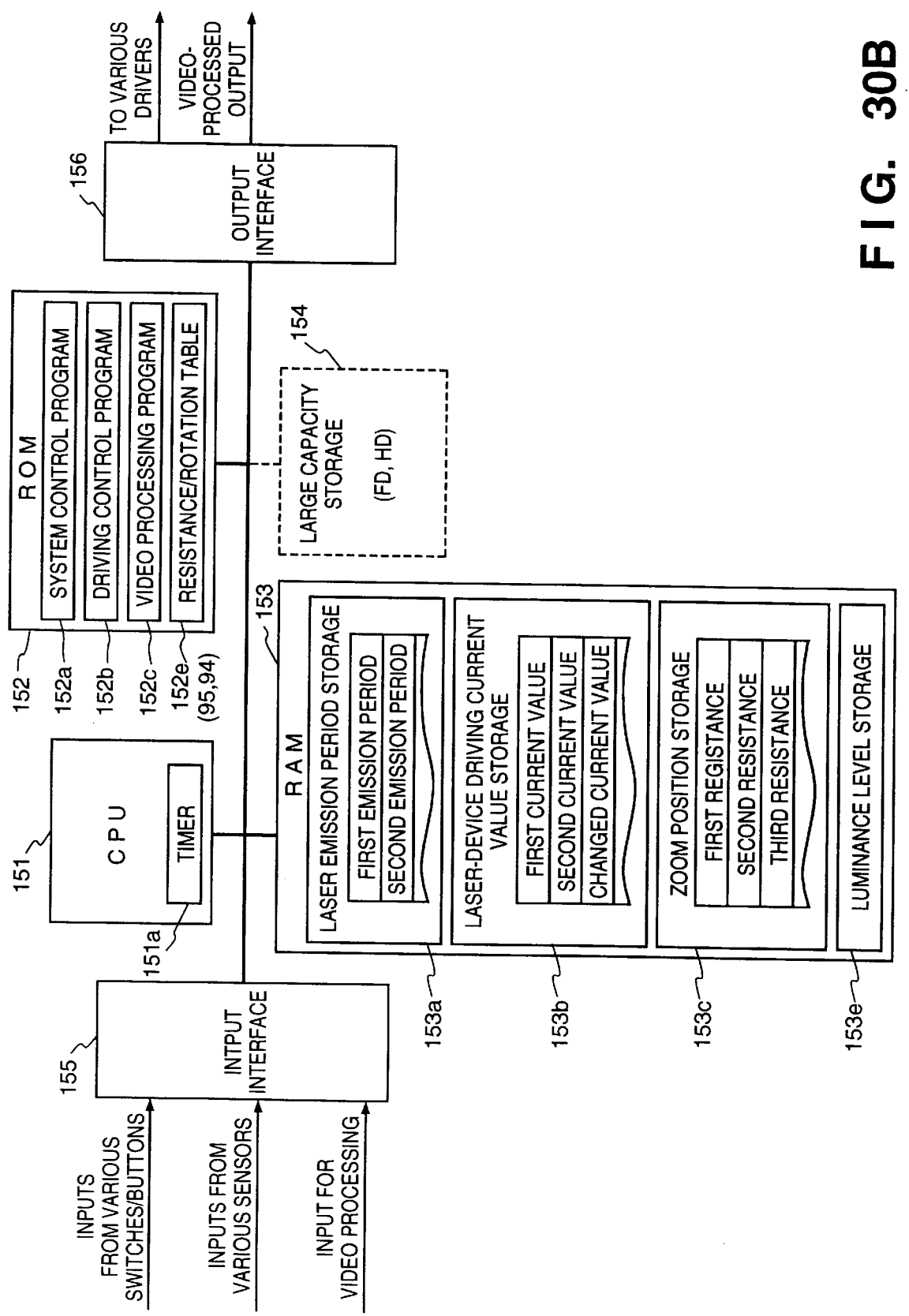
Figure 31:
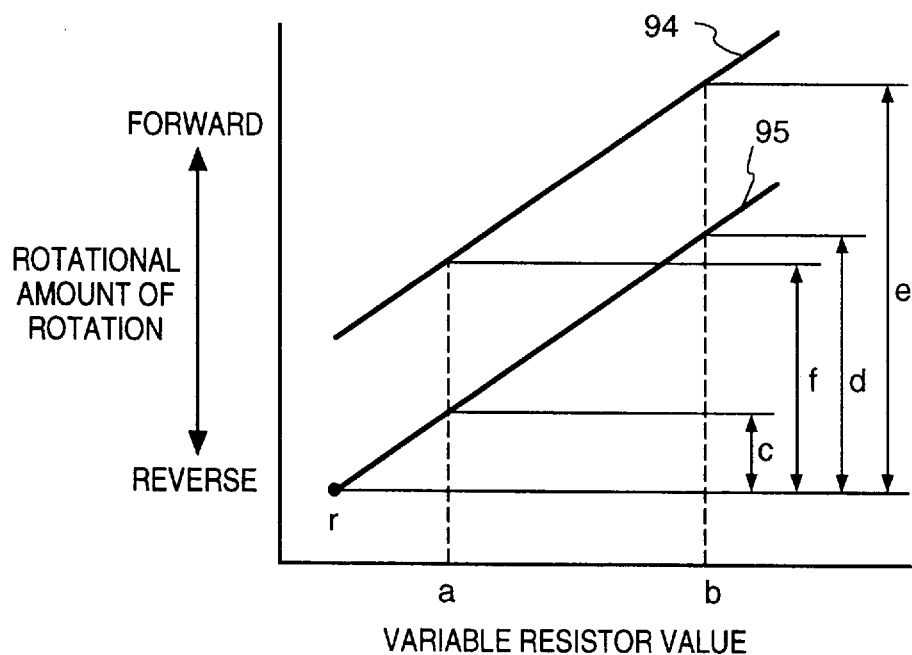
FIG. 31 is a line graph showing the relation between a variable resistor and rotation motors in the image sensing apparatus of the fourth embodiment.

The relation among the value of the variable resistor 21b, the rotation amount of the rotation motors 82 and the rotational direction is stored, as two data tables for the normal mode and the HD mode, in the memory of the system controller 15 (resistance/rotation table 152e in FIG. 30B). These tables are changed in accordance with an image-sensing area change signal from an HD mode switch 96 to be described later. Note that in FIG. 31, alphabet r represents an initialize position of the rotation motors 82. The rotation motors 82 are driven to rotate by the amount at this position. Further, the rotational amount and the rotational direction of the rotation motors 82 is controlled based on the change amount of the resistance, and the rotational direction of the rotation motors 82 is controlled based on the increase/decrease of the resistance when the value changes.

Figure 35:
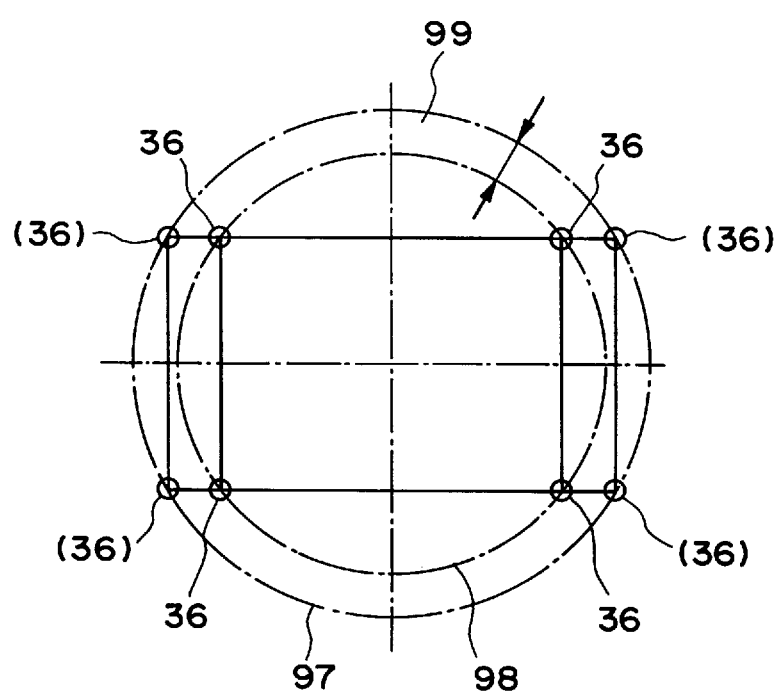
FIG. 35 is an explanatory view showing the difference between a normal-size image sensing area and a HD-size image sensing area in the forth embodiment.

For example, in a case where the resistance changes from a value a to a value b, the rotation motors 82 in the normal mode rotate by the difference between rotation amounts b and c in a forward direction, and in the HD mode, rotate by the difference between rotation amounts e and f in the forward direction. Note that the difference between the rotation amounts f and e and that between the rotation amounts e and d are the same, and are corresponding to a difference amount 99 between two circles for the two modes as shown in FIG. 35. When the variable resistor 21b value changes from the value b to the value a, the rotation motors 82 rotate by the above rotational amounts in a reverse direction of the forward direction. Note that these controls are not limited to those described above.

In this manner, as the zoom ring 21 rotates in the arrow F direction in FIG. 23A, end portions 35 of the illumination units 14 rotate in an arrow G directions. Specifically, as shown in FIG. 23B, each of the end portion 35 moves on a straight line connecting the optical axis 41 of the camera lens 13 to the central portion 17 of the illumination unit 14. At this time, the four end portions 35 of the illumination units 14 move maintaining the length/width ratio of image sensing area.

Figure 32B:
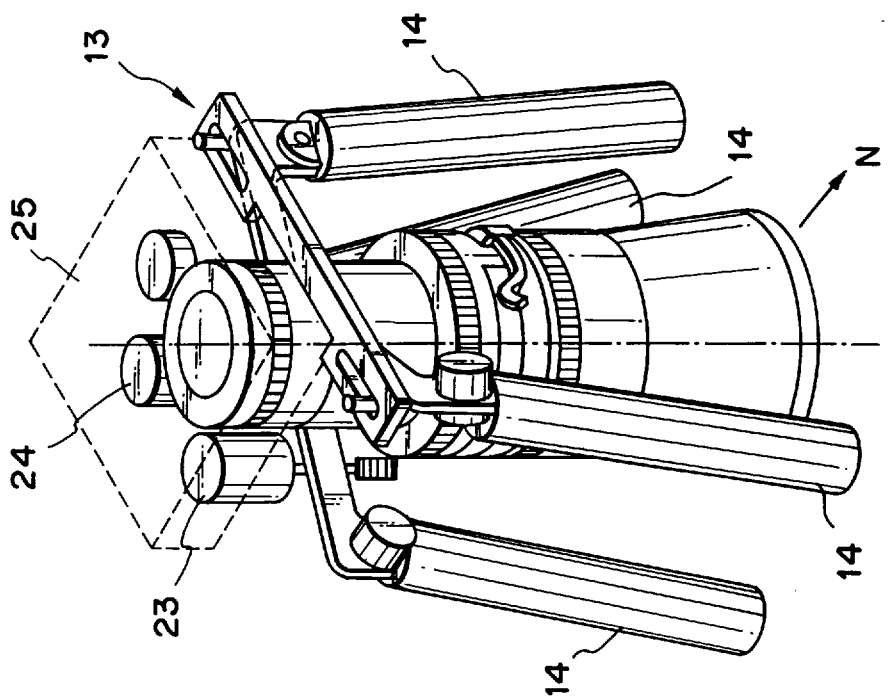
FIGS. 32A and 32B are perspective views showing the construction of a lens of the image sensing apparatus of the fourth embodiment in a case where the apparatus is in tele-end HD mode.
Figure 32A:
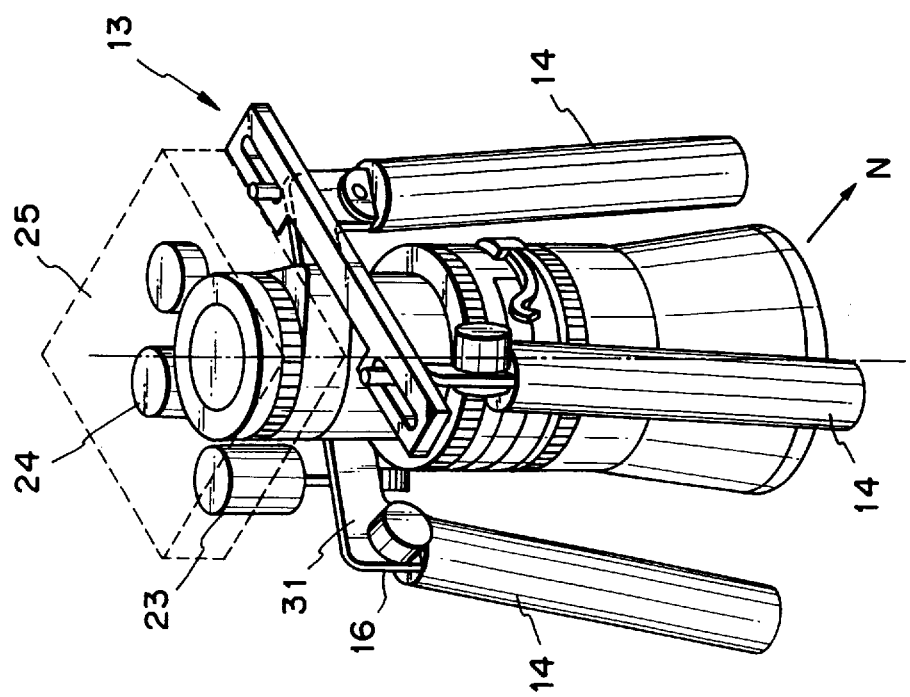

FIG. 32A shows the camera head 9 in the normal mode where the zoom ring 21 is at the wide-end position; FIG. 32B, the camera head 9 in the HD mode where the zoom ring 21 is at the wide-end position. The rotational position of the zoom ring 21 from the tele-end position to the wide-end position is detected based on a value of the variable resistor 21b. The detection signal is transmitted to the system controller 15, and the system controller 15 stops the rotation of the zoom motor 23. The inclination of the illumination units 14 is the maximum when the zoom ring position is at the wide-end position in the HD mode.

Note that when the zoom ring 21 rotates in an opposite direction to the arrow F direction, the illumination units 14 move in directions opposite to the directions as described above. Further, when the main power switch 16 of the apparatus main body is turned on (step S1), white balance is automatically adjusted (step S5) and the base 7 or an object on the base 7 is automatically brought into focus.

Upon turning on the main power switch 16 (step S1), if the camera base 9 and the pan base 10 are at the original sensing positions (steps S7 and S8), the system controller 15 controls the laser device drivers 34 to cause the laser devices 33 to emit light (step S14). The laser lights from the laser devices 33 are irradiated on the base 7, as the four spot lights 36 as shown in FIG. 22A.

If the power of the illumination device, to be described later, is not turned on at this time (step S11), the laser devices 33 emit light with a first current value stored in the memory of the system controller 15 (step S12). This allows the user to quickly confirm the image sensing area from a rectangular area formed with the four spot lights 36. Thus indicated image sensing area can be a normal-size area or a HD-size area by manipulating an HD size switch to be described later.

Figure 33A:
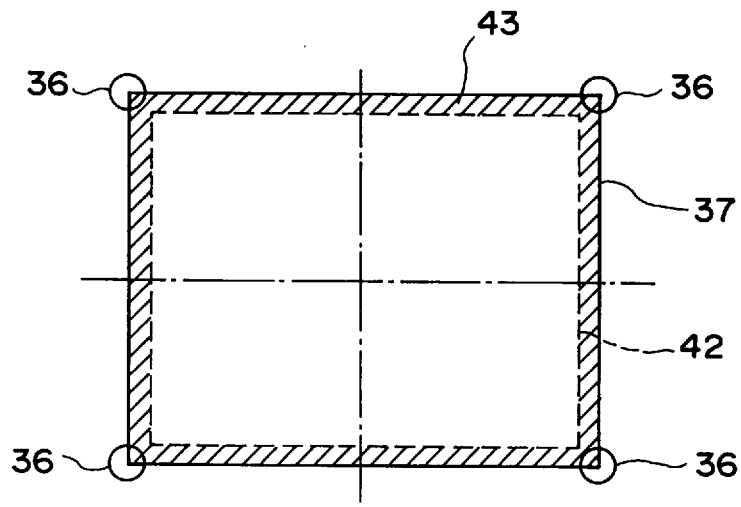
FIGS. 33A and 33B are explanatory views showing image sensing areas in the fourth embodiment.
Figure 33B:
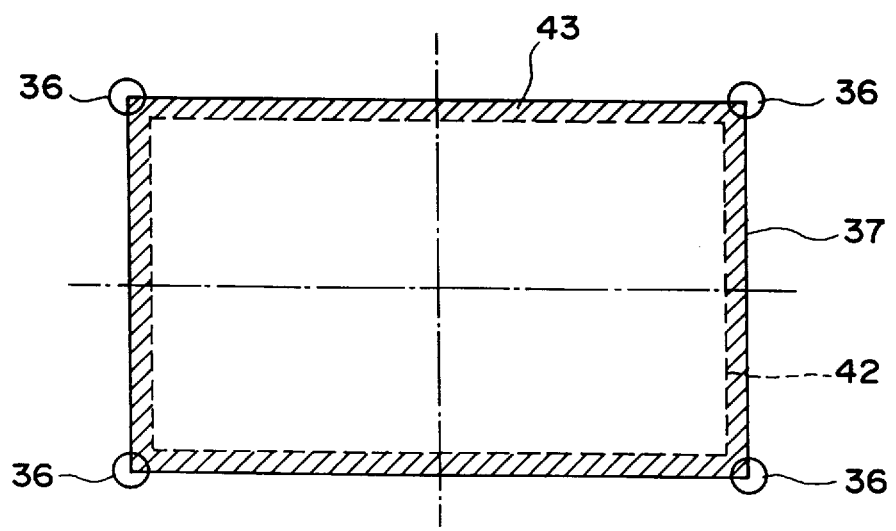

Next, the relation between the image sensing area indicated by the spot lights 36 from the laser devices 33 and the image sensing area actually displayed on the monitor 3 (3') will be described with reference to FIGS. 33A and 33B. FIG. 33A shows the image sensing areas in the normal mode; FIG. 33B, the image sensing areas in the HD mode. Numeral 37 denotes the area formed by connecting the four spot lights 36; and 42, the image sensing area (broken line) actually displayed on the monitor 3 in FIG. 22A. In FIG. 22A, the areas have a 3:4 length/width (aspect) ratio, and in FIG. 22B, the areas have a 9:16 length/width ratio. In both figures, image sensing area 37 indicated by the spot lights 36 is larger than the image sensing area 42 so that the spot lights 36 are not displayed on the image screen of the monitor 3 (3'). This relation between the image sensing area 37 and the image sensing area 42 is always maintained at any zoom position.

From this relation, the image sensing area 37 indicated by the spot lights 36 includes a non-displayed (non-sensed) portion 43 (hatched portion). The size of the non-sensed portion 43 changes somewhat depending on the type of the monitor 3 (3'). Preferably, the image sensing area 37 indicated by the spot lights 36 is larger than the image sensing area 42 so that the spot lights 36 are not displayed on the image screen of the monitor 3 (3'), however, if there is no problem in displaying the spot lights 36, the image sensing area 37 may have the same size as that of the image sensing area 42, otherwise the image sensing area 37 slightly smaller than the image sensing area 42.

Returning to FIG. 22A, the user places an object such as the original 6 on the base 7. At this time, as the user can determine an image-sensed portion of the object, from the four spot lights 36 irradiated on the base 7, the user can determine an appropriate position for the original 6, from the spot lights 36. Thus, the original 6 is image-sensed and an image of the original 6 is displayed on the image screen of the monitor 3 (3'). The image sensing apparatus of this embodiment has an object detection device for automatically inhibiting light emission by the laser devices 33 when an object is placed on the base 7.

Figure 26:
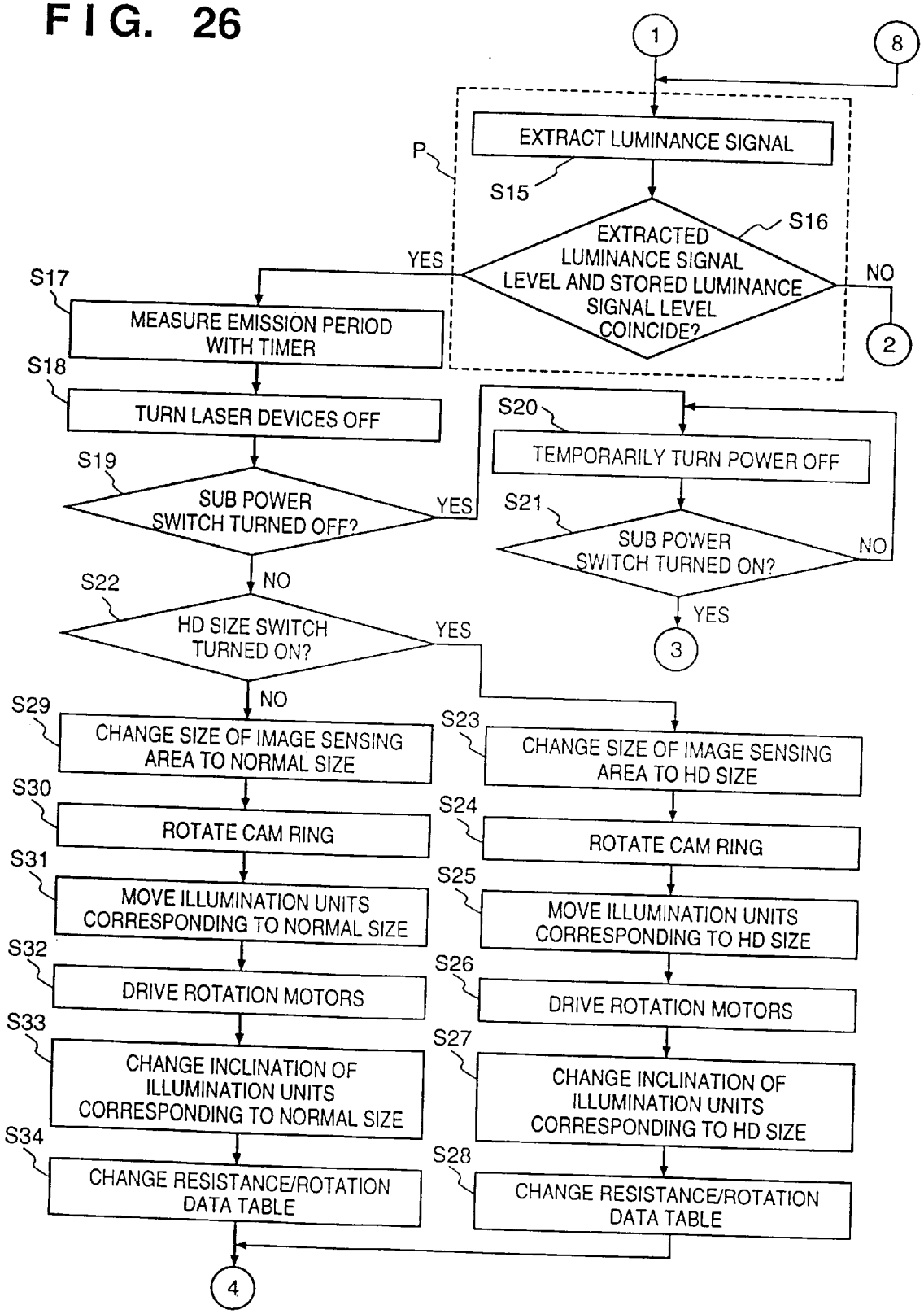
Figure 27:
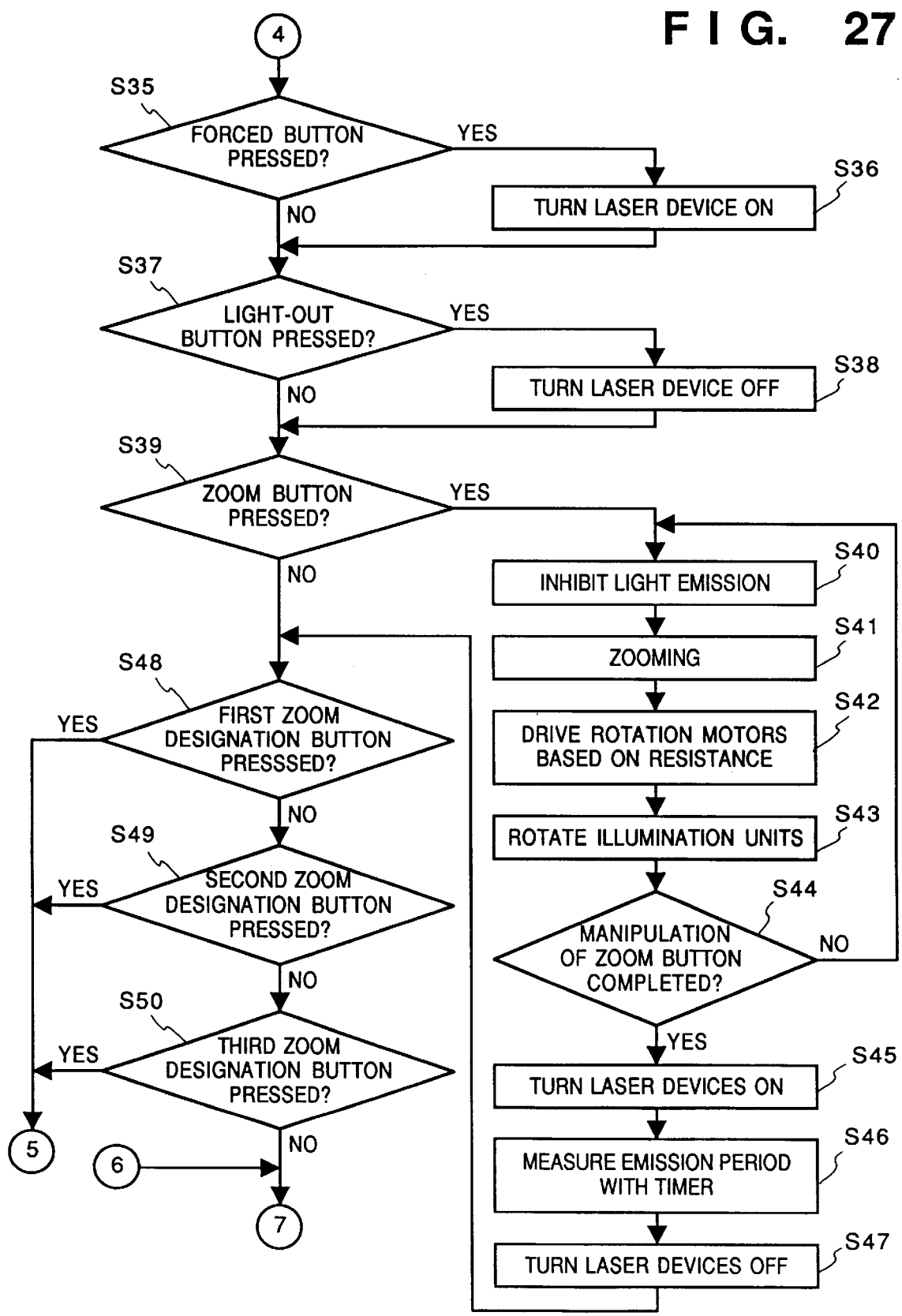
Figure 34A:
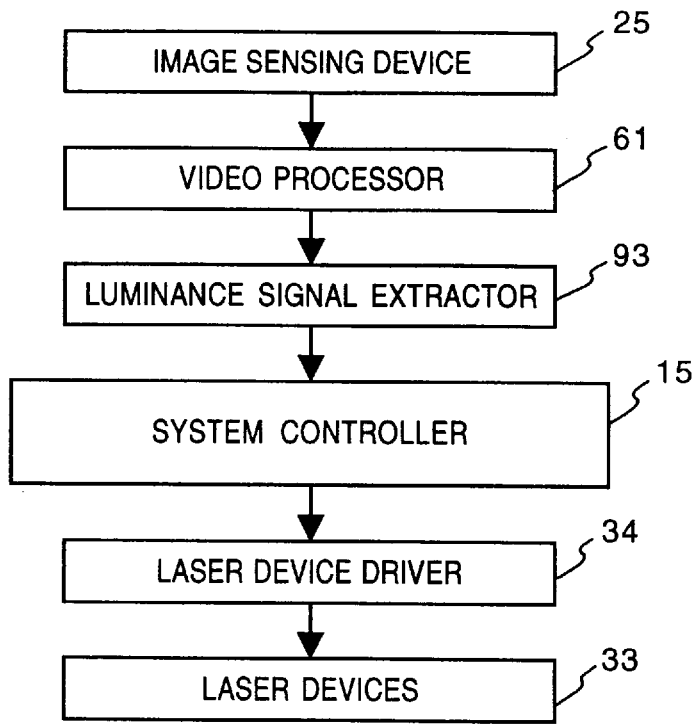
FIGS. 34A and 34B are block diagrams respectively showing an object detecting method in the fourth embodiment.

Next, original detection methods by the original detection device will be described with reference to FIGS. 34A, 34B and FIG. 26. A luminance signal level indicative of the luminance of the base 7 is stored in the memory of the system controller 15 in advance, and the stored signal level is always compared with a luminance signal level from the image against device 25. When the signal levels do not coincide, it is determined that an object is placed on the base 7. As shown in FIG. 34A, the information read by the image sensing device 25 is transferred via the video processor 61, as a video signal, to a luminance signal extractor 93 where a luminance signal is extracted (step S15). The luminance signal is transferred to the system controller 15 and compared with the luminance signal level stored in the memory (a luminance level storage 153e in FIG. 30B) of the system controller 15. If the compared two luminance signal levels do not coincide (step S16), it is determined that an object is placed on the base 7.

Then, the system controller 15 controls the laser device drivers 34 to inhibit light emission by the laser devices 33 (step S18) after a predetermined period (step S17). This period is measured (step S17) by a timer included in the system controller 15.

Note that as a video signal upon image-sensing an original having characters includes a high-frequency component, detection of object on the base 7 may be made by determining existence/absence of high-frequency component within a video signal.

Figure 34B:
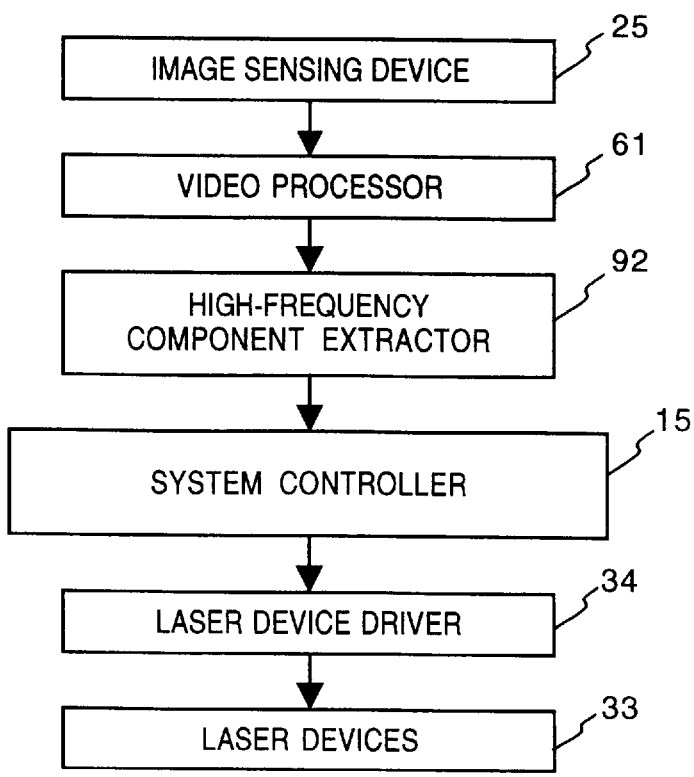

FIG. 34B shows this original detection operation. The information read by the image sensing device 25 is transferred via the video processor 61 as a video signal to a high-frequency extractor 92 which determines whether or not the video signal includes a high-frequency component. The determination signal indicative of the existence/absence of high-frequency component is always transferred to the system controller. When a high-frequency component is detected, it is determined that an original as an object is placed on the base 7. Then, the system controller 15 controls the laser device drivers 34 to inhibit light emission by the laser devices 33 after a predetermined period. This period is measured by the timer of the system controller 15.

These object detection methods (area P surrounded with a broken line in FIG. 26) shown in FIGS. 34A and 34B may be used at the same time.

If the object is removed from the base 7 but still the luminance signal levels do not coincide or a high-frequency component is not detected, the laser devices 33 emit light again (step S14). In a case where the HD size monitor 3' is connected to the apparatus main body, the user manipulates an HD size switch 96 at the wireless remote controller 18 (step S22). Then, the image sensing area for the image sensing device 25, the length/width ratio and the inclination of the four illumination units 14 with respect to the camera lens 13 change to the image sensing area, the length/width ratio and the inclination as shown in FIG. 22B. Further, the resistance/rotation data table currently for the normal mode is changed to the data table for the HD mode.

The image sensing device 25 changes the size of the image sensing area having the 3:4 length/width (aspect) ratio to the size having the 9:16 length/width (aspect) ratio (step S23). The four illumination units 14 around the camera lens 13 move the positions corresponding to the HD mode (step S25) as shown in FIGS. 24A and 24B, by rotation of the cam ring 80 (step S24). Further, the illumination units 14 rotate (step S27) in the arrow F direction in FIGS. 23A and 23B, by the driving force of the rotation motors 82 (step S26).

As shown in FIG. 35, even though the zoom ring is at the same zoom position, the size of a circle 98 connecting the four corners of the normal-size image sensing area and that of a circle 97 connecting the four corners of the HD-size image sensing area are different. For this reason, the illumination units 14 move as described above to move the positions of the spot lights 36 indicating an image sensing area by the difference amount 99 between the two circles. To irradiate the spot lights 36 at the positions respectively corresponding to these two sizes, the illumination units 14 rotate by an appropriate amount to change the inclination with respect to the lens barrel (step S27).

Note that as the difference amount 99 is determined from the both aspect ratios, the rotation motors 82 are rotated by an amount corresponding to the difference amount. The rotation amount at this time is stored in the memory of the system controller 15, and the rotation is controlled in accordance with a switching signal from the HD size switch 96.

Next, the data table of the resistor value, the rotational amount and the rotational direction of the rotation motors 82 currently for the normal mode is changed to the data table for the HD mode (step S28).

Note that when the HD mode is changed to the normal mode, the user presses the HD size switch 96 again (step S22). Then, the above operations are made in a reversed manner (steps S29 to S34). The image sensing apparatus of this embodiment has the sub power switch 38 at the wireless remote controller 18. If the user turns the sub power switch 38 off (step S19) while the main power switch 16 is on, the signal from the sub power switch 38 is transmitted to the system controller 15, and the system controller 15 temporarily shuts down the power of the apparatus (step S20). When the user presses the sub power switch 38 again to turn the power of the apparatus on (step S21), the apparatus status returns to the image-sensing possible status, and the processings on turning on the main power switch 16 are performed.

When the spot lights 36 indicating an image sensing area are not irradiated on the base 7 and the user wants to confirm the image sensing area, the user presses a forced irradiation button 44 provided on the wireless remote controller 18 (step S35). Then, the operation signal is transmitted to the system controller 15, and the system controller 15 controls the laser device drivers 34 to cause the laser devices 33 to emit light (step S36). The wireless remote controller 18 has a light-out button 45 for forcibly turning off the spot lights. The laser devices, which started light emission by the pressing of the forced irradiation button 44, continue to emit light until the light-out button 45 is pressed. When the light-out button 45 is pressed (step S37), as shown in the flowchart in FIG. 27, the operation signal is transmitted to the system controller 15, and the system controller 15 controls the laser device drivers 34 to turn the laser devices 33 off (step S38). Note that the light-out button 44 can be used to turn off the laser devices 33 which emit light in other cases than the above case where the forced irradiation button 45 has been pressed.

Further, the user can change the size of the image (field of view) of the original 6 displayed on the monitor 3 (3') by manipulating a zoom button 46 provided on the wireless remote controller 18. When the user manipulates the zoom button 46 (step S39), zooming operation is performed (step S41), and a value of the variable resistor 21b is transferred to the system controller 15. The system controller 15 drives the rotation motors 82 to rotate the illumination units 14 by an appropriate amount (steps S42 and S43). At the same time, the system controller 15 controls the laser device drivers 34 to inhibit light emission by the laser devices 33 (step S40). This prevents irradiation of the spot light 36 when the zoom button 46 is manipulated.

When the manipulation of the zoom button 46 is completed (step S44), the operation signal is transmitted to the system controller 15, and the system controller 15 controls the laser device drivers 34 to cause the laser devices to emit light (step S45). In this manner, after zooming, whatever position the zoom ring 21 is set, the spot lights 36 are irradiated, accordingly, the user can quickly confirm the image sensing area indicated by the spot lights 36. The image sensing status in the normal mode when the zoom ring 21 is set to the tele-end position is as shown in FIG. 5. In FIG. 5, the image sensing area is indicated by the four spot lights 36, and the area is enlarged and displayed on the image screen of the monitor 3.

As the image portion to be enlarged is clearly indicated by the four spot lights 36, the user can move the original 6 so that a portion to be enlarged is within the image sensing area. Further, the image sensing area is indicated by the spot lights 36 irradiated from a position above the base 7, the spot lights are not hidden with by object such as the original 6, thus reliably indicate an image sensing area regardless of the size of the object. The indication of image sensing area by the spot lights 36 allows the user to know the image-sensed portion on the base 7 without looking at the monitor 3. Note that in the image sensing in the HD mode, similar advantages can be obtained.

The light emission by the laser devices 33 at this time is automatically stopped (step S47) when a predetermined period has elapsed (step S46) after the manipulation of the zoom button 46. The emission period is the same as the emission period in object detection operation, and also measured by the timer of the system controller 15 (step S46). Note that the laser devices 33 continue to emit light so far as the camera head 9 and the pan base 10 are at the original sensing positions and the object detection device does not detect an object.

The image sensing apparatus of this embodiment has a zoom position designation device for selecting the most appropriate zoom position quickly. The wireless remote controller 18 has three designation buttons 47 to 49 for designating zoom positions and three selection buttons 50 to 52 for selecting the designated zoom positions. That is, three zoom positions are stored in the memory in the system controller 15. In this example, the wide-end zoom position as shown in FIG. 22A is designated as a first position; the tele-end zoom position as shown in FIG. 5, as a second position; and a zoom position intermediate between the wide-end and tele-end positions, as a third position. First, the zoom position is set to the wide-end position by manipulating the zoom button 46.

In this state, if the first zoom-position designation button 47 on the wireless remote controller 18 is pressed (step S48), the designation signal is transmitted to the system controller 15, and the value of the variable resistor 21b on the zoom ring 21 at this time is stored into the memory (zoom position storage 153c in FIG. 30B) of the system controller 15 (step S51). Similarly, if the zoom position is set to the second or third zoom position and the second or third zoom-position designation button 48 or 49 is pressed, (steps S49 and S50), the value of the variable resistor 21b at the designated zoom position is stored into the memory of the system controller 15 (step S51).

Thereafter, if the first zoom-position selection button 50 is pressed (step S52), the selection signal is transmitted to the system controller 15, and the system controller 15 controls the zoom motor driver 39 to drive the zoom motor 23, to rotate the zoom ring 21 to the zoom position designated using the first zoom-position designation button 47 (step S55). If the second zoom-position selection button 51 is pressed, the zoom ring 21 is rotated to the zoom position designated using the second zoom-position designation button 48 under the control of the system controller 15. If the third zoom-position selection button 52 is pressed, the zoom ring 21 is rotated to the zoom position designated using the third zoom-position designation button 49 under the control of the system controller 15.

Figure 28:
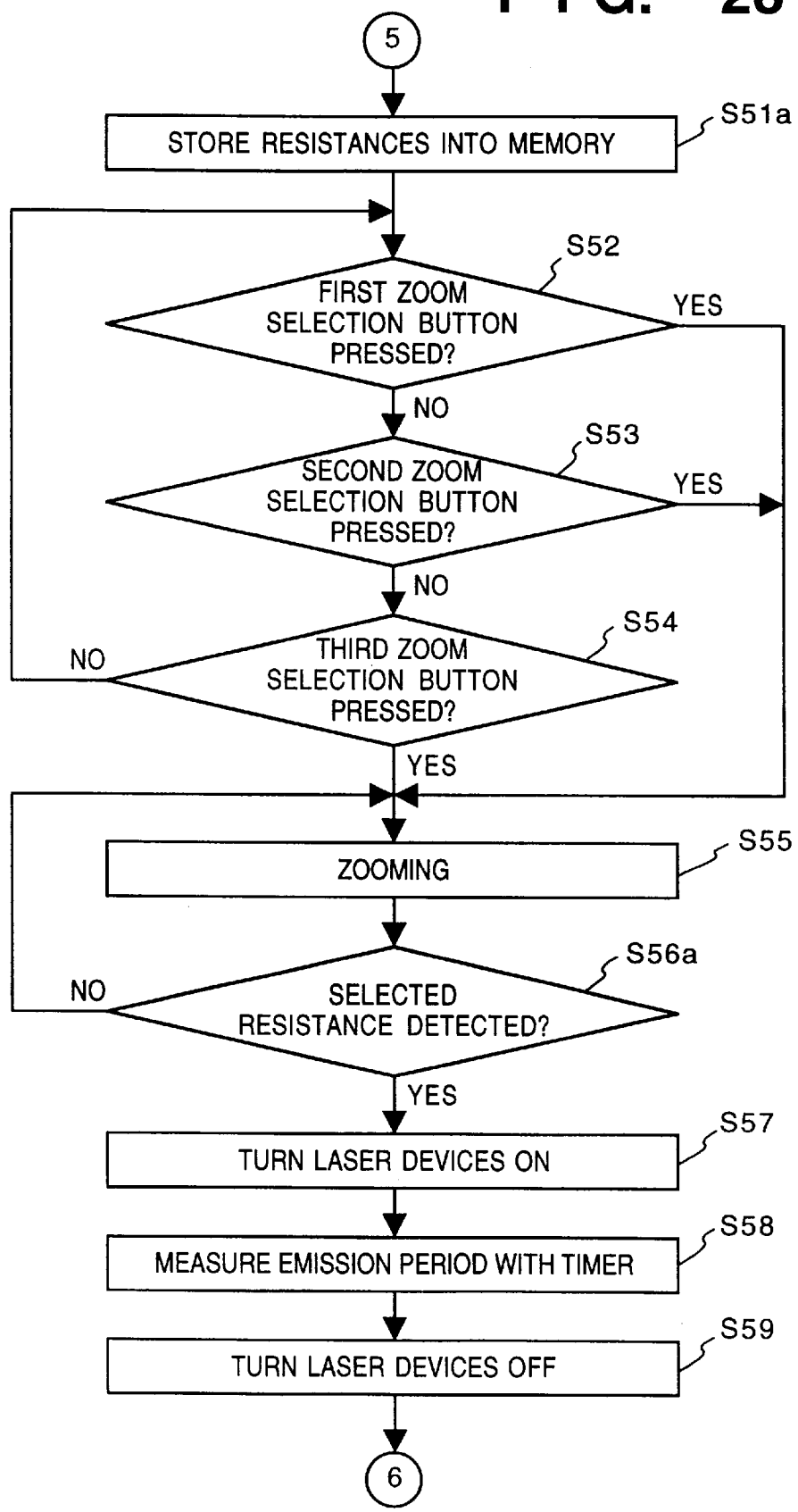
Figure 29:
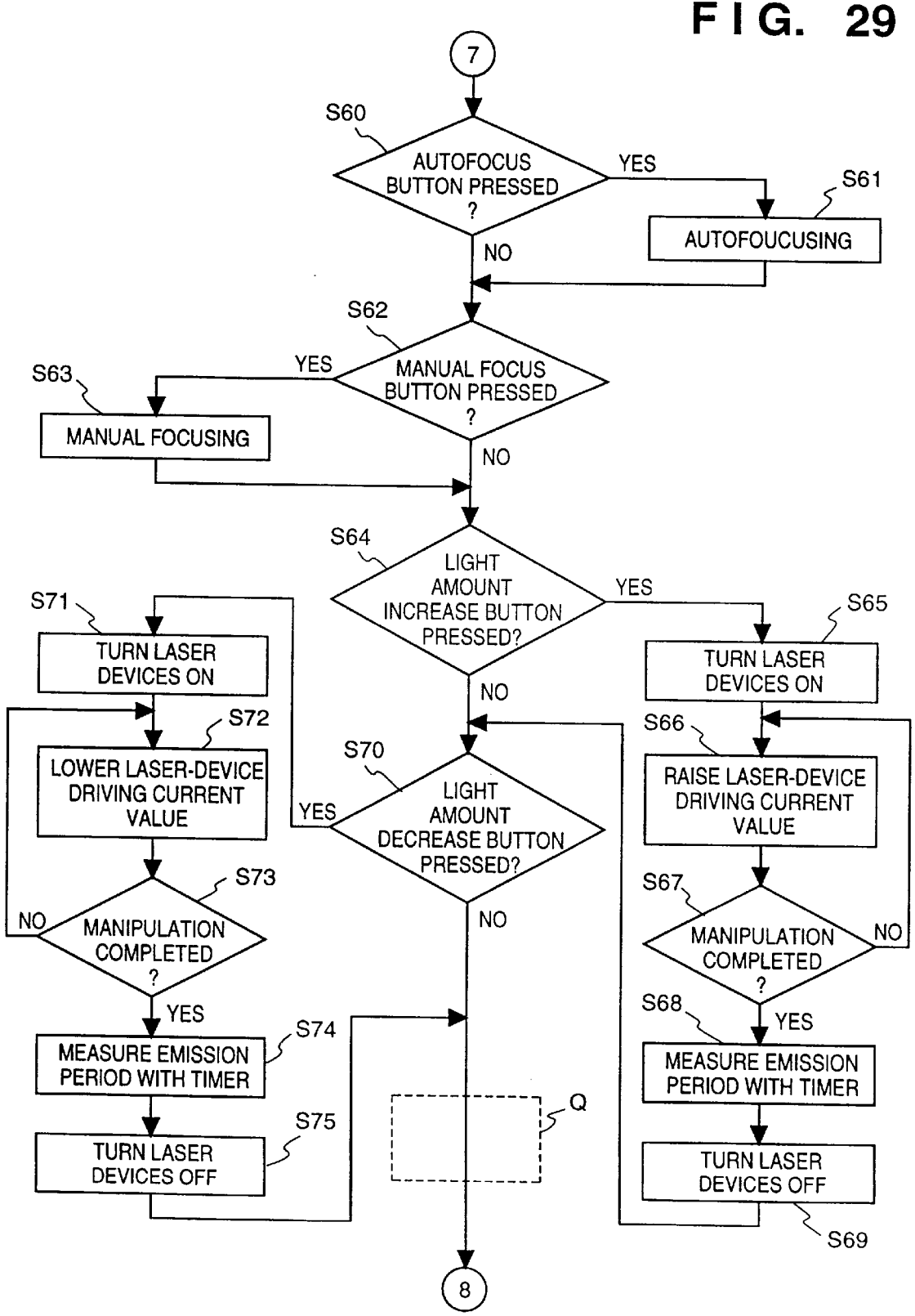

As the values of the variable resistor 21b at the respective zoom positions designated using the first to third zoom-position selection buttons 50 to 52 (steps S52 to S54) are detected (step S56), the selection signals are transmitted to the system controller 15, and the system controller controls the laser device drivers 34 to cause the laser devices 33 to emit light (step S57), as shown in the flowchart in FIG. 28. The light emission by the laser devices 33 is terminated (step S59) after a predetermined period (step S58) which is the same as the period in the object detection operation.

The light emission period is also measured by a timer included in the system controller 15 (step S58). Note that the laser devices 33 continue to emit light as long as the camera head 9 and the pan base 10 are at the original sensing positions and the object detection device does not detect an object. The zoom positions designated using the first to third zoom-position designation buttons 47 to 49 are not changed or deleted unless designation is made again. If the power switch (main power switch 16 or sub power switch 38) is turned on, the zoom position designated with the first zoom-position designation button 47 is automatically set (step S3).

Further, if the zoom position is not designated with the first zoom-position designation button 47, when the power switch (main power switch 16 or sub power switch 38) is turned on, the wide-end zoom position is automatically set (step S4).

It should be noted that the number of zoom-position designation buttons is not limited to three.

The wireless remote controller 18 further has an autofocus button 53 and a manual focus button 54 for selecting autofocusing or manual focusing in accordance with necessity. If the autofocus button 53 or the manual focus button 54 is manipulated (steps S60 and S62), the operation signal is transmitted to the system controller 15, and the system controller 15 controls a focus driver 55 to drive the focus motor 24, to rotate the focus ring 22 by an appropriate amount. Thus, if the autofocus button 53 is manipulated, focusing is automatically made (step S61). If the manual focus button 54 is manipulated, the user can manually adjust the focusing to an desired position (step S63).

As described in the above embodiment, the present apparatus is not only used to take an image of an object such as an original 6 placed on the base 7, but also used as a simplified camera, for example, for taking an image of a large panel stuck on a wall or an image of human joined to teleconference by rotating the camera head 9 and the pan base 10 by predetermined angle. The camera head 9 and the pan base 10 can be rotated manually in the present apparatus, however, the rotation is also performed automatically by adding a driving means to the present apparatus.

It should be noted that the rotation operation of the camera head 9 and that of the pan base 10 are the same as those in the first embodiment.

The respective original sensing positions of the camera head 9 and the pan base 10 are detected by sensors, and when the camera head 9 and the pan base 10 are out of the original sensing positions (steps S7 and S8), the system controller 15 inhibits light emission by the laser devices 33 (step S9).

When the camera head 9 and the pan base 10 are returned to the original sensing positions from other positions (step S10), the detection signals are transferred to the system controller 15, and the system controller 15 controls the laser device drivers 34 to cause the laser devices 33 to emit light (step S14).

The light emission by the laser devices 33 at this time is terminated (step S18) after a predetermined time period (step S17). Also, this period is the same as that in the object detection, and the period is measured by the timer of the system controller 15 (step S17). Note that if the object detection device does not detect an object, the laser devices 33 continue to emit light.

It should be noted that similar to the first embodiment, a lighting device may be attached to the image sensing apparatus. Also, similar to the first embodiment, the peripheral light amount around the apparatus can be controlled by using light amount adjustment buttons.

Note that the image-sensing area illumination device is not limited to the laser device, however, other devices, for example, a general lamp may be used. Further, the indication of image sensing area is not limited to the spot lights irradiated on the four corners of the image sensing area, however, the image sensing area may be framed up with light line(s). Furthermore, the image-sensing area illumination device may be replace with any other device as long as the device can indicate an image sensing area.

As described above, the image sensing apparatus of the present embodiment enables quick confirmation of an image sensing area for placing an original on the base. Further, as the apparatus turns the image-sensing area illumination device for only the necessary period, the apparatus saves electric consumption. And the apparatus enables reliable indication of image sensing area when needed. Further, the apparatus can reliably indicate an image sensing area regardless of the size of an original. Furthermore, as the illumination range of the image-sensing area illumination device changes in correspondence with the length/width ratio of an image sensing area, the apparatus can correctly indicate the image sensing area.

[Fifth Embodiment]

In this embodiment, the image sensing apparatus can clearly indicate an image sensing area even if an original having a plurality of colors is image-sensed, by changing each color of spot lights irradiated on the four corners of the image sensing area.

Next, object-color detection in the fifth embodiment will be described with reference to FIGS. 33, 36A, and the flowchart in FIG. 37. In this embodiment, a color detection device of the apparatus compares chroma signals at four corner areas and a base 7 in a normal-size image sensing area and in an HD-size image sensing area stored in a memory, with the chroma signals of an original inputted from an image sensing device 25, to detect the color of the original. The four corner areas of the normal/HD-size image sensing area will be described below.

FIGS. 33A and 33B respectively show the normal-size image sensing area and the HD-size image sensing area. Both areas, displayed on the image screen of a monitor, are smaller than an image sensing area of the image sensing device 25. In FIGS. 33A and 33B, spot lights 36 substantially represent the four corner areas of which chroma signals are stored in the memory. The normal-size image sensing area is changed to the HD-size image sensing area, or vice versa, by pressing an HD size switch 96. Note that an image sensing area actually displayed on a monitor 3 somewhat changes depending upon the type of the monitor.

As shown in FIG. 36, a video signal from the image sensing device 25 is always transferred via the video processor 61 to a chroma signal extractor 90, where a chroma signal is extracted (step S76). The extracted chroma signal is transferred to the system controller 15, and is divided into chroma signals at four corner areas of the normal/HD-size image sensing area (step S77). Then, the phase of the chroma signal from image-sensing the base 7, stored in the memory of the system controller 15, is compared with the phases of the chroma signals at the four corner areas read by the image sensing device 25 (steps S78, S80, S82 and S84). The object color detection is made such that, e.g., a phase shift amount is represented by angle in a counterclockwise direction, with 0° as a reference angle representing a white chroma signal, more specifically, if the angle is about 103.5°, the object color is red; if the angle is about 240.6°, the object color is green; and if the angle is about 347.6°, the object color is blue. This color detection based on the relation between phase shift angles and a color is well known, therefore, the detailed explanation of this technique will be omitted.

The present image sensing apparatus has a multicolor LED capable of emitting red, green and orange lights, and independently changes colors of the spot lights 36 from the illumination devices, by selecting one of four colors including the above three colors and a white light by a lamp. In a case the above color detector is used, if a phase shift angle is 0° or greater and less than 91° (step S78), white is selected as the spot light color; if the phase shift angle is 91° or greater and less than 181° (step S80), green is selected (step S81); if the phase shift angle is 181° or greater and less than 271° (step S82), red is selected (step S83); and if the phase shift angle is 271° or greater and less than 360° (step S84), orange is selected (step S85). Then, the respective spot lights are irradiated (step S86).

The above-described object color detection is made when the illumination units do not emit light. The relation between the phase shift amount and the corresponding illumination color is stored in the memory of the system controller 15. Note that the color selection is not limited to this selection based on the above relation, however, any spot lights may be employed so far as they clearly indicate an image sensing area regardless of the color of an object.

Figure 36A:
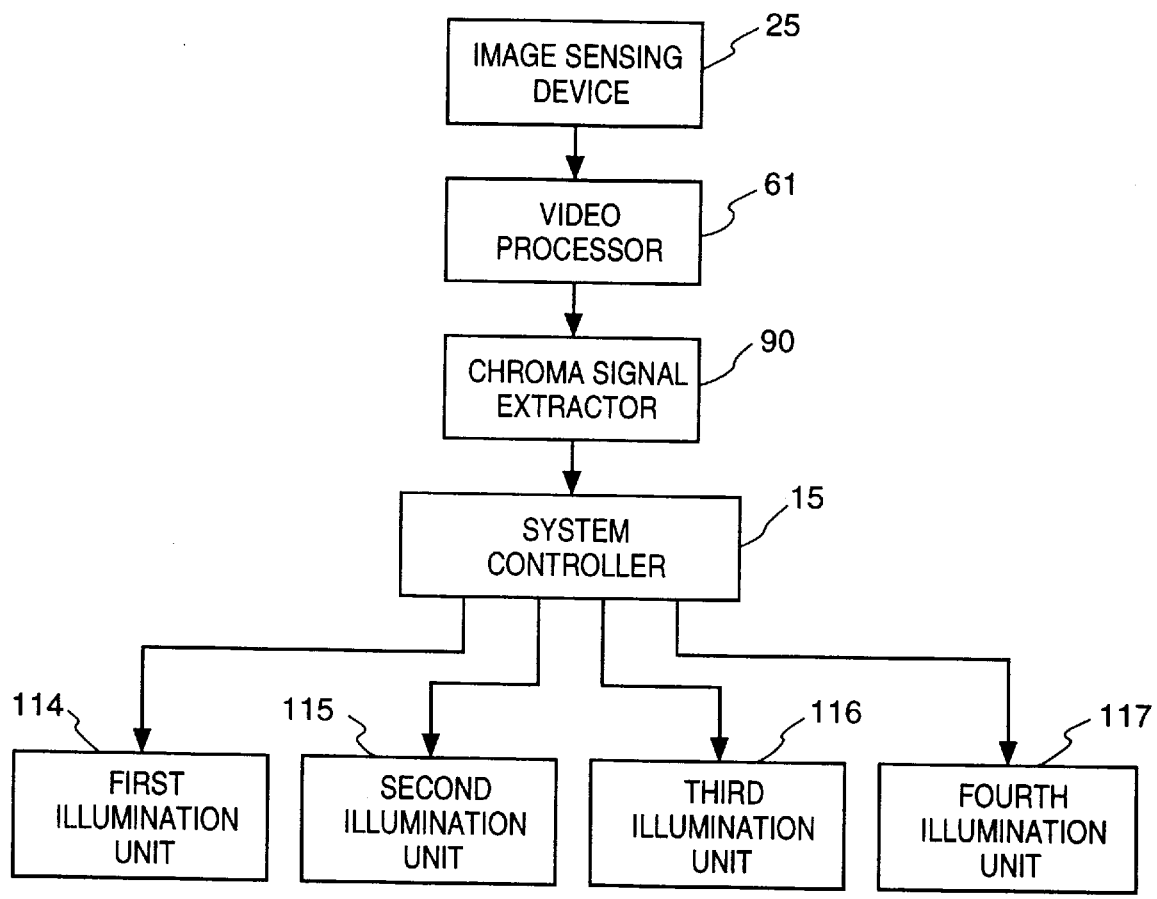
FIG. 36A is a block diagram showing the construction of a illumination control system in a fifth embodiment of the present invention.
Figure 36B:
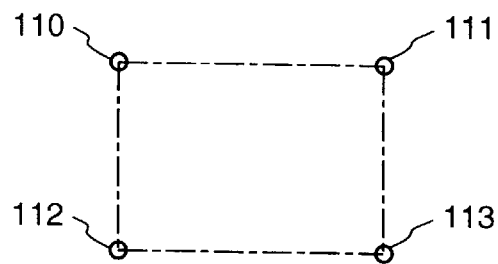
FIG. 36B illustrates an image sensing area in the fifth embodiment.
Figure 37:
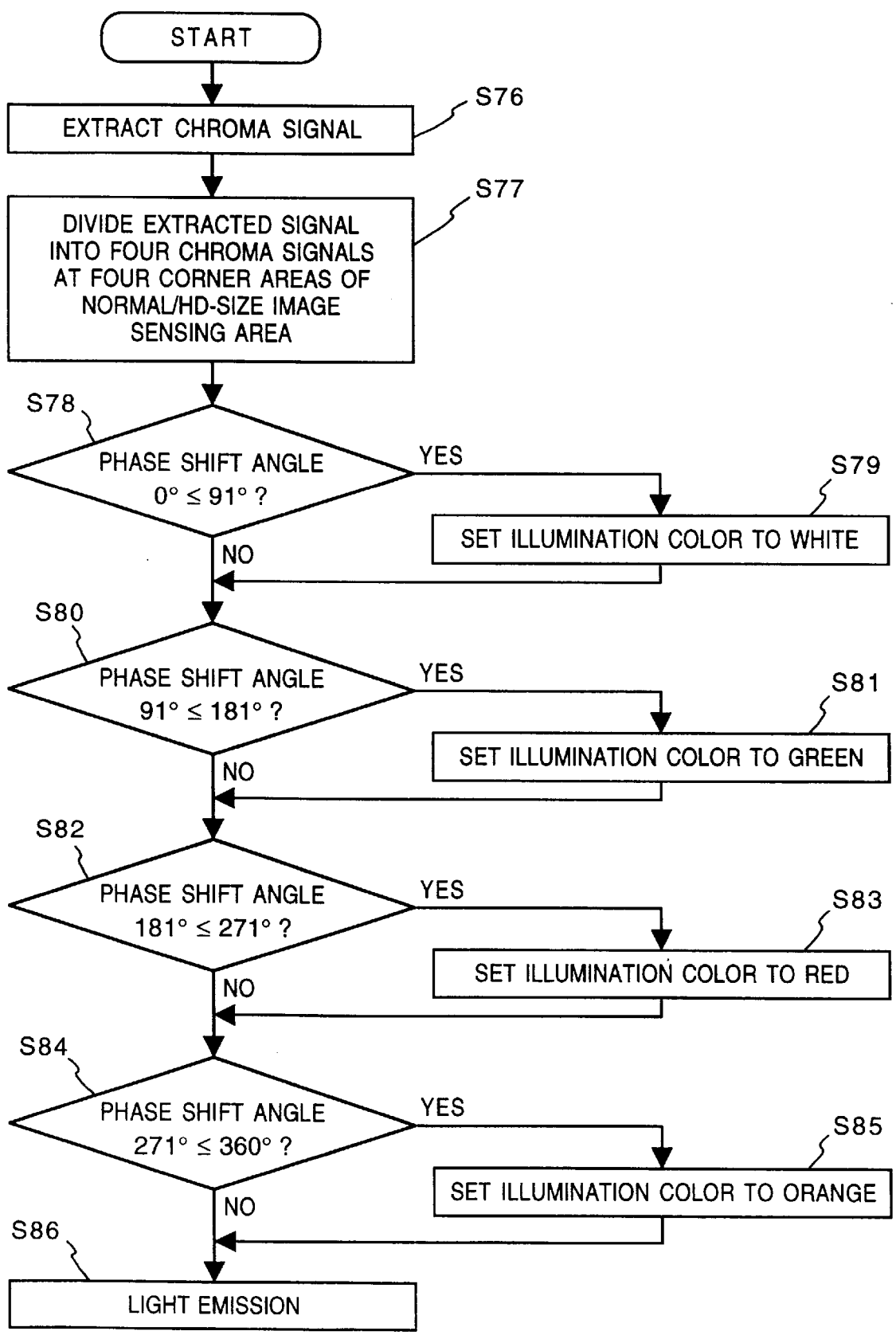
FIG. 37 is a flowchart showing the operation of the fifth embodiment.

In FIGS. 36A and 36B, numeral 114 denotes a first illumination unit corresponding to a first spot light 110; 115, a second illumination unit corresponding to a second spot light 111; 116, a third illumination unit corresponding to a third spot light 112; and 117, a fourth illumination unit corresponding to a fourth spot light 113.

In this example, the color of the first spot light 110 is white; the color the second spot light 111, red; the color of the third spot light 112, green; and the color of the fourth spot light 113, orange. In the first illumination unit 114, the lamp 180 emits light under the control of the system controller 15. In the second illumination unit 115, the LED driver 190 causes the red-light emitting device of the multicolor LED 181 to emit light under the control of the system controller 15. In the third illumination unit 116, the LED driver 190 causes the green-light emitting device to emit light under the control of the system controller 15. In the fourth illumination unit 117, the LED driver 190 causes the red-light emitting device and the green-light emitting device to emit light at the same time under the control of the system controller 15.

In this manner, the illumination units respectively corresponding to the spot lights emit light in one of a plurality of colors, in accordance with the color of an object. Note that in the flowcharts in FIGS. 25 to 29, the "turn laser device on" steps are replaced with the flowchart in FIG. 37.

Figure 38:
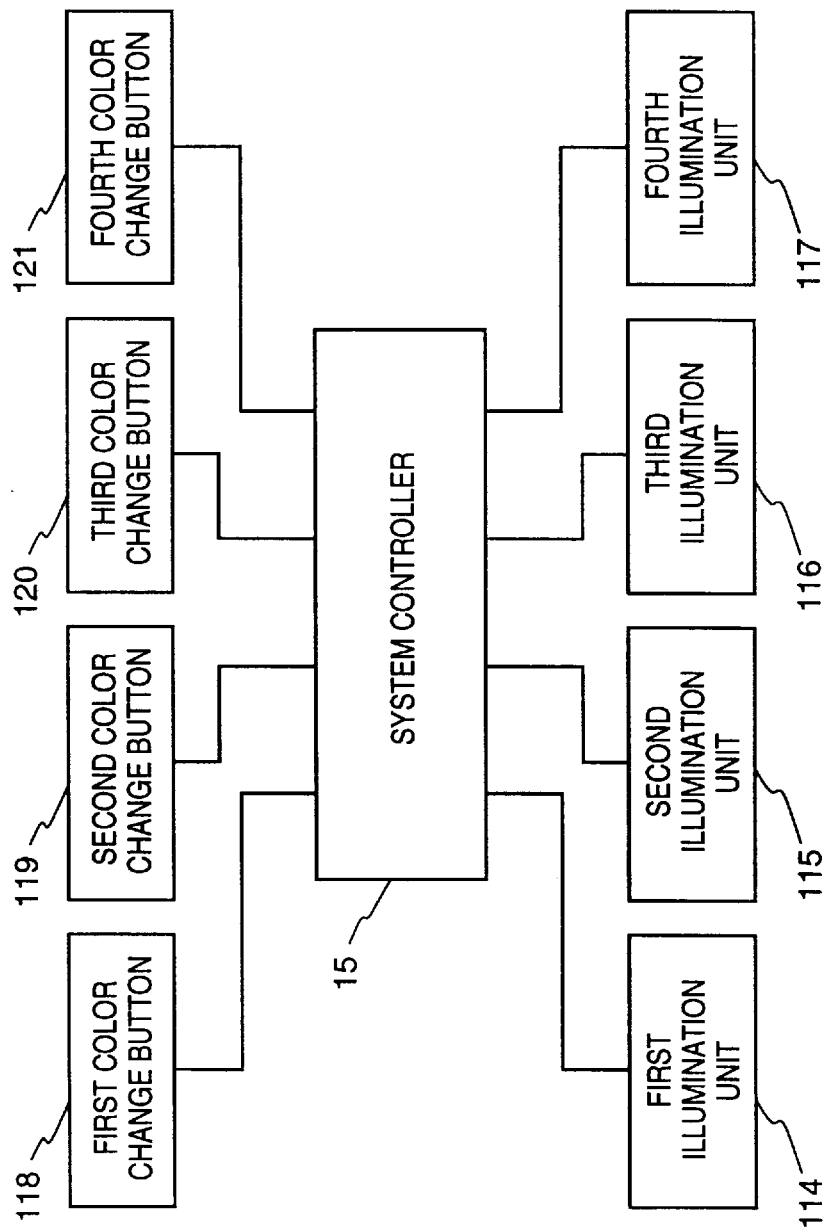
FIG. 38 is a block diagram showing the construction of an illumination control system in the fifth embodiment.

If necessary, the colors of the first to fourth spot lights 113 can be independently changed. In FIG. 38, the wireless remote controller 18 has four color change buttons corresponding to the four illumination units. Numeral 118 denotes a first color change button corresponding to the first illumination unit 114; 119, a second color change button corresponding to the second illumination unit 115; 120, a third color change button corresponding to the third illumination unit 116; and 121, a fourth color change button corresponding to the fourth illumination unit 117. Each color change button comprises a push button, to be pressed once for selecting white; twice, for red; three times, for green; and four times, for orange.

Figure 39:
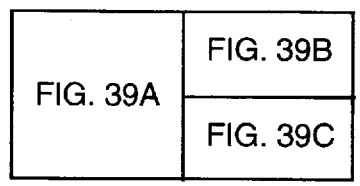
FIG. 39 comprised of FIGS. 39A–39C is a flowchart showing the operation of the fifth embodiment.
Figure 39A:
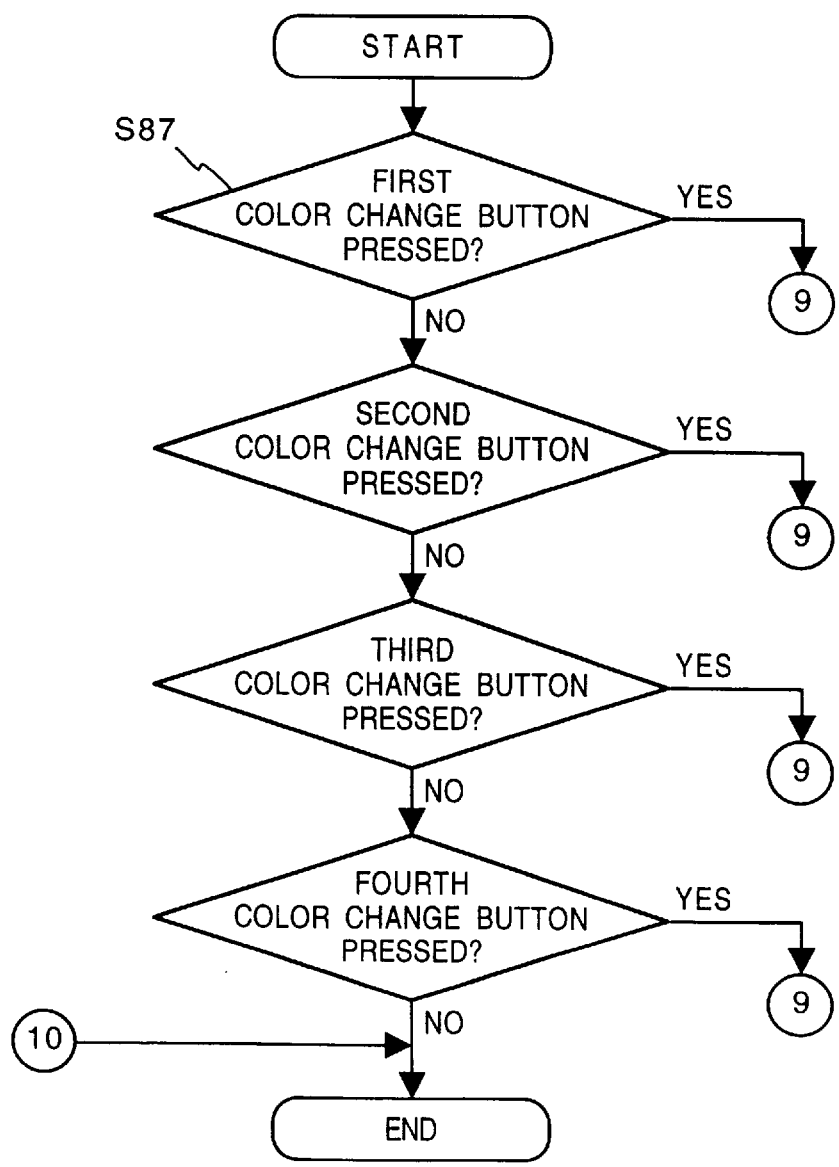
Figure 39B:
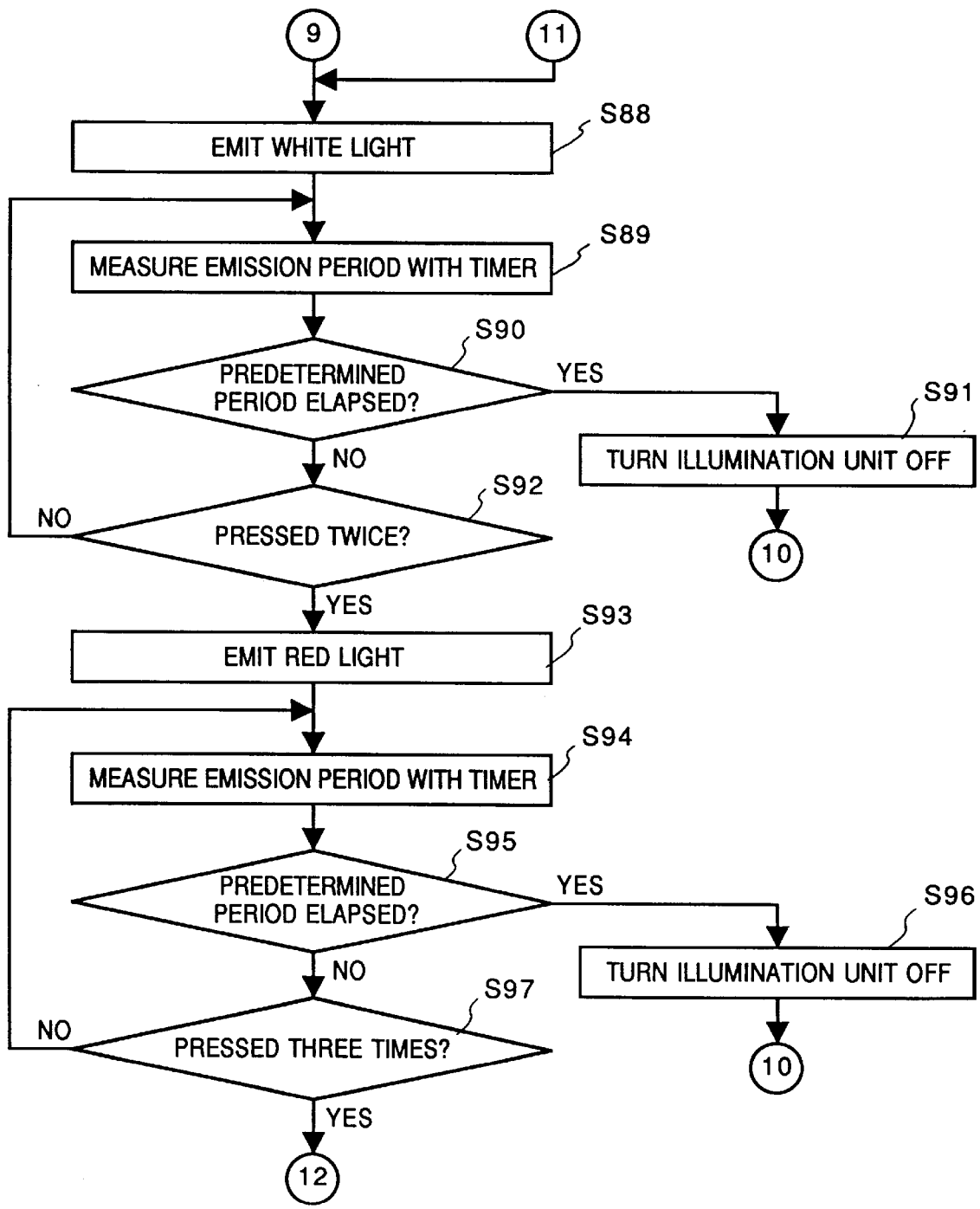
Figure 39C:
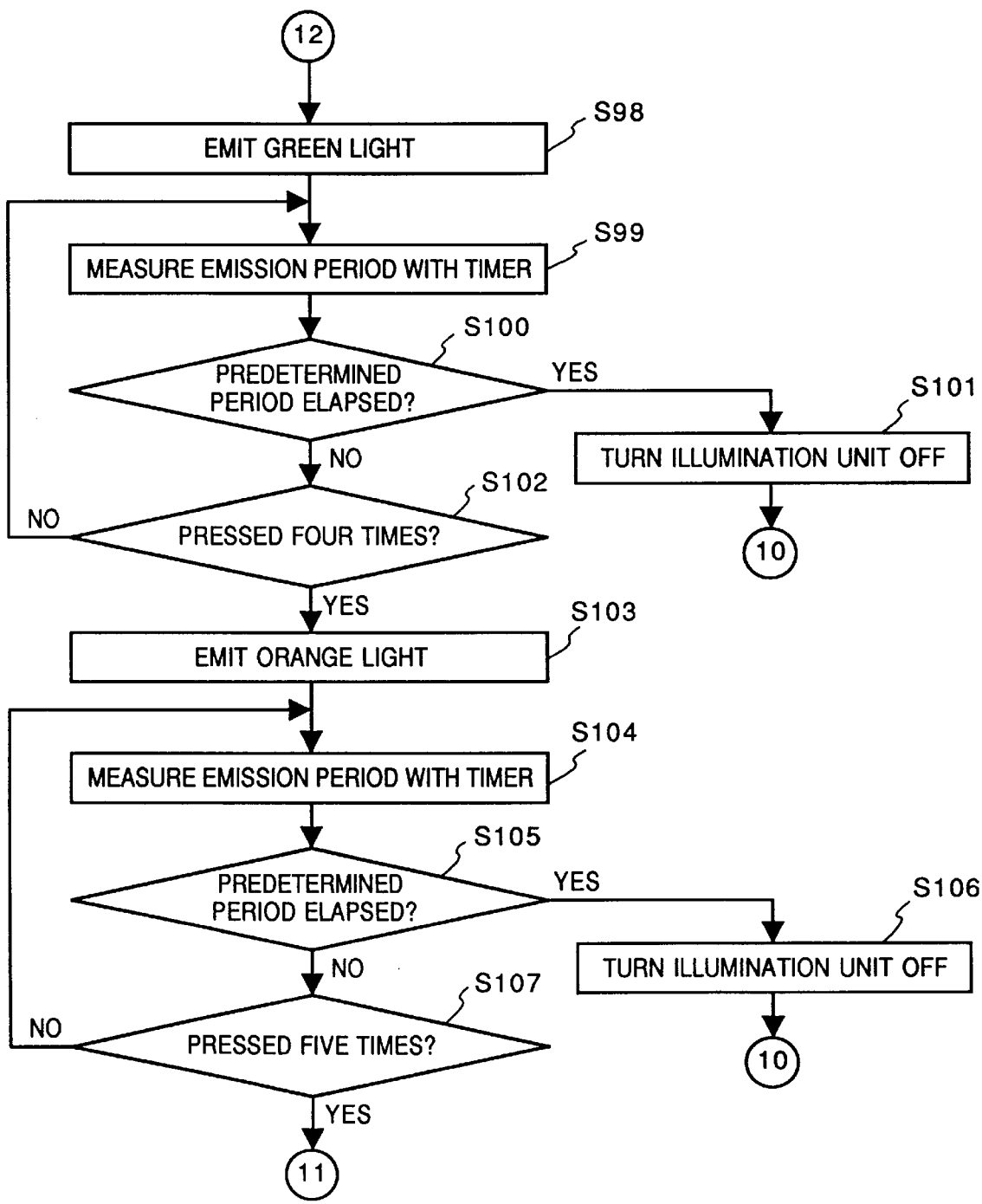
Figure 40:
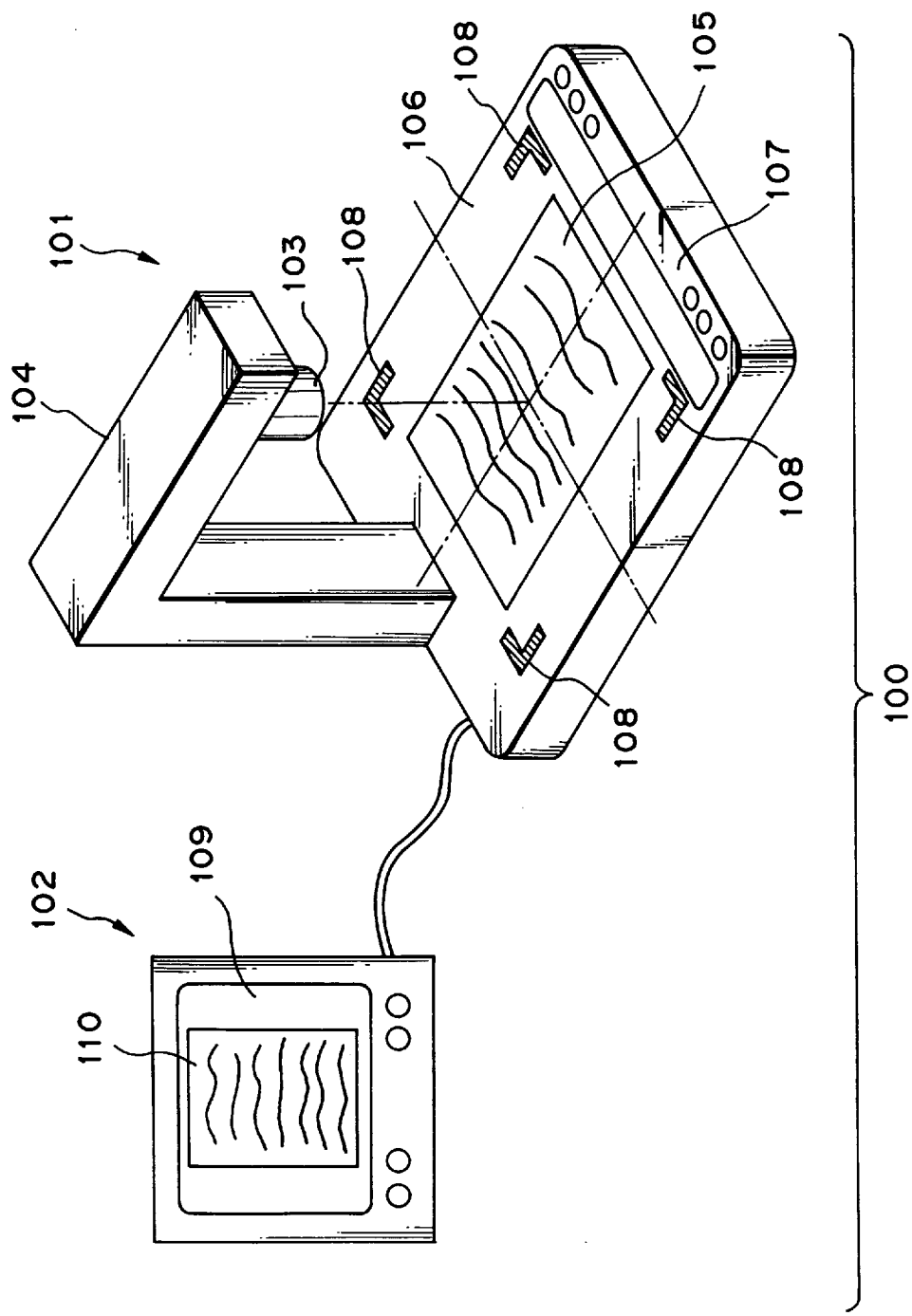
FIG. 40 is a perspective view showing the construction of a conventional image sensing apparatus.

The illumination color change will be described with reference to FIG. 38 and the flowchart in FIG. 39. In a case where the spot lights 36 are not irradiated, if the first color change button 118 is pressed once (step S87), the operation signal is transmitted to the system controller 15, and the system controller 15 controls the lamp driver 189 of the first illumination unit 114 to cause the lamp 180 to emit light (step S88). Thus, the first spot light 110 (FIG. 36B) corresponding to the first illumination unit 114 is emitted in white.

Further, in a case where the first illumination unit 114 emits light in a color other than white, if the first color change button 118 is pressed once, the system controller 15 controls the lamp 189 driver to cause the lamp 180 to emit light. If the first color change button 118 is pressed twice (step S92), the operation signal is transmitted to the system controller 15, and the system controller 15 controls the LED driver 190 of the first illumination unit 114 to cause the red-light emitting device of the multicolor LED 191 to emit light. Thus, the color of the first spot light 110 (FIG. 36B) changes to red (step S93).

If the first color change button 118 is pressed three times (step S97), the operation signal is transmitted to the system controller 15, and the system controller 15 controls the LED driver 190 of the first illumination unit 114 to cause the green-light emitting device of the multicolor LED 181 to emit light. Thus, the color of the first spot light 110 (FIG. 36B) changes to green (step S98).

If the first color change button 118 is pressed four times (step S102), the operation signal is transmitted to the system controller 15, and the system controller 15 controls the LED driver 190 of the first illumination unit 114 to cause the red-light emitting device and the green-light emitting device of the multicolor LED 181 to emit light. Thus, the color of the first spot light 110 (FIG. 36B) changes to orange (step S103).

If the first color change button 118 is pressed five times (step S107), the color selection returns to the initial pressing for white-light selection (step S87), so that the first illumination unit 114 emit white light (step S88).

The light emission period by the lamp 180 and that by the multicolor LED 181 are measured by the timer of the system controller 15 (steps S89, S94 and S99), and automatically stopped (steps S91, S96, S101 and S106) after a predetermined period (steps S90, S95, S100 and S105). Note that the illumination color change is made by successively manipulating the color change buttons within the emission period of the illumination units, and if these color change buttons are manipulated outside the emission period, the color change is started as the initial pressing of the color change button (step S87).

Note that the illumination colors of the other illumination units (steps S108 to S110) are made in similar manners. Further, the construction of the multicolor LED 181 and the light color changing are well known, therefore the detailed explanations will be omitted. Furthermore, the color change order is not limited to that as described above. In this embodiment, the flowchart in FIG. 39 is inserted into a broken line portion Q in FIG. 29 in the first embodiment.

As described above, the image sensing apparatus having this construction irradiates spot lights 36 respectively in an appropriate color corresponding to the color of an original as an object or the peripheral light amount around the apparatus, thus indicates an image sensing area more clearly. As the spot lights can be controlled independently, even if the original has a plurality of colors at different portions, the most appropriate color at each spot-lighted portion can be selected. In addition, the apparatus provides a user with reliable indication of image sensing area, and allows the user to confirm the image sensing area quickly.

In this embodiment, the number of spot light colors is four, however, the number is not limited to four; for example, the spot light color may be selected from two colors. Further, the image-sensing area illumination device may be replace with any other device so far as the device can indicate an image sensing area.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to appraise the public of the scope of the present invention, the following claims are made.

What is claimed is:

1. An image sensing apparatus comprising:

an input means for inputting an object image; and illumination means for irradiating light on an original to indicate an image sensing area in which the object image is inputted by said input means, wherein said input means inputs the object image through a lens unit but said illumination means irradiates the light without using the lens unit.

2. The apparatus according to claim 1, wherein said illumination means has a light-emitting device comprising a laser device which emits visible light.

3. The apparatus according to claim 1, wherein said illumination means has a light-emitting device comprising a lamp which emits visible light.

4. The apparatus according to claim 1, wherein a size of the image sensing area indicated by the light from said illumination means is larger than an area where object image inputted by said input means is displayed on an image screen of a monitor.

5. The apparatus according to claim 1, further comprising illumination color changing means for changing the color of the light irradiated from said illumination means.

6. The apparatus according to claim 5, wherein said illumination means has a light-emitting device comprising a laser device which emits visible light.

7. The apparatus according to claim 5, wherein said illumination means has a light-emitting device comprising a lamp which emits visible light.

8. The apparatus according to claim 5, wherein said illumination changing means changes a color of the light from said illumination means to one of at least two colors.

9. The apparatus according to claim 5, wherein a size of the image sensing area indicated by the light from said illumination means is larger than an area where the object image inputted by said input means is displayed on an image screen of a monitor.

10. The apparatus according to claim 1, further comprising emission timing control means for controlling emission timing of said illumination means.

11. The apparatus according to claim 10, wherein said illumination means has a light-emitting device comprising a laser device which emits visible light.

12. The apparatus according to claim 10, wherein said illumination means has a light-emitting device comprising a lamp which emits visible light.

13. The apparatus according to claim 1, further comprising light-out means for turning off said illumination means when a predetermined period has elapsed since said illumination means started to emit light.

14. The apparatus according to claim 13, wherein said illumination means has a light-emitting device comprising a laser device which emits visible light.

15. The apparatus according to claim 13, wherein said illumination means has a light-emitting device comprising a lamp which emits visible light.

16. The apparatus according to claim 13, wherein a size of the image sensing area indicated by the light from said illumination means is larger than an area where the object image inputted by said input means is displayed on an image screen of a monitor.

17. The apparatus according to claim 1, further comprising image sensing area changing means for controlling said illumination means to change a size of the image sensing area which is indicated by the light of said illumination means, according to zooming of said lens unit.

18. The apparatus according to claim 17, wherein said illumination means has a light-emitting device comprising a laser device which emits visible light.

19. The apparatus according to claim 17, wherein said illumination means has a light-emitting device comprising a lamp which emits visible light.

20. The apparatus according to claim 17, wherein the size of image sensing area indicated by the light from said illumination means is larger than an area where the object image inputted by said input means is displayed on an image screen of a monitor.

21. An image sensing apparatus having an input means for inputting an object image, comprising:

illumination means for irradiating light to indicate an image sensing area of said input means;

light amount changing means for changing the amount of light irradiated from said illumination means;

lighting means for lighting the object image; and on-off detection means for detecting on/off status of a switch turning on/off said lighting means, wherein said light amount changing means changes the amount of the light irradiated from said illumination means in accordance with a detection signal from said on-off detection means.

22. The apparatus according to claim 21, wherein said illumination means has a light-emitting device comprising a laser device which emits visible light.

23. The apparatus according to claim 21, wherein said illumination means has a light-emitting device comprising a lamp which emits visible light.

24. The apparatus according to claim 21, wherein a size of the image sensing area indicated by the light from said illumination means is larger than an area where the object image inputted by said input means is displayed on an image screen of a monitor.

25. An image sensing apparatus having an input means for inputting an object image, comprising:

illumination means for irradiating light to indicate an image sensing area of said input means;

light amount changing means for changing the amount of light irradiated from said illumination means; and light amount detection means for detecting a peripheral light amount around the apparatus, wherein said light amount changing means changes the amount of the light irradiated from said illumination means in accordance with the peripheral light amount detected by said light amount changing means.

26. The apparatus according to claim 25, wherein said illumination means has a light-emitting device comprising a laser device which emits visible light.

27. The apparatus according to claim 25, wherein said illumination means has a light-emitting device comprising a lamp which emits visible light.

28. The apparatus according to claim 25, wherein a size of the image sensing area indicated by the light from said illumination means is larger than an area where the object image inputted by said input means is displayed on an image screen of a monitor.

29. An image sensing apparatus having input means for inputting an object image, comprising:

illumination means for irradiating light to indicate an image sensing area of said input means;

support means for supporting said input means so that said input means can rotate horizontally and vertically;

original sensing position detection means for detecting an original sensing position where said input means inputs the object image; and inhibition means for inhibiting light emission by said illumination means when said input means is without the original sensing position.

30. The apparatus according to claim 29, wherein said illumination means has a light-emitting device comprising a laser device which emits visible light.

31. The apparatus according to claim 29, wherein said illumination means has a light-emitting device comprising a lamp which emits visible light.

32. The apparatus according to claim 29, wherein a size of the image sensing area indicated by the light from said illumination means is larger than an area where the object image inputted by said input means is displayed on an image screen of a monitor.

33. An image sensing apparatus comprising:

a base on which an original is placed;

image sensing means for reading the original;

original detection means for detecting the existence/absence of the original on said base; and indication means for indicating an image sensing area of said image sensing means on said base, in accordance with detection output from said original detection means.

34. The apparatus according to claim 33, wherein said indication means indicates the image sensing area by irradiating light on said base.

35. The apparatus according to claim 33, wherein said original detection means detects the existence/absence of the original on said base, in accordance with a change of a signal level of an image from said image sensing means.

36. The apparatus according to claim 35, wherein said original detection means detects the existence/absence of the original on said base, in accordance with a change of a luminance signal level of an image from said image sensing means.

37. The apparatus according to claim 33, said original detection means detects the existence/absence of the original on said base, in accordance with the existence/absence of high-frequency component in an image signal from said image sensing means.

38. The apparatus according to claim 33, wherein, if said original detection means detects the existence of the original on said base, said indication means stops indication of the image sensing area after a predetermined period.

39. An image sensing apparatus comprising:

image sensing means for sensing an original;

supporting means for supporting said image sensing means;

indication means for indicating an image sensing area of said image sensing means with a light in at least a color changeable among a plurality of colors; and setting means for independently setting the colors of the light, wherein said image sensing means senses the original through a lens unit, but said indication means indicates the image sensing area without using the lens unit.

40. The apparatus according to claim 39, wherein said indication means indicates the image sensing area by irradiating light on said base.

41. The apparatus according to claim 39, wherein said indication means indicates the image sensing area with four light spots on said base.

42. The apparatus according to claim 39, wherein said indication means indicates the image sensing area with a light line on said base.

43. An image sensing apparatus comprising:

image sensing means for sensing an original;

supporting means for supporting said image sensing means;

indication means for indicating an image sensing area of said image sensing means with a light in at least a color changeable among a plurality of colors;

setting means for independently setting the colors of the light; and color detection means for detecting the color of the original, wherein said setting means sets the colors of the light in accordance with a detection output from said color detection means.

44. An image sensing apparatus comprising:

image-sensing means for reading an original;

supporting means for supporting said image sensing means;

indication means for indicating on the original an image sensing area in which an image can be sensed by said image sensing means; and image sensing area changing means for changing a length/width ratio of the image sensing area;

wherein said indication means changes indication state in accordance with a change of the length/width ratio of the image sensing area.

45. The apparatus according to claim 44, wherein said indication means indicates the image sensing area by irradiating light on said base.

46. The apparatus according to claim 44, wherein said indication means is attached to said image sensing means.

47. The apparatus according to claim 46, wherein said indication means is located at a position which relatively changes with respect to said image sensing means in accordance with the length/width ratio of the image sensing area.

48. The apparatus according to claim 44, wherein said image sensing area changing means changes the image sensing area in accordance with a length/width ratio of an image screen of a monitor provided separately from the apparatus.

49. An image sensing apparatus comprising:

input means for inputting an object image, and illumination means for irradiating marks of light on a surface on which an original is placed to indicate an image sensing area in which the object image is inputted by said input means, wherein said input means inputs the object image through a lens unit, but said illumination means irradiates the marks of light without using the lens unit.

50. The apparatus according to claim 49, further comprising emission timing control means for controlling emission timing of said illumination means.

51. An image sensing apparatus comprising:

image sensing means for reading an original;

supporting means for supporting said image sensing means;

indication means for indicating marks of light on a surface on which the original is placed an image sensing area in which an image can be sensed by said image sensing means; and image sensing area changing means for changing a length/width ratio of the image sensing area, wherein said indication means changes indication state in accordance with a change of the length/width ratio of the image sensing area.

52. An image sensing apparatus comprising:

an input means for inputting an object image;

illumination means for irradiating marks of light on a surface on which an original is placed to indicate an image sensing area in which the object image is inputted by said input means; and light-out means for turning off said illumination means when a predetermined period has elapsed since said illumination means started to emit light, wherein said input means inputs the object image through a lens unit, but said illumination means irradiates the marks of light without using the lens unit.

53. An image sensing apparatus comprising:

an input means for inputting an object image;

illumination means for irradiating marks of light on a surface on which an original is placed to indicate an image sensing area in which the object image is inputted by said input means; and image sensing area changing means for controlling said illumination means to change the size of the image sensing area, interlocking with zooming of said input means, wherein said input means inputs the object image through a lens unit, but said illumination means irradiates the marks of light without using the lens unit.

54. An image sensing method for sensing a desired area on an original, comprising a step of:

irradiating light, which indicates an image sensing area in which an object can be sensed, on the original without using a lens unit through which the object is sensed.

55. The method according to claim 54, wherein the image sensing area is changeable, and a position of irradiating the light is changed in accordance with a change of the image sensing area.

56. The method according to claim 55, wherein the image sensing area is changed with a constant length/width ratio, and the light irradiating position is changed also with a constant length/width ratio.

57. The method according to claim 55, wherein the image sensing area is changed by changing a length/width ratio, and the light irradiating position is changed also by changing a length/width ratio.

58. The method according to claim 54, further comprising the steps of:

measuring brightness around the base; and changing luminance of the light irradiated on the base.

59. The method according to claim 54, further comprising the steps of:

detecting the existence/absence of the original on the base; and controlling irradiation of the light in accordance with a result from said detecting step.

60. The method according to claim 55, further comprising the step of registering a predetermined image sensing position, wherein the light irradiating position is changed to the predetermined image sensing position, in response to an external instruction.

61. The method according to claim 54, further comprising the step of stopping irradiation of the light after a predetermined period.

62. The method according to claim 61, wherein the predetermined period is different from that in a case where a power is turned on and in other cases.

63. The method according to claim 54, further comprising the steps of:

forcibly irradiating the light in response to an external instruction; and forcibly stopping irradiation of the light in response to an external instruction.

64. The method according to claim 54, further comprising the steps of:

detecting an image sensing area for image sensing; and stopping irradiation of the light if the image sensing area is outside a predetermined area.

65. The method according to claim 64, further comprising the step of restarting the irradiation of the light if the image sensing area is returned to the predetermined area.

66. The method according to claim 54, wherein an amount of the light can be changed by an external instruction.

67. The method according to claim 54, wherein the irradiation of the light is made when power is turned on, when the image sensing area is changed, and when an amount of the light is changed.

68. The method according to claim 54, further comprising the steps of:

determining a color of illumination light around the base; and changing a color of the light irradiated on the base, in accordance with a result from said determining step.

69. The method according to claim 68, further comprising the step of changing the color of the light irradiated on the base by an external instruction.

70. An image sensing method for sensing a desired area on an original, comprising the steps of:

irradiating marks of light, which indicate an image sensing area in which an object image can be sensed, on a surface on which the original is placed; and sensing the object image in the image sensing area indicated by the marks of light, wherein said marks of light are irradiated without using a lens unit through which the object image is sensed.

* * * * *

UNITED STATES PATENT AND TRADEMARK OFFICE
CERTIFICATE OF CORRECTION

PATENT NO. : 5,883,697
DATED : March 16, 1999
INVENTOR(S) : Atsushi Ohyama

It is certified that error appears in the above-identified patent and that said Letters Patent is hereby corrected as shown below:

Column 16, line 5, delete "switch 75" and insert therefor -- switch 17 --.

Column 20, line 38, delete "system or the" and insert therefor -- system for the --.

Column 20, line 59, delete "number 31 denotes" and insert therefor -- numeral 3' denotes --.

Column 22, line 44, delete "monitor 31" and insert therefor -- monitor 3' --.

Column 24, line 2, delete "a value a to a value b," and insert therefor -- a value $\underline{a}$ to a value $\underline{b}$ --.

UNITED STATES PATENT AND TRADEMARK OFFICE
CERTIFICATE OF CORRECTION

PATENT NO. : 5,883,697
DATED : March 16, 1999
INVENTOR(S) : Atsushi Ohyama

It is certified that error appears in the above-identified patent and that said Letters Patent is hereby corrected as shown below:

Column 24, lines 3-4, delete "amounts b and c" and insert therefor -- amounts $\underline{b}$ and $\underline{c}$ --.

Column 24, line 5, delete "amounts e and f" and insert therefor -- amounts $\underline{e}$ and $\underline{f}$ --.

Column 24, line 7, delete "amounts f and e" and insert therefor -- amounts $\underline{f}$ and $\underline{e}$ --.

Column 24, line 8, delete "amounts e and d" and insert therefor -- amounts $\underline{e}$ and $\underline{d}$ --.

Column 24, line 11, delete "value b to the value a" and insert therefor -- value $\underline{b}$ to the value $\underline{a}$ --.

Column 33, line 11, delete "a lens unit but" and insert therefor -- a lens unit, but --.

Signed and Sealed this

Fourth Day of January, 2000

Attest:

*Attesting Officer*        *Acting Commissioner of Patents and Trademarks*